(12) United States Patent
Kim et al.

(10) Patent No.: US 11,595,992 B2
(45) Date of Patent: *Feb. 28, 2023

(54) METHOD AND APPARATUS FOR TRANSMITTING AND RECEIVING RANDOM ACCESS CHANNEL

(71) Applicant: LG Electronics Inc., Seoul (KR)

(72) Inventors: Eunsun Kim, Seoul (KR); Hyunsoo Ko, Seoul (KR); Sukhyon Yoon, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,776

(22) Filed: Sep. 21, 2021

(65) Prior Publication Data

US 2022/0007414 A1 Jan. 6, 2022

Related U.S. Application Data

(63) Continuation of application No. 17/088,180, filed on Nov. 3, 2020, now Pat. No. 11,134,516, which is a
(Continued)

(51) Int. Cl.
*H04W 74/08* (2009.01)
*H04W 56/00* (2009.01)
*H04W 74/00* (2009.01)

(52) U.S. Cl.
CPC ............ *H04W 74/08* (2013.01); *H04W 56/00* (2013.01); *H04W 56/0015* (2013.01); *H04W 74/006* (2013.01); *H04W 74/0833* (2013.01)

(58) Field of Classification Search
CPC ...... H04W 74/00; H04W 74/08; H04W 56/00
See application file for complete search history.

(56) References Cited

U.S. PATENT DOCUMENTS 8,451,781 B2   5/2013   Jeong et al.
9,537,548 B2   1/2017   Thomas et al.
(Continued)

FOREIGN PATENT DOCUMENTS

AU   2001261298   5/2006
CN   102754385    10/2012
(Continued)

OTHER PUBLICATIONS

Ericsson, "NR four-step random access procedure," R1-1706015, 3GPP TSG-RAN WG1 Meeting #88bis, Spokane, WA, USA, dated Apr. 3-7, 2017, 7 pages.
(Continued)

*Primary Examiner* — Sulaiman Nooristany
(74) *Attorney, Agent, or Firm* — Fish & Richardson P.C.

(57) ABSTRACT

The present disclosure provides a method for transmitting a random access channel (RACH) by a UE in a wireless communication system. Particularly, the method includes receiving information about actually transmitted synchronization signal blocks (SBBs) and RACH configuration information about RACH resources and transmitting a RACH in at least one RACH resource among RACH resources mapped to actually transmitted SSBs on the basis of the information about actually transmitted SSBs and the RACH configuration information, wherein the actually transmitted SSBs are repeatedly mapped to RACH resources by a positive integer multiple of the number of the actually transmitted SSBs in a RACH configuration period based on the RACH configuration information.

7 Claims, 29 Drawing Sheets

Related U.S. Application Data continuation of application No. 16/065,747, filed as application No. PCT/KR2018/005119 on May 3, 2018, now Pat. No. 10,952,246.

(60) Provisional application No. 62/616,511, filed on Jan. 12, 2018, provisional application No. 62/587,479, filed on Nov. 17, 2017, provisional application No. 62/570,672, filed on Oct. 11, 2017, provisional application No. 62/566,546, filed on Oct. 2, 2017, provisional application No. 62/507,752, filed on May 17, 2017, provisional application No. 62/501,086, filed on May 3, 2017.

(56) References Cited

U.S. PATENT DOCUMENTS

| | | | |
|---|---|---|---|
| 10,405,354 | B2 | 9/2019 | Guo et al. |
| 2008/0075043 | A1 | 3/2008 | Wang et al. |
| 2010/0216479 | A1 | 8/2010 | Kato et al. |
| 2011/0194510 | A1 | 8/2011 | Gaal et al. |
| 2013/0250922 | A1 | 9/2013 | Kwon et al. |
| 2015/0181546 | A1 | 6/2015 | Freda et al. |
| 2016/0073381 | A1 | 3/2016 | Ratasuk et al. |
| 2016/0105910 | A1 | 4/2016 | Wang et al. |
| 2016/0249384 | A1 | 8/2016 | Girolamo |
| 2016/0286580 | A1 | 9/2016 | Liu et al. |
| 2017/0055298 | A1 | 2/2017 | Pawar et al. |
| 2017/0181134 | A1 | 6/2017 | Niu et al. |
| 2017/0332362 | A1 | 11/2017 | Li et al. |
| 2018/0098323 | A1 | 4/2018 | Zhang et al. |
| 2018/0115990 | A1 | 4/2018 | Abedini et al. |
| 2018/0132273 | A1 | 5/2018 | Zhang et al. |
| 2018/0138962 | A1 | 5/2018 | Islam et al. |
| 2018/0146465 | A1 | 5/2018 | Li et al. |
| 2018/0159713 | A1 | 6/2018 | Li et al. |
| 2018/0176065 | A1 | 6/2018 | Deng et al. |
| 2018/0184447 | A1 | 6/2018 | Wang et al. |
| 2018/0310341 | A1 | 10/2018 | Yerramalli et al. |
| 2019/0104549 | A1 | 4/2019 | Deng et al. |
| 2019/0110314 | A1* | 4/2019 | Abedini ............... H04L 5/0078 |

FOREIGN PATENT DOCUMENTS

| | | |
|---|---|---|
| EP | 2129147 | 2/2008 |
| KR | 10-1010581 | 1/2011 |
| RU | 2503152 | 12/2013 |
| WO | WO2016137372 | 9/2016 |
| WO | WO2016163738 | 10/2016 |
| WO | WO2019099136 | 5/2019 |

OTHER PUBLICATIONS

ETRI, "Remaining details on RACH procedure," 'R1-1718004', 3GPP TSG RAN WG1 Meeting #90bis, Prague, Czech, Oct. 9-13, 2017, 9 pages.

Extended European Search Report in European Application No. 18794514.2, dated Jun. 21, 2019, 15 pages.

Guangdong OPPO Mobile Telecom, "NR 4-Step Random Access Procedure," R1-1704605, 3GPP TSG RAN WG1 Meeting #88bis, Spokane, USA, dated Apr. 3-7, 2017, 4 pages.

Huawei, "RACH Procedures and Resource Configuration," 3GPP TSG RAN WG1 NR Ad Hoc Meeting, Jan. 16-20, 2017.

Japanese Office Action in Japanese Application No. 2019-202385, dated Aug. 25, 2020, 4 pages (with English translation).

JP Office Action in Japanese Appln. No. 2019-202385, dated Dec. 15, 2020, 6 pages (with English translation).

Nokia, "RACH in Multibeam System," 3GPP TSG-RAN WG2 Meeting #97bis, Apr. 3-7, 2017.

NTT DOCOMO, Inc., "Discussion on remaining details on RACH procedure," R1-1716074, 3GPP TSG RAN WG1 Meeting NR#3, Nagoya, Japan, Sep. 18-21, 2017, 7 pages.

NTT DOCOMO., "Discussion on 4-step random access procedure for NR," 3GPP TSG RAN WG1 Meeting #88, Feb. 13-17, 2017.

Qualcomm Incorporated, "Remaining Details on RACH Procedure," R1-1800851, 3GPP TSG-RAN WG1 Meeting RAN1 AH 1801, Vancouver, Canada, dated Jan. 22-26, 2018, 12 pages.

Russian Notice of Allowance in Russian Application No. 2019107196, dated May 20, 2020, 22 pages (with English translation).

Samsung, "NR 4-step random access procedure," 3GPP TSG RAN WG1 NR Ad Hoc, Jan. 16-20, 2017.

Samsung, "Discussion on RACH configuration," R1-1715920, 3GPP TSG RAN WG1 Meeting NR#3, Nagoya, Japan, Sep. 18-21, 2017, 4 pages.

Samsung, "NR 4-step random access procedure," R1-1705325, 3GPP TSG RAN WG1 Meeting #88b, Spokane, Washington, USA, dated Apr. 3-7, 2020, 13 pages.

United States Notice of Allowance in U.S. Appl. No. 16/243,341, dated Apr. 2, 2019, 8 pages.

ZTE Corporation., "Random access in NR," 3GPP TSG RAN WG2 Meeting #96, Nov. 14-18, 2016.

ZTE Microelectronics, "4-step RA Procedure," 3GPP TSG RAN WG1 #88bis Meeting, Apr. 3-7, 2017.

ZTE, Sanechips, "UCI multiplexing on PUSCH," R1-1715526, 3GPP TSG RAN WG1 Meeting NR#3, Nagoya, Japan, dated Sep. 18-21, 2017, 6 pages.

Huawei & HiSilicon, "On the remaining details of RACH Procedures," R1-1800064, Presented at 3GPP TSG RAN WG1 Ad Hoc Meeting, Vancouver, Canada, Jan. 22-26, 2018, 12 pages.

Office Action in Japanese Appln. No. 2021-098807, dated May 24, 2022, 7 pages.

Vivo, "Remaining issues on RACH procedure," R1-1803809, Presented at 3GPP TSG RAN WG1 Meeting #92bis, Sanya, China, Apr. 16-20, 2018, 4 pages.

Notice of Allowance in Brazilian Appln. No. BR1120190098992, dated Sep. 14, 2022, 12 pages (with English translation).

Notice of Allowance in Chinese Appln. No. 201880028305.X, dated Sep. 15, 2022, 6 pages (with English translation).

* cited by examiner

FIG. 18

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| CP | SEQ | SEQ | SEQ | SEQ | CP | SEQ | SEQ | SEQ | SEQ | | | | |

$N^{th}$ SLOT (N = 0,...,19, SS block periodicity = 20 )

RACH slot    RACH slot

{N, 0, Preamble format #1, 4, 1} {N, 5, Preamble format #1, 4, 1}

(Slot position, Starting OFDM symbol position for preamble, Preamble format #X, Number of sequence repetition, # of Preamble)

FIG. 19

| | | ZC index (OCC index, Cyclic shift version) | | | | | | |
|---|---|---|---|---|---|---|---|---|
| | | (0,0) | (0,1) | (0,2) | (0,3) | (1,0) | (1,1) | (1,2) | (1,3) |
| root code index | 15 | SS block #N | | | → | | | | → |
| | 27 | | | | → | | | | → |
| | 127 | SS block #N+1 | | | → | | | | → |
| | 138 | | | | → | | | | → |

METHOD AND APPARATUS FOR TRANSMITTING AND RECEIVING RANDOM ACCESS CHANNEL

CROSS-REFERENCE TO RELATED APPLICATIONS

This application is a continuation of U.S. application Ser. No. 17/088,180, filed on Nov. 3, 2020, which is a continuation of U.S. application Ser. No. 16/065,747, filed on Dec. 17, 2018, now U.S. Pat. No. 10,952,246, which is a National Stage application under 35 U.S.C. § 371 of International Application No. PCT/KR2018/005119, filed on May 3, 2018, which claims the benefit of U.S. Provisional Application No. 62/616,511, filed on Jan. 12, 2018, U.S. Provisional Application No. 62/587,479, filed on Nov. 17, 2017, U.S. Provisional Application No. 62/570,672, filed on Oct. 11, 2017, U.S. Provisional Application No. 62/566,546, filed on Oct. 2, 2017, U.S. Provisional Application No. 62/507,752, filed on May 17, 2017, and U.S. Provisional Application No. 62/501,086, filed on May 3, 2017. The disclosures of the prior applications are incorporated by reference in their entirety.

TECHNICAL FIELD

The present disclosure relates to a method for transmitting and receiving a random access channel and an apparatus therefor, and more specifically, to a method for transmitting and receiving a random access channel through resources for random access channels corresponding to synchronization signal blocks by mapping synchronization signal blocks to resources for random access channels, and an apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method for transmitting and receiving a random access channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

A method for transmitting a random access channel (RACH) by a UE in a wireless communication system according to an embodiment of the present disclosure includes: receiving information about actually transmitted synchronization signal blocks (SBBs) and RACH configuration information about RACH resources; and transmitting a RACH in at least one RACH resource among RACH resources mapped to actually transmitted SSBs based on the information about actually transmitted SSBs and the RACH configuration information, wherein the actually transmitted SSBs are repeatedly mapped to RACH resources by a positive integer multiple of the number of the actually transmitted SSBs in a RACH configuration period based on the RACH configuration information.

Here, RACH resources remaining after repeated mapping by the positive integer multiple of the number of the actually transmitted SSBs may not be mapped to the actually transmitted SSBs.

Furthermore, an uplink signal other than the RACH may be transmitted or a downlink signal may be received in the RACH resources which are not mapped to the actually transmitted SSBs.

Furthermore, when the number of SSBs which can be mapped per RACH resource is less than 1, one SSB may be mapped to as many consecutive RACH resources as a reciprocal of the number of SSBs which can be mapped per RACH resource.

A UE transmitting a random access channel (RACH) in a wireless communication system according to the present disclosure includes: a transceiver for transmitting/receiving radio signals to/from a base station; and a processor connected to the transceiver and configured to control the transceiver, wherein the processor controls the transceiver to receive information about actually transmitted synchronization signal blocks (SBBs) and RACH configuration information about RACH resources and controls the transceiver to transmit a RACH in at least one RACH resource among RACH resources mapped to actually transmitted SSBs based on the information about actually transmitted SSBs and the RACH configuration information, wherein the actually transmitted SSBs are repeatedly mapped to RACH resources by a positive integer multiple of the number of the actually transmitted SSBs in a RACH configuration period based on the RACH configuration information.

Here, RACH resources remaining after repeated mapping by the positive integer multiple of the number of the actually transmitted SSBs may not be mapped to the actually transmitted SSBs.

Furthermore, an uplink signal other than the RACH may be transmitted or a downlink signal may be received in the RACH resources which are not mapped to the actually transmitted SSBs.

Furthermore, when the number of SSBs which can be mapped per RACH resource is less than 1, one SSB may be mapped to as many consecutive RACH resources as a reciprocal of the number of SSBs which can be mapped per RACH resource.

A method for receiving a random access channel (RACH) by a base station in a wireless communication system according to an embodiment of the present disclosure includes: transmitting information about actually transmitted synchronization signal blocks (SBBs) and RACH configuration information about RACH resources; and performing RACH reception in RACH resources mapped to the actually transmitted SSBs on the basis of the information about actually transmitted SSBs and the RACH configuration information, wherein the actually transmitted SSBs are repeatedly mapped to RACH resources by a positive integer multiple of the number of the actually transmitted SSBs in a RACH configuration period based on the RACH configuration information.

Here, information about an actually transmitted SSB corresponding to synchronization intended to be acquired by a UE which has transmitted the RACH may be acquired on the basis of a RACH resource in which the RACH has been received.

A base station receiving a random access channel (RACH) in a wireless communication system according to the present disclosure includes: a transceiver for transmitting/receiving radio signals to/from a UE; and a processor connected to the transceiver and configured to control the transceiver, wherein the processor controls the transceiver to transmit information about actually transmitted synchronization signal blocks (SBBs) and RACH configuration information about RACH resources and controls the transceiver to perform RACH reception in RACH resources mapped to the actually transmitted SSBs based on the information about actually transmitted SSBs and the RACH configuration information, wherein the actually transmitted SSBs are repeatedly mapped to RACH resources by a positive integer multiple of the number of the actually transmitted SSBs in a RACH configuration period based on the RACH configuration information.

According to the present disclosure, it is possible to perform an efficient initial access procedure by mapping resources for random access channels to synchronization signal blocks and transmitting/receiving other signals through resources for random access channels which are not mapped to synchronization signal blocks.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the present disclosure.

FIGS. 16 to 28 illustrate embodiments with respect to a method of configuring RACH resources and a method of allocating RACH resources.

DETAILED DESCRIPTION

Figure 1:
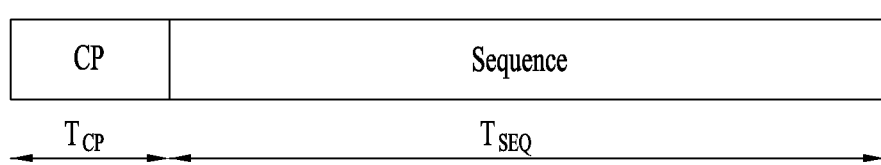
FIG. 1 illustrates a random access preamble format in LTE/LTE-A.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, a BS will be referred to as a gNB.

In the present invention, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). After the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

FIG. 1 illustrates a random access preamble format in a legacy LTE/LTE-A system.

In the legacy LTE/LTE-A system, a random access preamble, i.e., a RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. Higher layers control the preamble format. In the 3GPP LTE/LTE-A system, PRACH configuration information is signaled through system information and mobility control information of a cell. The PRACH configuration information indicates a root sequence index, a cyclic shift unit $N_{CS}$ of a Zadoff-Chu sequence, the length of the root sequence, and a preamble format, which are to be used for a RACH procedure in the cell. In the 3GPP LTE/LTE-A system, a PRACH opportunity, which is a timing at which the preamble format and the RACH preamble may be transmitted, is indicated by a PRACH configuration index, which is a part of the RACH configuration information (refer to Section 5.7 of 3GPP TS 36.211 and "PRACH-Config" of 3GPP TS 36.331). The length of the Zadoff-Chu sequence used for the RACH preamble is determined according to the preamble format (refer to Table 4)

TABLE 1

| Preamble format | $T_{CP}$ | $T_{SEQ}$ |
| --- | --- | --- |
| 0 | $3168 \cdot T_S$ | $24576 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |
| 4 | $448 \cdot T_S$ | $4096 \cdot T_S$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB).

The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Table 2 and Table 3 for preamble formats 0-3 and 4, respectively.

TABLE 2

| Logical root sequence number | Physical root sequence number u (in increasing order of 상기 corresponding logical sequnce number) |
|---|---|
| 0~23 | 129, 710, 140, 699, 120, 719, 210, 629, 168, 671, 84, 755, 105, 734, 93, 746, 70, 769, 60, 779, 2, 837, 1, 838 |
| 24~29 | 56, 783, 112, 727, 148, 691 |
| 30~35 | 80, 759, 42, 797, 40, 799 |
| 36~41 | 35, 804, 73, 766, 146, 693 |
| 42~51 | 31, 808, 28, 811, 30, 809, 27, 812, 29, 810 |
| 52~63 | 24, 815, 48, 791, 68, 771, 74, 765, 178, 661, 136, 703 |
| 64~75 | 86, 753, 78, 761, 43, 796, 39, 800, 20, 819, 21, 818 |
| 76~89 | 95, 744, 202, 637, 190, 649, 181, 658, 137, 702, 125, 714, 151, 688 |
| 90~115 | 217, 622, 128, 711, 142, 697, 122, 717, 203, 636, 118, 721, 110, 729, 89, 750, 103, 736, 61, 778, 55, 784, 15, 824, 14, 825 |
| 116~135 | 12, 827, 23, 816, 34, 805, 37, 802, 46, 793, 207, 632, 179, 660, 145, 694, 130, 709, 223, 616 |
| 136~167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168~203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204~263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264~327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328~383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384~455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456~513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514~561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562~629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630~659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |

TABLE 2-continued

| Logical root sequence number | Physical root sequence number u (in increasing order of 상기 corresponding logical sequnce number) |
|---|---|
| 660~707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708~729 | 346, 493, 339, 500, 351, 488, 306, 533, 289, 550, 400, 439, 378, 461, 374, 465, 415, 424, 270, 569, 241, 598 |
| 730~751 | 231, 608, 260, 579, 268, 571, 276, 563, 409, 430, 398, 441, 290, 549, 304, 535, 308, 531, 358, 481, 316, 523 |
| 752~765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778~789 | 317, 522, 307, 532, 286, 553, 287, 552, 266, 573, 261, 578 |
| 790~795 | 236, 603, 303, 536, 356, 483 |
| 796~803 | 355, 484, 405, 434, 404, 435, 406, 433 |
| 804~809 | 235, 604, 267, 572, 302, 537 |
| 810~815 | 309, 530, 265, 574, 233, 606 |
| 816~819 | 367, 472, 296, 543 |
| 820~837 | 336, 503, 305, 534, 373, 466, 280, 559, 279, 560, 419, 420, 240, 599, 258, 581, 229, 610 |

TABLE 3

| Logical root sequence number | Physical root sequence number u in increasing order of the corresponding logical sequence number) |
|---|---|
| 0-19 | 1 138 2 137 3 136 4 135 5 134 6 133 7 132 8 131 9 130 10 129 |
| 20-39 | 11 128 12 127 13 126 14 125 15 124 16 123 17 122 18 121 19 120 20 119 |
| 40-59 | 21 118 22 117 23 116 24 115 25 114 26 113 27 112 28 111 29 110 30 109 |
| 60-79 | 31 108 32 107 33 106 34 105 35 104 36 103 37 102 38 101 39 100 40 99 |
| 80-99 | 41 98 42 97 43 96 44 95 45 94 46 93 47 92 48 91 49 90 50 89 |
| 100-119 | 51 88 52 87 53 86 54 85 55 84 56 83 57 82 58 81 59 80 60 79 |
| 120-137 | 61 78 62 77 63 76 64 75 65 74 66 73 67 72 68 71 69 70 — — |
| 138-837 | N/A | u-th root Zadoff-Chu sequence is defined by the following equation.

$$x_u(n) = e^{-j\frac{\pi u n(n+1)}{N_{ZC}}}, \quad 0 \leq n \leq N_{ZC} - 1 \qquad \text{Equation 1}$$

TABLE 4

| Preamble format | $N_{ZC}$ |
|---|---|
| 0~3 | 839 |
| 4 | 139 |

From the u-th root Zadoff-Chu sequence, random access preambles with zero correlation zones of length $N_{ZC}-1$ are defined by cyclic shifts according to $x_{u,v}(n) = x_u((n+C_v) \bmod N_{ZC})$, where the cyclic shift is given by the following equation.

$$C_v = \begin{cases} vN_{CS} & v = 0, 1, \ldots, \lfloor N_{ZC}/N_{CS} \rfloor - 1, \text{ for unrestricted sets} \\ & N_{CS} \neq 0 \\ 0 & N_{CS} = 0 \text{ for unrestricted sets} \\ d_{start}\lfloor v/n_{shift}^{RA}\rfloor + & v = 0, 1, \ldots, \\ (v \bmod n_{shift}^{RA})N_{CS} & n_{shift}^{RA}\bar{n}_{shift}^{RA} + \\ & \bar{n}_{shift}^{RA} - 1 \text{ for restricted sets} \end{cases} \qquad \text{Equation 2}$$

$N_{CS}$ is given by Table 5 for preamble formats 0-3 and by Table 6 for preamble format 4.

TABLE 5

| zeroCorrela-tionZoneConfig | $N_{CS}$ value | |
|---|---|---|
| | Unrestricted set | Restricted set |
| 0 | 0 | 15 |
| 1 | 13 | 18 |
| 2 | 15 | 22 |

TABLE 5-continued

| zeroCorrela-tionZoneConfig | $N_{CS}$ value | |
|---|---|---|
| | Unrestricted set | Restricted set |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 6

| zeroCorrela-tionZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

The parameter zeroCorrelationZoneConfig is provided by higher layers. The parameter High-speed-flag provided by higher layers determines if unrestricted set or restricted set shall be used.

The variable $d_u$ is the cyclic shift corresponding to a Doppler shift of magnitude $1/T_{SEQ}$ and is given by the following equation.

$$d_u = \begin{cases} p & 0 \leq p < N_{ZC}/2 \\ N_{ZC} - p & \text{otherwise} \end{cases} \quad \text{Equation 3}$$

p is the smallest non-negative integer that fulfils (pu) mod $N_{ZC}=1$ The parameters for restricted sets of cyclic shifts depend on $d_u$. For $N_{ZC} \leq d_u < N_{ZC}/3$, the parameters are given by the following equation.

$$n_{shift}^{RA} = \lfloor d_u/N_{CS} \rfloor$$

$$d_{start} = 2d_u + n_{shift}^{RA} N_{CS}$$

$$n_{group}^{RA} \lfloor N_{ZC}/d_{start} \rfloor$$

$$\bar{n}_{shift}^{RA} = \max(\lfloor (N_{ZC}-2d_u-n_{group}^{RA}d_{start})/N_{CS} \rfloor, 0) \quad \text{Equation 4}$$

For $N_{ZC}/3 \leq d_u < (N_{ZC}-N_{CS})/2$, the parameters are given by the following equation.

$$n_{shift}^{RA} = \lfloor (N_{ZC}-2d_u)/N_{CS} \rfloor$$

$$d_{start} = N_{ZC}-2d_u+n_{shift}^{RA} N_{CS}$$

$$n_{group}^{RA} = \lfloor d_u/d_{start} \rfloor$$

$$\bar{n}_{shift}^{RA} = \min(\max(\lfloor (d_u-n_{group}^{RA}d_{start})/N_{CS} \rfloor, 0), n_{shift}^{RA}) \quad \text{Equation 5}$$

For all other values of $d_u$, there are no cyclic shifts in the restricted set.

The time-continuous random access signal s(t) which is the baseband signal of RACH is defined by the following Equation.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})} \quad \text{Equation 6}$$

where $0 \leq t < T_{SEQ}-T_{CP}$, $\beta_{PRACH}$ is an amplitude scaling factor in order to conform to the transmit power specified in 3GPP TS 36.211, and $k_0=n^{RA}_{PRB}N^{RB}_{sc}N^{UL}_{RB}N^{RB}_{sc}/2$. $N^{RB}_{sc}$ denotes the number of subcarriers constituting one resource block (RB). $N^{UL}_{RB}$ denotes the number of RBs in a UL slot and depends on a UL transmission bandwidth. The location in the frequency domain is controlled by the parameter $n^{RA}_{PRB}$ is derived from the section 5.7.1 of 3GPP TS 36.211. The factor $K=\Delta f/\Delta f_{RA}$ accounts for the difference in subcarrier spacing between the random access preamble and uplink data transmission. The variable $\Delta f_{RA}$, the subcarrier spacing for the random access preamble, and the variable $\varphi$, a fixed offset determining the frequency-domain location of the random access preamble within the physical resource blocks, are both given by the following table.

TABLE 7

| Preamble format | $\Delta f_{RA}$ | $\varphi$ |
|---|---|---|
| 0~3 | 1250 Hz | 7 |
| 4 | 7500 Hz | 2 |

In the LTE/LTE-A system, a subcarrier spacing $\Delta f$ is 15 kHz or 7.5 kHz. However, as given by Table 7, a subcarrier spacing $\Delta f_{RA}$ for a random access preamble is 1.25 kHz or 0.75 kHz.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. The new RAT system may follow the OFDM parameters different from OFDM parameters of the LTE system. Alternatively, the new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Subframe Structure>

In the 3GPP LTE/LTE-A system, radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. The basic time unit for LTE is $T_s$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 2:
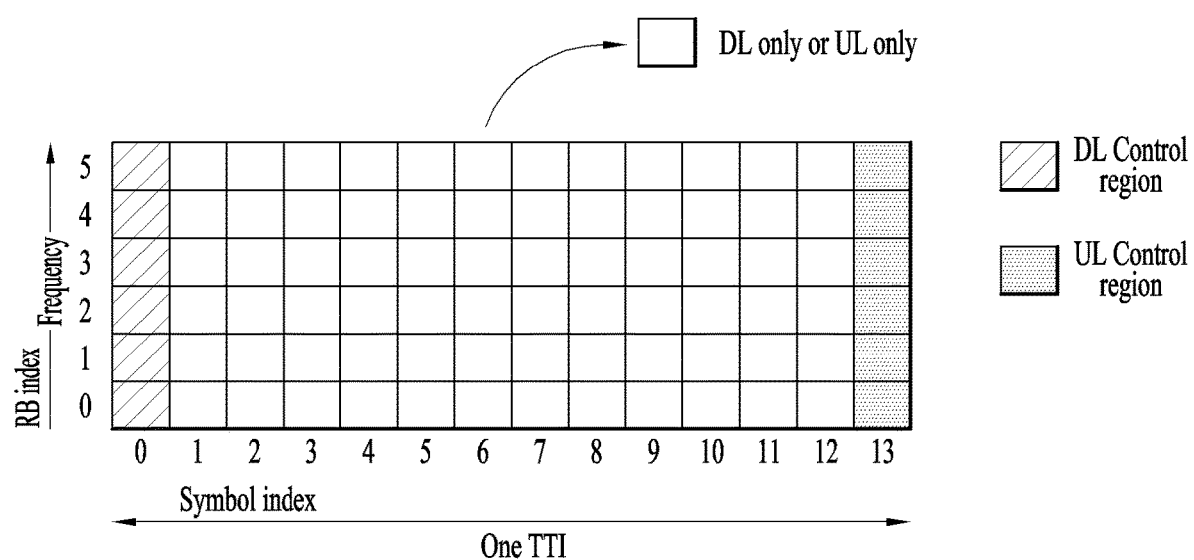
FIG. 2 illustrates a slot structure available in new radio access technology (NR).

FIG. 2 illustrates a slot structure available in a new radio access technology (NR).

To minimize data transmission latency, in a 5G new RAT, a slot structure in which a control channel and a data channel are time-division-multiplexed is considered.

In FIG. 2, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 2, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 2, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, a basic transmission unit is a slot. A slot duration may consist of 14 symbols with a normal cyclic prefix (CP) or 12 symbols with an extended CP. The slot is scaled in time as a function of a used subcarrier spacing. That is, if the subcarrier spacing increases, the length of the slot is shortened. For example, when the number of symbols per slot is 14, the number of slots in a 10-ms frame is 10 at a subcarrier spacing of 15 kHz, 20 at a subcarrier spacing of 30 kHz, and 40 at a subcarrier spacing of 60 kHz. If a subcarrier spacing increases, the length of OFDM symbols is shortened. The number of OFDM symbols in a slot depends on whether the OFDM symbols have a normal CP or an extended CP and does not vary according to subcarrier spacing. A basic time unit used in the LTE system, $T_s$, is defined as $T_s=1/(15000*2048)$ seconds in consideration of a basic subcarrier spacing of 15 kHz and a maximum TFT size 2048 of the LTE system and corresponds to a sampling time for a subcarrier spacing of 15 kHz. In the NR system, various subcarrier lengths in addition to the subcarrier spacing of 15 kHz may be used. Since the subcarrier spacing and a corresponding time length are inversely proportional, an actual sampling time corresponding to subcarrier spacings greater than 15 kHz is shorter than $T_s=1/(15000*2048)$ seconds. For example, actual sampling times for subcarrier spacings of 30 kHz, 60 kHz, and 120 kHz will be $1/(2*15000*2048)$ seconds, $1/(4*15000*2048)$ seconds, and $1/(8*15000*2048)$ seconds, respectively.

<Analog Beamforming>

A recently discussed fifth generation (5G) mobile communication system is considering using an ultrahigh frequency band, i.e., a millimeter frequency band equal to or higher than 6 GHz, to transmit data to a plurality of users in a wide frequency band while maintaining a high transmission rate. In 3GPP, this system is used as NR and, in the present invention, this system will be referred to as an NR system. Since the millimeter frequency band uses too high a frequency band, a frequency characteristic thereof exhibits very sharp signal attenuation depending on distance. Therefore, in order to correct a sharp propagation attenuation characteristic, the NR system using a band of at least above 6 GHz uses a narrow beam transmission scheme to solve a coverage decrease problem caused by sharp propagation attenuation by transmitting signals in a specific direction so as to focus energy rather than in all directions. However, if a signal transmission service is provided using only one narrow beam, since a range serviced by one BS becomes narrow, the BS provides a broadband service by gathering a plurality of narrow beams.

In the millimeter frequency band, i.e., millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which the BS or the UE transmits the same signal using a proper phase difference through a large number of antennas so that energy increases only in a specific direction. Such a beamforming scheme includes digital beamforming for imparting a phase difference to a digital baseband signal, analog beamforming for imparting a phase difference to a modulated analog signal using time latency (i.e., cyclic shift), and hybrid beamforming using both digital beamforming and analog beamforming. If a transceiver unit (TXRU) is provided for each antenna element to enable adjustment of transmit power and phase, independent beamforming is possible for each frequency resource. However, installing TXRU in all of the about 100 antenna elements is less feasible in terms of cost. That is, the millimeter frequency band needs to use numerous antennas to correct the sharp propagation attenuation characteristic. Digital beamforming requires as many radio frequency (RF) components (e.g., a digital-to-analog converter (DAC), a mixer, a power amplifier, a linear amplifier, etc.) as the number of antennas. Therefore, if digital beamforming is desired to be implemented in the millimeter frequency band, cost of communication devices increases. Hence, when a large number of antennas is needed as in the millimeter frequency band, use of analog beamforming or hybrid beamforming is considered. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous. The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

As mentioned above, digital BF may simultaneously transmit or receive signals in multiple directions using multiple beams by processing a digital baseband signal to be transmitted or received, whereas analog BF cannot simultaneously transmit or receive signals in multiple directions exceeding a coverage range of one beam by performing BF in a state in which an analog signal to be transmitted or received is modulated. Typically, the BS simultaneously performs communication with a plurality of users using broadband transmission or multi-antenna characteristics. If the BS uses analog or hybrid BF and forms an analog beam in one beam direction, the eNB communicates with only users included in the same analog beam direction due to an analog BF characteristic. A RACH resource allocation method and a resource use method of the BS according to the present invention, which will be described later, are proposed considering restrictions caused by the analog BF or hybrid BF characteristic.

<Hybrid Analog Beamforming>

Figure 3:
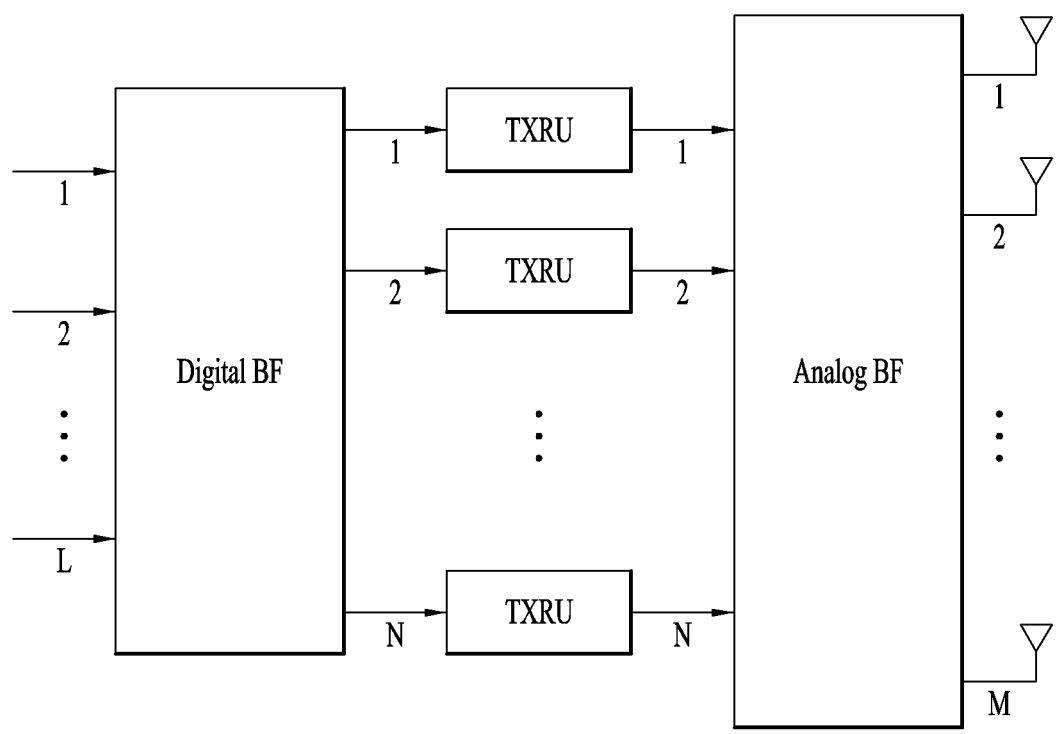
FIG. 3 abstractly illustrates a hybrid beamforming structure from the viewpoint of a transceiver unit (TXRU) and a physical antenna

FIG. 3 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 3, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 4:
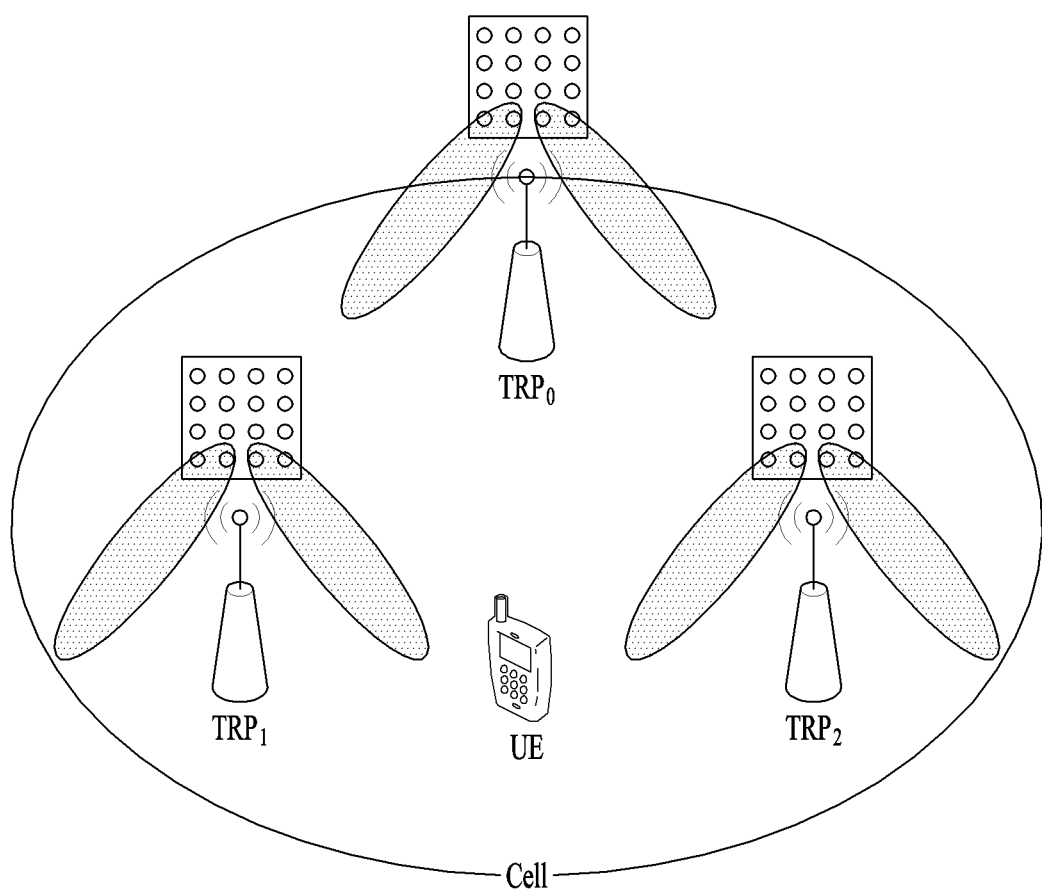
FIG. 4 illustrates a cell of new radio access technology (NR).

FIG. 4 illustrates a cell of a new radio access technology (NR) system.

Referring to FIG. 4, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omnidirectionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. In the present invention, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

Figure 5:
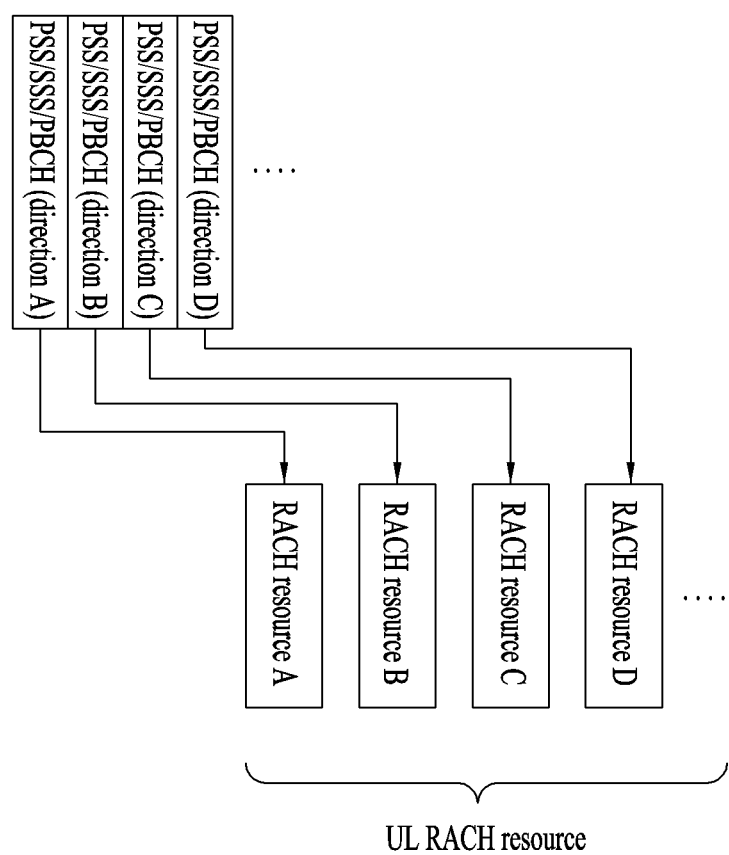
FIG. 5 illustrates SS block transmission and RACH resources linked to SS blocks.

FIG. 5 illustrates transmission of an SS block and a RACH resource linked to the SS block.

To communicate with one UE, the gNB should acquire an optimal beam direction between the gNB and the UE and should continuously track the optimal beam direction because the optimal beam direction is changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is needed for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the case of the NR system which is under development, a multi-stage beam acquisition procedure is under discussion, for beam acquisition in an environment using multiple beams. In the multi-stage beam acquisition procedure, the gNB and the UE perform connection setup using a wide beam in an initial access stage and, after connection setup is ended, the gNB and the UE perform communication with optimal quality using a narrow band. In the present invention, although various methods for beam acquisition of the NR system are mainly discussed, the most actively discussed method at present is as follows.

1) The gNB transmits an SS block per wide beam in order for the UE to search for the gNB in an initial access procedure, i.e., performs cell search or cell acquisition, and to search for an optimal wide beam to be used in a first stage of beam acquisition by measuring channel quality of each wide beam. 2) The UE performs cell search for an SS block per beam and performs DL beam acquisition using a cell detection result of each beam. 3) The UE performs a RACH procedure in order to inform the gNB that the UE will access the gNB that the UE has discovered. 4) The gNB connects or associates the SS block transmitted per beam and a RACH resource to be used for RACH transmission, in order to cause the UE to inform the gNB of a result of the RACH procedure and simultaneously a result of DL beam acquisition (e.g., beam index) at a wide beam level. If the UE performs the RACH procedure using a RACH resource connected to an optimal beam direction that the UE has discovered, the gNB obtains information about a DL beam suitable for the UE in a procedure of receiving a RACH preamble.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

In the LTE system and the NR system, a RACH signal used for initial access to the gNB, i.e., initial access to the gNB through a cell used by the gNB, may be configured using the following elements:

Cyclic prefix (CP): This element serves to prevent interference generated from a previous/front (OFDM) symbol and group RACH preamble signals arriving at the gNB with various time delays into one time zone. That is, if the CP is configured to match a maximum radius of a cell, RACH preambles that UEs in the cell have transmitted in the same resource are included in a RACH reception window corresponding to the length of RACH preambles configured by the gNB for RACH reception. A CP length is generally set to be equal to or greater than a maximum round trip delay.

Preamble: A sequence used by the gNB to detect signal transmission is defined and the preamble serves to carry this sequence.

Guard time (GT): This element is defined to cause a RACH signal arriving at the gNB with delay from the farthest distance from the gNB on RACH coverage not to create interference with respect to a signal arriving after a RACH symbol duration. During this GT, the UE does not transmit a signal so that the GT may not be defined as the RACH signal.

Figure 6:
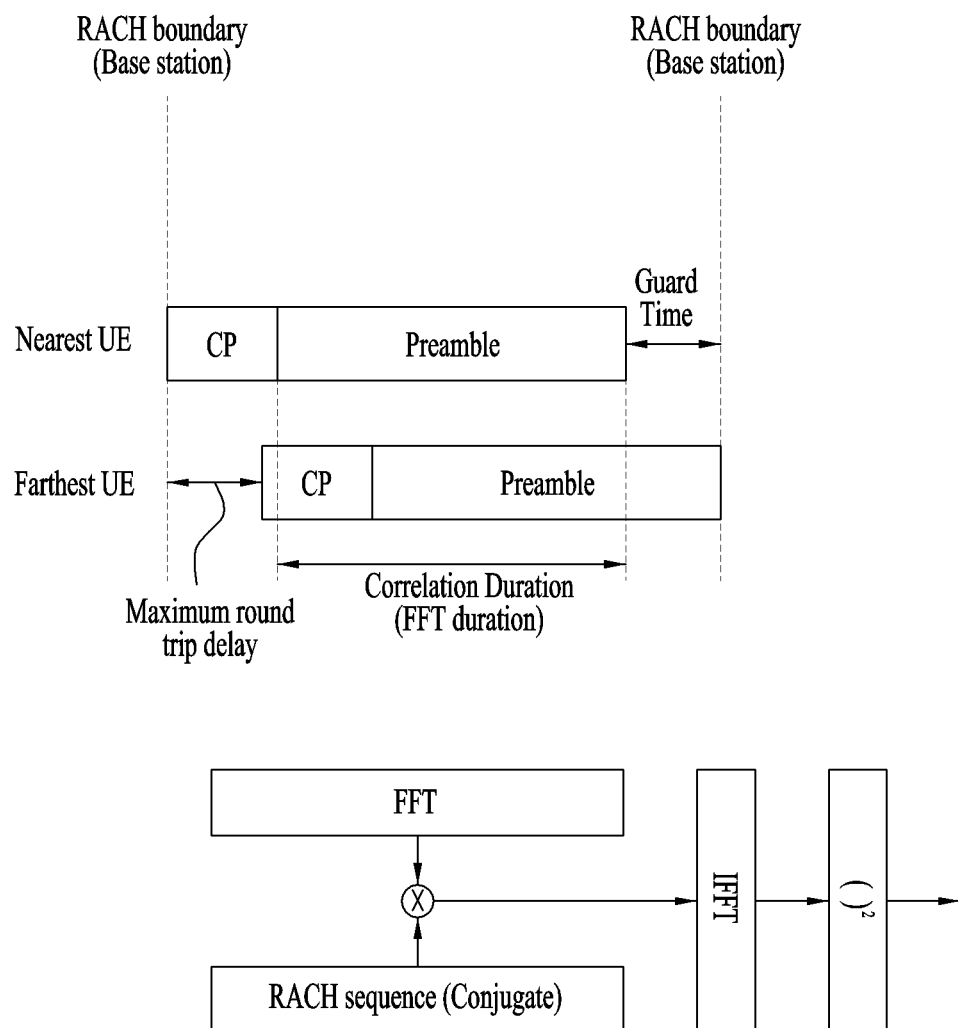
FIG. 6 illustrates a configuration/format of a random access channel (RACH) preamble and a receiver function.

FIG. 6 illustrates configuration/format of a RACH preamble and a receiver function.

The UE transmits a RACH signal through a designated RACH resource at a system timing of the gNB obtained through an SS. The gNB receives signals from multiple UEs. Generally, the gNB performs the procedure illustrated in FIG. 5 for RACH signal reception. Since a CP for the RACH signal is set to a maximum round trip delay or more, the gNB may configure an arbitrary point between the maximum round trip delay and the CP length as a boundary for signal reception. If the boundary is determined as a start point for signal reception and if correlation is applied to a signal of a length corresponding to a sequence length from the start point, the gNB may acquire information as to whether the RACH signal is present and information about the CP.

If a communication environment operated by the gNB such as a millimeter band uses multiple beams, the RACH signal arrives at the eNB from multiple directions and the gNB needs to detect the RACH preamble (i.e., PRACH) while sweeping beam directions to receive the RACH signal arriving from multiple directions. As mentioned above, when analog BF is used, the gNB performs RACH reception only in one direction at one timing. For this reason, it is necessary to design the RACH preamble and a RACH procedure so that the gNB may properly detect the RACH preamble. The present invention proposes the RACH preamble and/or the RACH procedure for a high frequency band to which the NR system, especially, BF, is applicable in consideration of the case in which BC of the gNB holds and the case in which BC does not hold.

Figure 7:
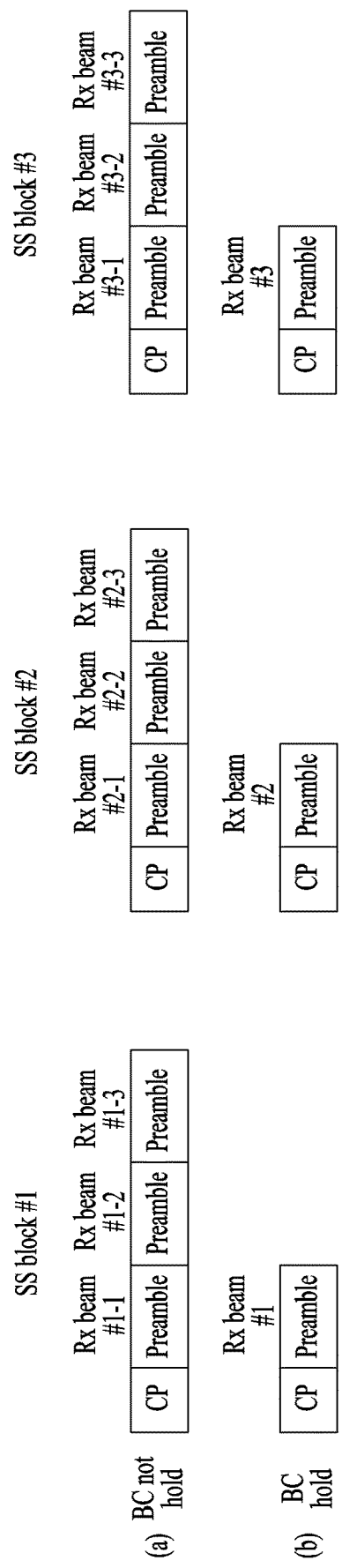
FIG. 7 illustrates receiving (Rx) beams formed in a gNB to receive a RACH preamble.

FIG. 7 illustrates a reception (Rx) beam formed at a gNB to receive a RACH preamble.

If BC does not hold, beam directions may be mismatched even when the gNB forms an Rx beam in a Tx beam direction of an SS block in a state in which a RACH resource is linked to the SS block. Therefore, a RACH preamble may be configured in a format illustrated in FIG. 7(a) so that the gNB may perform beam scanning for performing/attempting to perform RACH preamble detection in multiple directions while sweeping Rx beams. Meanwhile, if BC holds, since the RACH resource is linked to the SS block, the gNB may form an Rx beam in a direction used to transmit the SS block with respect to one RACH resource and detect the RACH preamble only in that direction. Therefore, the RACH preamble may be configured in a format illustrated in FIG. 7(b).

As described previously, a RACH signal and a RACH resource should be configured in consideration of two purposes of a DL beam acquisition report and a DL preferred beam report of the UE and beam scanning of the gNB according to BC.

Figure 8:
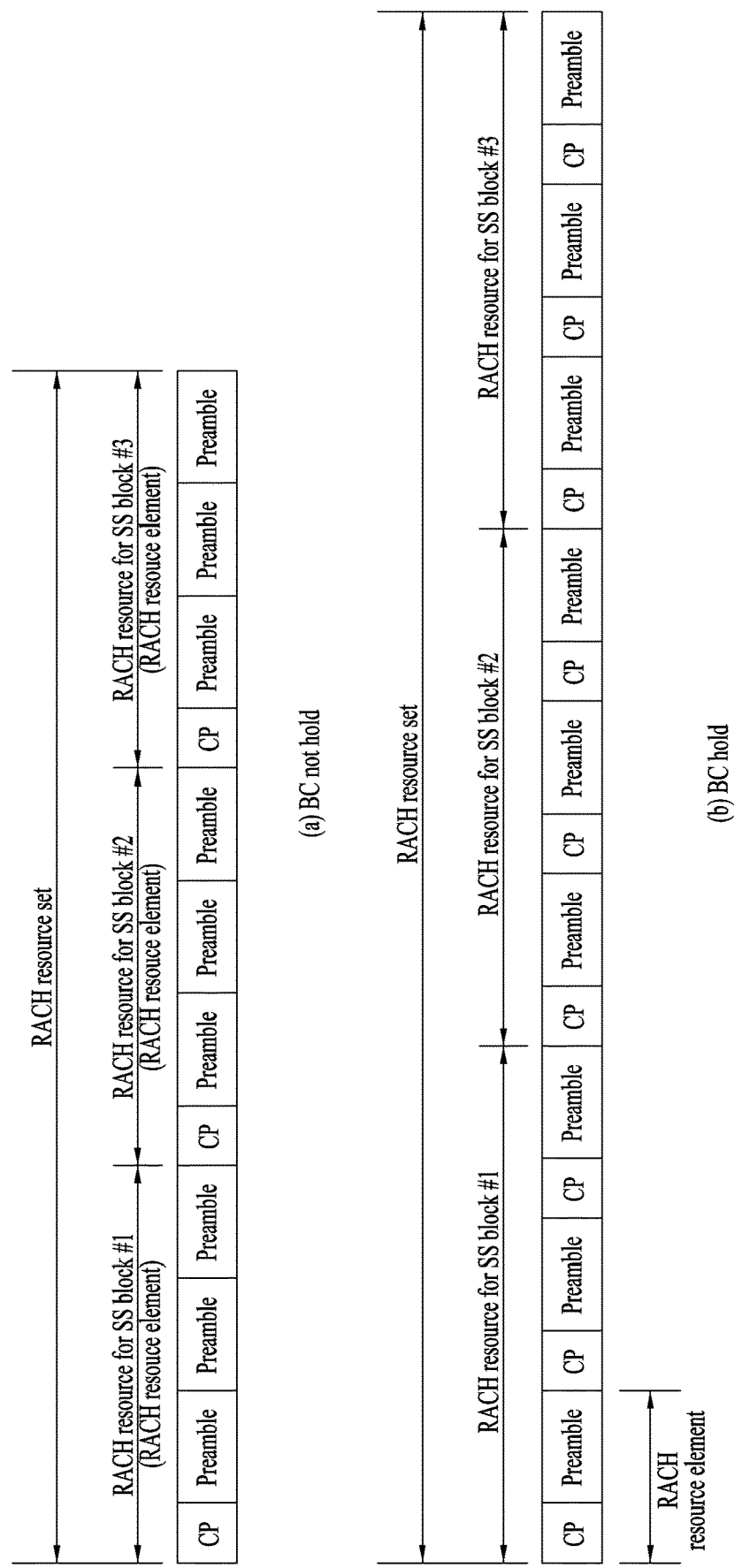
FIG. 8 is a diagram for describing terms used in the description of the present disclosure with respect to RACH signals and RACH resources.

FIG. 8 illustrates a RACH signal and a RACH resource to explain terms used to describe the present invention. In the present invention, the RACH signal may be configured as follows.

RACH resource element: The RACH resource element is a basic unit used when the UE transmits the RACH signal. Since different RACH resource elements may be used for RACH signal transmission by different UEs, respectively, a CP is inserted into the RACH signal in each RACH resource element. Protection for signals between UEs is already maintained by the CP and, therefore, a GT is not needed between RACH resource elements.

RACH resource: The RACH resource is defined as a set of concatenated RACH resource elements connected to one SS block. If RACH resources are consecutively allocated contiguously, two successive RACH resources may be used for signal transmission by different UEs, respectively, like the RACH resource elements. Therefore, the CP may be inserted into the RACH signal in each RACH resource. The GT is unnecessary between RACH resources because signal detection distortion caused by time delay is prevented by the CP. However, if only one RACH resource is configured, i.e., RACH resources are not consecutively configured, since a PUSCH/PUCCH may be allocated after the RACH resource, the GT may be inserted in front of the PUSCH/PUCCH.

RACH resource set: The RACH resource set is a set of concatenated RACH resources. If multiple SS blocks are present in a cell and RACH resources connected respectively to the multiple SS blocks are concatenated, the concatenated RACH resources may be defined as one RACH resource set. The GT is inserted into the last of the RACH resource set which is a part where the RACH resource set including RACH resources and another signal such as a PUSCH/PUCCH may be encountered. As mentioned above, since the GT is a duration during which a signal is not transmitted, the GT may not be defined as a signal. The GT is not illustrated in FIG. 8.

RACH preamble repetition: When a RACH preamble for Rx beam scanning of the gNB is configured, i.e., when the gNB configures a RACH preamble format so that the gNB may perform Rx beam scanning, if the same signal (i.e., same sequence) is repeated within the RACH preamble, the CP is not needed between the repeated signals because the repeated signals serve as the CP. However, when preambles are repeated within the RACH preamble using different signals, the CP is needed between the preambles. The GT is not needed between RACH preambles. Hereinafter, the present invention is described under the assumption that the same signal is repeated. For example, if the RACH preamble is configured in the form of 'CP+preamble+preamble', the present invention is described under the assumption that the preambles within the RACH preamble are configured by the same sequence.

FIG. 8 illustrates RACH resources for a plurality of SS blocks and RACH preambles in each RACH resource in terms of the gNB. The gNB attempts to receive a RACH preamble in each RACH resource in a time region in which the RACH resources are configured. The UE transmits a RACH preamble thereof through RACH resource(s) linked to specific SS block(s) (e.g., SS block(s) having better Rx quality) rather than transmitting the RACH preamble in each of RACH resources for all SS blocks of the cell. As mentioned above, different RACH resource elements or different RACH resources may be used to transmit RACH preambles by different UEs.

Figure 9:
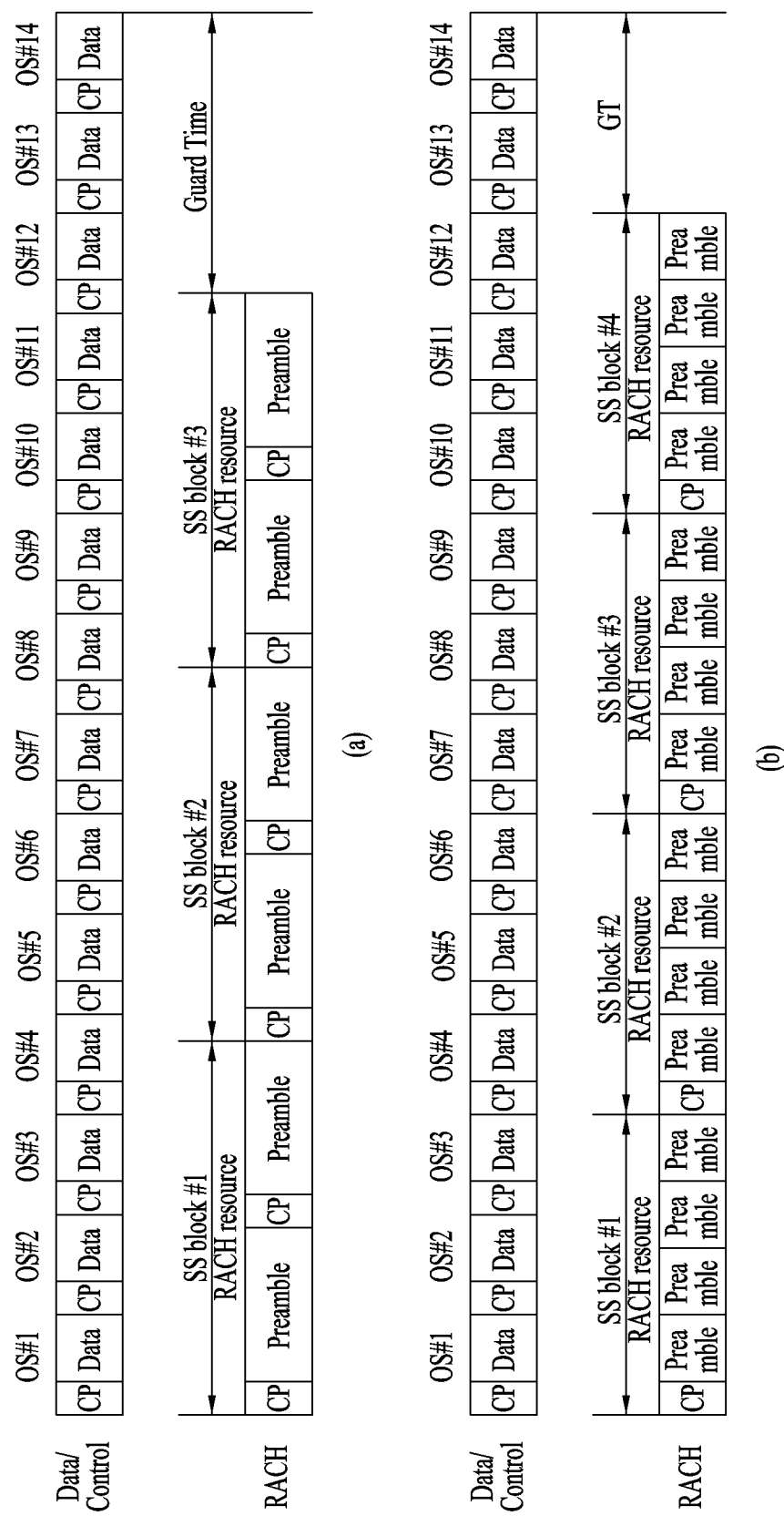
FIG. 9 illustrates a RACH resource set.

FIG. 9 illustrates a RACH resource set. FIG. 9(a) illustrates the case in which two RACH resource elements per RACH resource are configured in a cell of the gNB in which BC holds. FIG. 9(b) illustrates the case in which one RACH resource element per RACH resource is configured in the cell of the gNB in which BC holds. Referring to FIG. 9(a), two RACH preambles may be transmitted in a RACH resource linked to an SS block. Referring to FIG. 9(b), one RACH preamble may be transmitted in a RACH resource linked to an SS block.

A RACH resource set may be configured as illustrated in FIG. 9 so as to maximize the efficiency of a RACH resource using the RACH signal configuration characteristic described in FIG. 8. As illustrated in FIG. 9, in order to raise use/allocation efficiency of the RACH resource, RACH resources or RACH resource elements may be configured to be completely concatenated without allocating a blank duration between RACH resources in the RACH resource set.

However, if RACH resources are configured as illustrated in FIG. 9, the following problems may arise. 1) When BC holds and the gNB receives a RACH resource corresponding to SS block #N by forming a beam in the direction of SS block #N, since an Rx beam is changed at a middle of OFDM symbols (OSs) defined for a data or control channel, the gNB only partially uses resources other than a frequency resource allocated as the RACH resource. That is, as illustrated in FIG. 9(a), if the gNB forms an Rx beam to receive SS block #1, OS #4 cannot be used for the data channel or the control channel. 2) When BC does not hold and the gNB performs Rx beam scanning within a RACH resource element, the gNB may perform RACH preamble detection while receiving a data/control signal by forming an Rx beam on each of OSs at a boundary of OS #1/OS #2/OS #3 with respect to a RACH resource corresponding to SS block #1. However, when the gNB performs beam scanning for a RACH resource corresponding to SS block #2, a beam direction for receiving the data/control signal and a beam direction for receiving a RACH preamble are not matched in a duration corresponding to OS #4 so that a problem occurs in detecting the RACH preamble.

In summary, if the gNB performs beam scanning while changing the direction of an Rx beam for RACH signal reception and a timing at which the Rx beam is changed mismatches an OFDM symbol boundary defined for the data or control channel, there is a problem of lowering resource use/allocation efficiency of the data or control channel serviced in a frequency region other than a frequency resource allocated as the RACH resource. To solve this problem, the present invention proposes allocating a RACH resource as a structure aligned with an OFDM symbol boundary, in order for the gNB to perform RACH preamble detection while changing a beam direction in a multi-beam scenario and simultaneously for the gNB to use all radio resources other than the RACH resource for the data and control channels. When BC holds, by way of example, a RACH resource or a RACH preamble transmitted through the RACH resource may be aligned with an OFDM symbol boundary using two methods as illustrated in FIG. 10.

Figure 10:
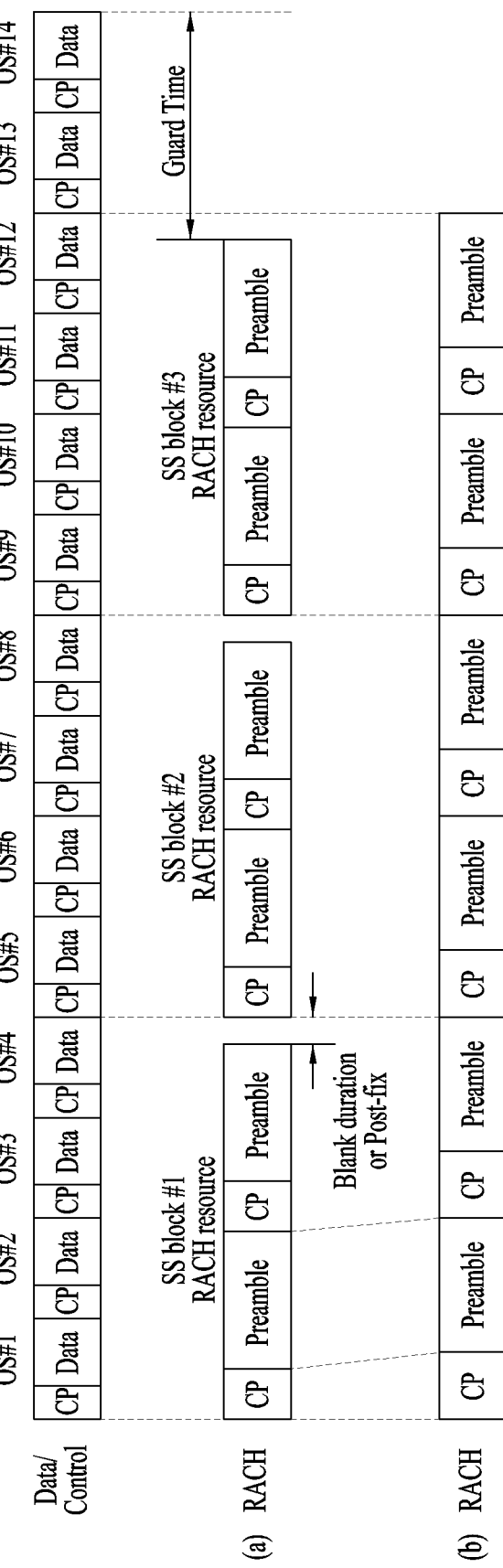
FIG. 10 is a diagram for describing the present disclosure with respect to RACH resource boundary alignment.

FIG. 10 illustrates boundary alignment of a RACH resource according to the present invention. An example illustrated in FIG. 10 corresponds to the case in which BS holds and two RACH resource elements can be transmitted on one RACH resource. When BC does not hold, one RACH preamble may be configured by one CP and a plurality of consecutive preambles as illustrated in FIG. 7(a) or FIG. 8(a). Even in this case, the present invention is applicable. Only one RACH resource element may be transmitted on one RACH resource and the present invention is applicable thereto.

1) One (hereinafter, Method 1) of methods for aligning an OFDM symbol boundary and a RACH resource boundary determines a CP length and a preamble length of a RACH preamble by taking into consideration RACH preamble detection capability by the gNB, coverage of the gNB, and a subcarrier spacing of the RACH preamble and then configure an RACH resource element using the CP length and the preamble length, as illustrated in FIG. 10(a). The gNB may configure the RACH resource by determining the number of RACH resource elements per RACH resource in consideration of the capacity of the RACH resource. The gNB configures RACH resource(s) such that a boundary of each of RACH resources which are to be consecutively used is aligned with a boundary of OFDM symbol(s) which are to be used for the data and control channels. In this case, a blank duration may occur between RACH resources. The blank duration may be configured as a duration during which no signals are transmitted. Alternatively, a signal may be additionally transmitted as a post-fix only to the last RACH resource element in the RACH resource. That is, the UE that transmits a RACH preamble using the last RACH resource element in the time domain among RACH resource elements in a RACH resource may add a post-fix signal to the RACH preamble thereof and then transmit the RACH preamble. The UE that transmits a RACH preamble using a RACH resource element other than the last RACH resource element may transmit the RACH preamble without adding the post-fix signal.

2) Another method (hereinafter, Method 2) among the methods of aligning the OFDM symbol boundary and the RACH resource boundary configures a CP length and a preamble length in order to align the RACH resource boundary with the OFDM symbol boundary as illustrated in FIG. 10(b). However, since the number of RACH resource elements in each RACH resource may vary, if the length of the RACH preamble is changed to match the OFDM symbol boundary, there is a danger of changing characteristics of a preamble sequence in the RACH preamble. That is, the length of a Zadoff-Chu (ZC) sequence used to generate a preamble is determined as 839 or 130 according to a preamble format as illustrated in Table 4. If the length of the preamble is changed in order to align the length of the RACH preamble with the OFDM symbol boundary, the characteristics of the ZC sequence which is the preamble sequence may vary. Therefore, if a RACH preamble format is determined and RACH resource elements per RACH resource are determined, the length of the RACH preamble may be fixed but a CP length may become greater than a length determined in configuring the RACH preamble format so that the RACH resource is aligned with the OFDM symbol boundary. That is, this method serves to align a RACH resource boundary, i.e., a RACH preamble boundary transmitted through the RACH resource with an OFDM symbol used to transmit the data/control channel (i.e., normal OFDM symbol) by fixing the length of each preamble in the RACH preamble and increasing the CP length to match the OFDM symbol boundary so as to maintain characteristics of the preamble sequence. In this case, only CP lengths of some RACH resource elements may be configured to be increased (i.e., only CP lengths of some RACH preambles are configured to be increased) or CP lengths of all RACH resource elements may be configured to be properly increased (i.e., a CP length of each RACH preamble is configured to be properly increased). For example, if the gNB configures the RACH resource in the time domain configured by OFDM symbols, the gNB configures a preamble format indicating a CP length and a sequence part length such that the sequence part length is a multiple of a positive integer of a preamble length obtained from a specific length (e.g., the length of a ZC sequence for a RACH) according to the number of preambles to be included in a corresponding RACH preamble and the CP length is equal to a value obtained by subtracting the sequence part length from a total length of the normal OFDM symbols. If the lengths of OFDM symbols are all the same, the RACH preamble format according to the present invention will be defined such that the sum of a multiple of a positive integer of a predefined preamble length (e.g., a preamble length obtained from a predefined length of a ZC sequence) and a CP length is a multiple of an OFDM symbol length. When the UE detects an SS block of a cell and generates a RACH preamble to be transmitted on a RACH resource connected to the SS block, the UE generates the RACH preamble by generating each preamble to be included in the RACH preamble using a sequence of a specific length (e.g., ZC sequence) according to a preamble format configured by the gNB and adding a CP to a front part of the preamble or repetition(s) of the preamble.

Method 1 and Method 2 may be equally applied even when the gNB performs Rx beam scanning because BC does not hold. When BC holds for Method 1 and Method 2, there is a high possibility that a RACH preamble is configured in a format including one preamble. Meanwhile, except that there is a high possibility that the RACH preamble is configured to include preamble repetition when BC does not hold, Method 1 and Method 2 described with reference to FIG. 10 may be equally applied to the case in which the gNB desires to perform Rx beam scanning because BS does not hold. For example, when BC does not hold so that the gNB desires to perform Rx beam scanning, the gNB configures and signals a preamble format (e.g., refer to FIG. 7(a) or FIG. 8(a)) in the form of including preamble repetition. Herein, the RACH resource may be configured in the form of Method 1 so as to monitor RACH preamble(s) by considering a duration from the end of one RACH resource to a part immediately before the start of the next RACH resource as a blank duration or a post-fix duration. Alternatively, the RACH resource may be configured in the form of Method 2 so as to monitor RACH preamble(s) in each RACH resource configured by the gNB under the assumption that the RACH preamble boundary is equal to the OFDM symbol boundary.

The RACH resource allocation method proposed in the present invention serves to efficiently use a frequency resource, other than a frequency resource occupied by the RACH resource, in one slot or multiple slots used for the RACH resource, as a data resource or a control channel resource. Therefore, for efficient use of the data/control channel resource considering the RACH resource, the gNB needs to schedule the data or control channel using information as to which unit is used to form a beam with respect to a slot to which the RACH resource is allocated. The UE may receive information as to which OFDM symbol unit is used when the gNB performs scheduling and transmit the data or control channel based on the information. To this end, two methods may be considered so that the gNB may schedule the data or control channel in a time region to which the RACH resource is allocated.

Mini Slot Allocation

When a channel is scheduled in a time region to which the RACH resource is allocated, since the scheduled channel should be included in one beam region, a time length of a resource to which the channel is allocated should be shorter than a time length of the RACH resource and a plurality of slots of a short length may be included for one RACH resource.

If the gNB operates by configuring a beam direction for each RACH resource and time units in which the gNB allocates a resource to the UE are not matched in a time region to which the RACH resource is allocated and in a time region to which the RACH resource is not allocated, the gNB should define a slot for scheduling in a time region occupied by the RACH resource and inform the UE of information related to the slot. Hereinafter, the slot used for scheduling in the time region occupied by the RACH resource will be referred to as a mini slot. In this structure, there are some considerations in order to transmit the data or control channel through the mini slot. For example, the following considerations are given.

Figure 11:
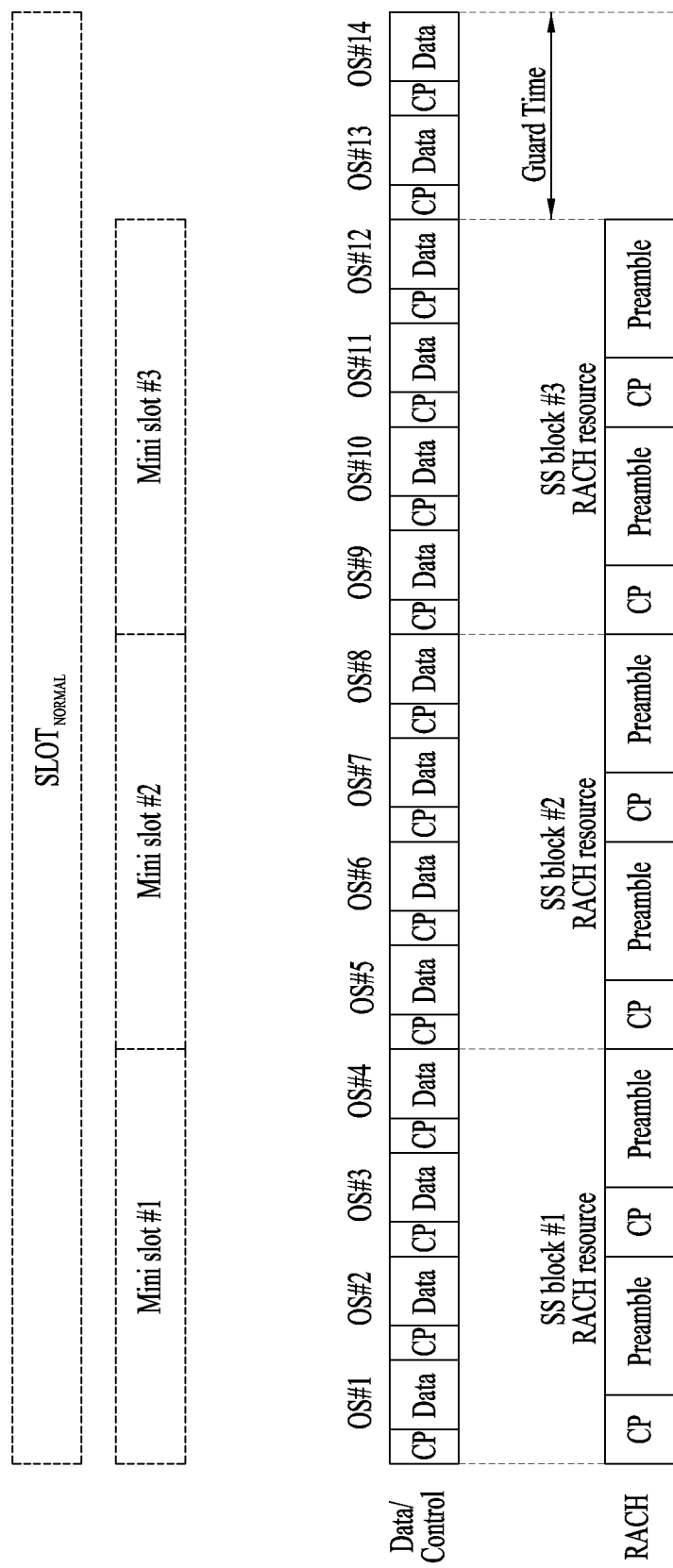
FIG. 11 illustrates a method of configuring a mini slot in a slot $SLOT_{RACH}$ for a RACH when BC is effective.

1) The case in which one mini slot is defined for a slot to which the RACH resource is allocated:

FIG. 11 illustrates a method of configuring a mini slot within a RACH slot $SLOT_{RACH}$ when BC holds.

The UE is aware of all information about RACH resources that the gNB uses through system information. Therefore, a set of minimum OFDM symbols including a whole RACH resource allocated per SS block may be defined as one mini slot. When the gNB performs scheduling at a time to which the RACH resource is allocated, the UE interprets the mini slot as a TTI and transmits the data or control channel in the TTI. If multiple mini slots are included in one normal slot, the UE needs to determine through which mini slot the UE is to transmit the data/control channel. A method for the UE to determine a mini slot to be used to transmit the data/control channel may broadly include the following two schemes.

A. If the gNB schedules transmission of a UL data/control channel, the gNB may designate, for the UE, which mini slot within a slot the UE should use for transmission, through DCI.

B. The UE continuously performs beam tracking in a multi-beam scenario. If the UE previously receives, from the gNB, information about an SS block to which a serving beam from which the UE currently receives a service is connected, the UE interprets the same time region as a time region to which the RACH resource connected to the SS block associated with the serving beam is allocated as a time region in which the UE should perform transmission. If the RACH resource connected to the SS block associated with the serving beam of the UE is not present in a slot scheduled for the UE, the UE may determine that beam mismatch has occurred.

Figure 12:
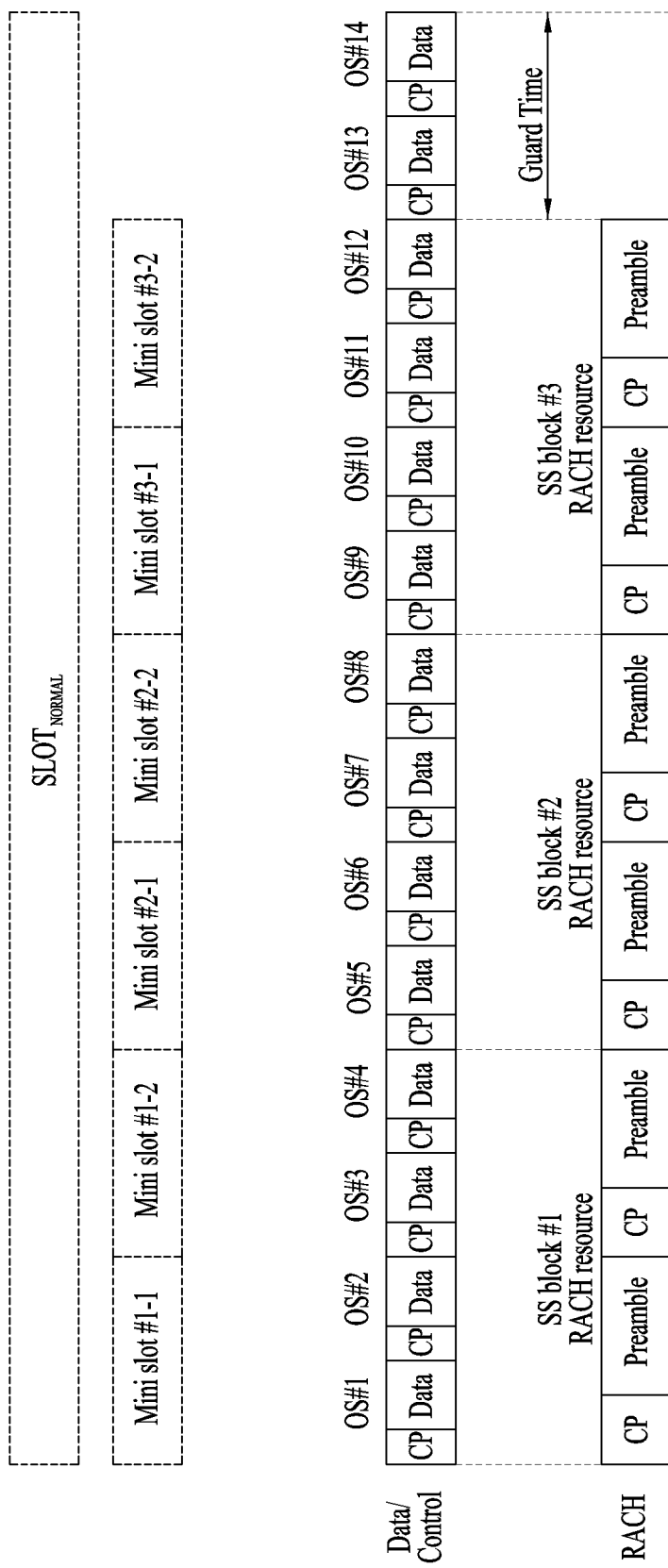
FIG. 12 illustrates another method of configuring a mini slot in a slot $SLOT_{RACH}$ for a RACH when BC is effective.

2) The case in which multiple mini slots are defined in a slot to which the RACH resource is allocated:

FIG. 12 illustrates another method of configuring a mini slot within a RACH slot $SLOT_{RACH}$ when BC holds.

When multiple mini slots are defined in a slot to which a RACH resource is allocated, this is basically similar to the case in which multiple mini slots are defined in a slot to which a RACH resource is allocated except that multiple mini slots are present in a slot to which one RACH resource is allocated. The same operation as the method proposed in FIG. 11 is performed. However, as illustrated in FIG. 12, a set of minimum OFDM symbols including a whole RACH resource is divided into a few subsets and each subset is defined as a mini slot. In this case, the gNB should first inform the UE of how the set of minimum OFDM symbols including a RACH resource should be divided to use the mini slots. For example, the gNB may indicate, in a bitmap form, how the minimum OFDM symbols including the RACH resource are divided to the UE. Alternatively, when the minimum OFDM symbols including the RACH resource can be divided into a plurality of equal subsets, the gNB may inform the UE of the number of allocated mini slots. In addition, the gNB should indicate, to the scheduled UE, through which mini slot among the multiple mini slots the UE should transmit the data/control channel. The gNB may directly indicate a mini slot through which the data/control channel should be transmitted through the DCI. Alternatively, when the UE is scheduled in a time region to which the RACH resource is allocated, the gNB may inform the UE of a mini slot to be used, in advance (e.g., during connection setup). Alternatively, it is possible to determine a mini slot to be used by a predetermined rule using information, such as a UE ID, which is shared between the UE and the gNB.

Figure 13:
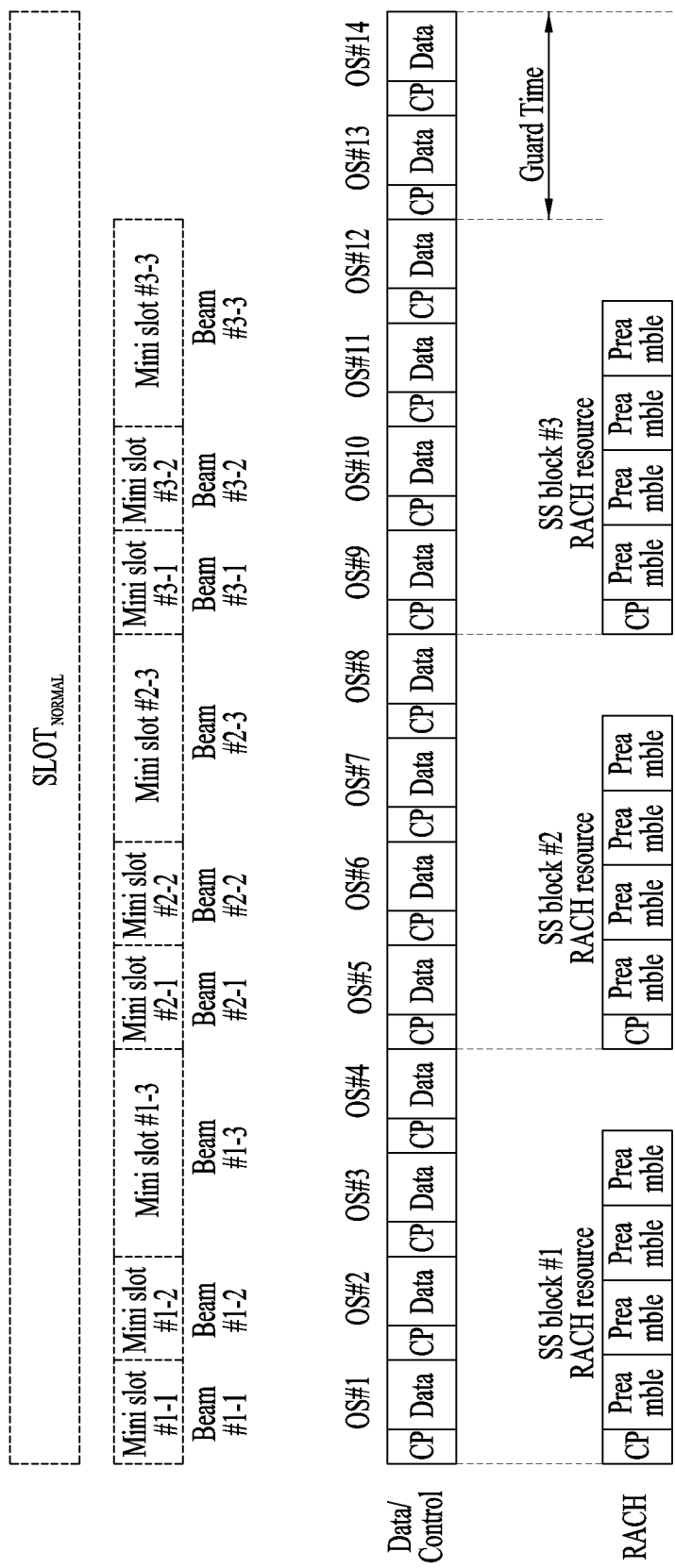
FIG. 13 illustrates a method of configuring a mini slot in a slot $SLOT_{RACH}$ for a RACH when BC is not effective.

3) The case in which BC does not hold and, thus, beam scanning is performed during preamble repetition:

FIG. 13 illustrates a method of configuring a mini slot within a RACH slot $SLOT_{RACH}$ when BC does not hold.

When BC does not hold, the gNB performs beam scanning while sweeping beam directions of a receiver in a slot to which one RACH resource is allocated, as described above. Therefore, this case may operate similarly to a scheme in which BC holds and multiple mini slots are present in a slot to which the RACH resource is allocated. To this end, similarly to the method described in FIG. 12, the gNB transmits, to the UE, information as to how beam scanning will be performed with respect to a set of minimum OFDM symbols including the RACH resource and information as to which SS block each beam is connected. This information may be used as information about which mini slot can be scheduled for the UE. In this case, similarly to the method described in FIG. 12, the UE may receive, through the DCI, the information about which mini slot among the multiple mini slots which can be scheduled for the UE is scheduled to transmit the data/control channel. Alternatively, the information may be prescheduled through an RRC signal or may be defined by a predefined rule using information shared between the gNB and the UE.

4) The case of grant-free scheduling:

A. When a time resource of a data/control channel transmitted by the UE on a grant-free resource overlaps a RACH resource, the data/control channel may be transmitted in a mini slot defined in a time region of the RACH resource. However, when grant-free scheduling is used and a signal format of the data/control channel that the UE is to transmit through the grant-free scheduling, i.e., through a grant-free resource, is a normal slot or a slot which is shorter than the normal slot but is longer than the mini slot defined in a RACH resource region and when the length of the mini slot is too short, so that a code rate of transmission of the data/control channel through the mini slot is too high relative to a designate code rate, the UE may i) drop transmission, ii) change a transport block size, or iii) transmit the data/control channel using multiple mini slots when the multiple mini slots are available. On the other hand, when the code rate of transmission of the data/control channel is lower than the designated code rate even if the data/control channel is transmitted with the length of the mini slot, the UE may transmit the data/control channel with a designated transport block size.

B. When grant-free scheduling is used and the signal format of the data/control channel that the UE is to transmit through the grant-free scheduling, i.e., through the grant-free resource, is shorter than the mini slot, the data/control channel may be normally transmitted at a mini slot location determined in the above-mentioned scheme. That is, if the data/control channel through grant-free scheduling requires a resource of a shorter length than the mini slot in the time domain, the UE transmits the data/control channel through a mini slot corresponding to the same gNB Rx beam as the data/control channel among mini slots configured to match the length of the RACH resource (i.e., RACH preamble). In this case, the transport block size may increase according to a predetermined rule in proportion to a mini slot length compared with a preconfigured signal format. For example, if the signal format in which the data/control channel is transmitted through grant-free scheduling is defined as using two OFDM symbols and the mini slot length in a RACH slot corresponds to three OFDM symbols, the transport block size capable of carrying the data/control channel of grant-free scheduling may increase by 1.5 times.

Figure 14:
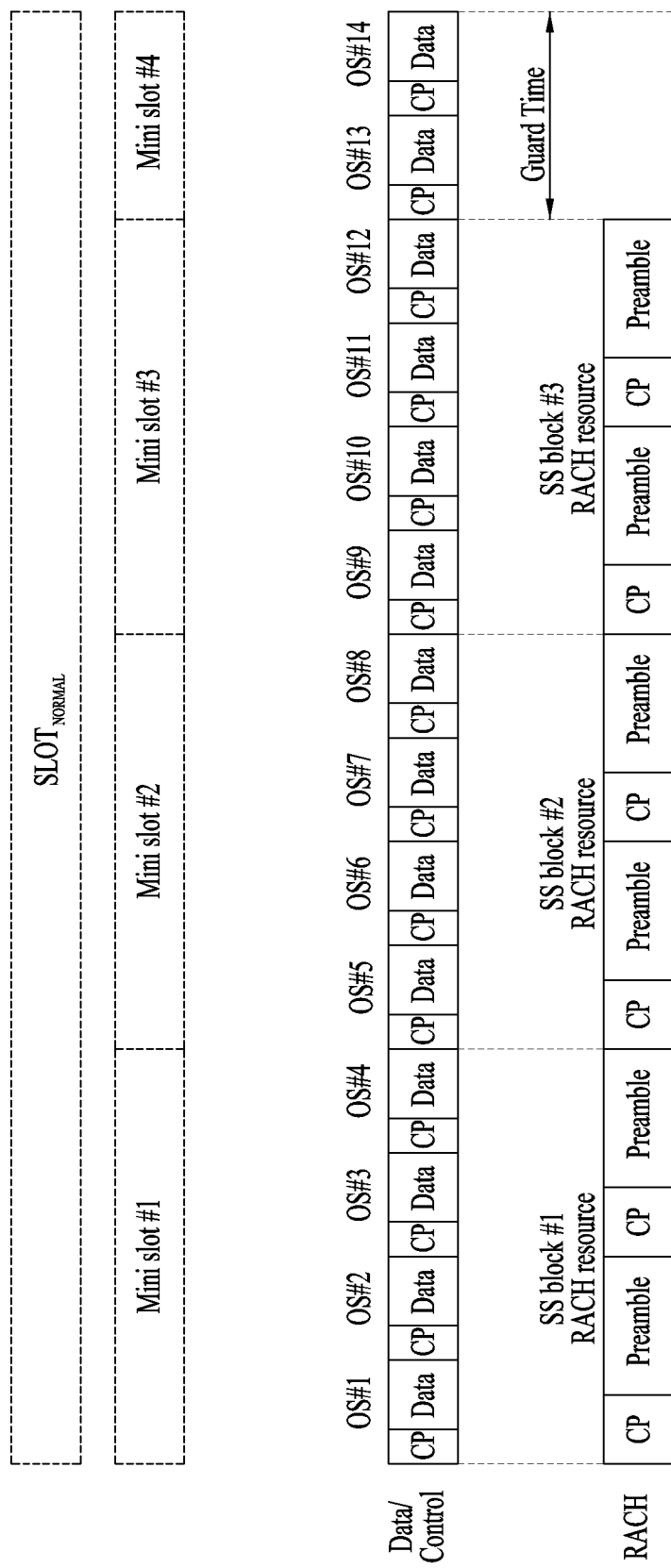
FIG. 14 illustrates a method of configuring a mini slot using a guard time.

5) Allocation of mini slot to guard time or blank duration:

FIG. 14 illustrates a method of configuring a mini slot using a guard time.

The gNB may freely configure an Rx beam with respect to a part of a duration configured as the guard time, or a blank duration in a slot remaining after configuring a RACH resource in one slot even though the blank duration is not for usage of the guard time. Accordingly, the gNB may inform the UE of information about a mini slot capable of being used independently of a beam for RACH resource reception together with information related to the RACH resource and the UE may expect that dynamic scheduling will be performed with respect to the mini slot configured in the guard time. The location(s) of allocated mini slot(s) may be determined by the above-described methods (e.g., methods of indicating the length and locations of mini slots configured in a RACH slot and a beam direction).

6) Allocation of short PUCCH resource:

In a TDD system, a control channel may be transmitted during a partial duration of one slot by configuring the control channel with a short length. In an NR system, schemes in which a DL control channel is transmitted in a front part of one slot and a UL control channel is transmitted in the last part of one slot are under discussion. Particularly, the UL control channel transmitted in this way is referred to as a short PUCHH. Since the short PUCCH is configured to be transmitted on the last one or two symbols, the short PUCCH may be transmitted in the above-described mini slot. However, as mentioned previously, since a beam direction may vary within one slot, the short PUCCH cannot always be located at the last part of the slot. Accordingly, when the short PUCCH is scheduled in a slot region to which a RACH resource is allocated, the UE transmits the short PUCCH in a mini slot in which a beam in the same direction as a beam from which the UE receives a service (i.e., a gNB Rx beam, or a UE Tx beam corresponding to the gNB Rx beam) or a beam in which the gNB previously forms a link for the short PUCCH (i.e., a gNB Rx beam, or a UE Tx beam corresponding to the gNB Rx beam) is present. In this case, the PUCCH may be transmitted at the last symbol location in the mini slot, a symbol location designated by the gNB through signaling, or a symbol location determined by a rule. However, the UE may drop transmission of the short PUCCH when the beam in the same direction as a beam from which the UE receives a service or the beam in which the gNB previously forms a link for the short PUCCH is not present.

Mini Slot Concatenation

In the procedure of forming the Rx beam for the RACH resource set, if Rx beam directions of respective RACH resources are not greatly different, the data or control channel may be transmitted through a long slot for performing transmission throughout a duration of the RACH resource set. This may be referred to as mini slot concatenation in which the above-described mini slots are used through concatenation as described above.

Figure 15:
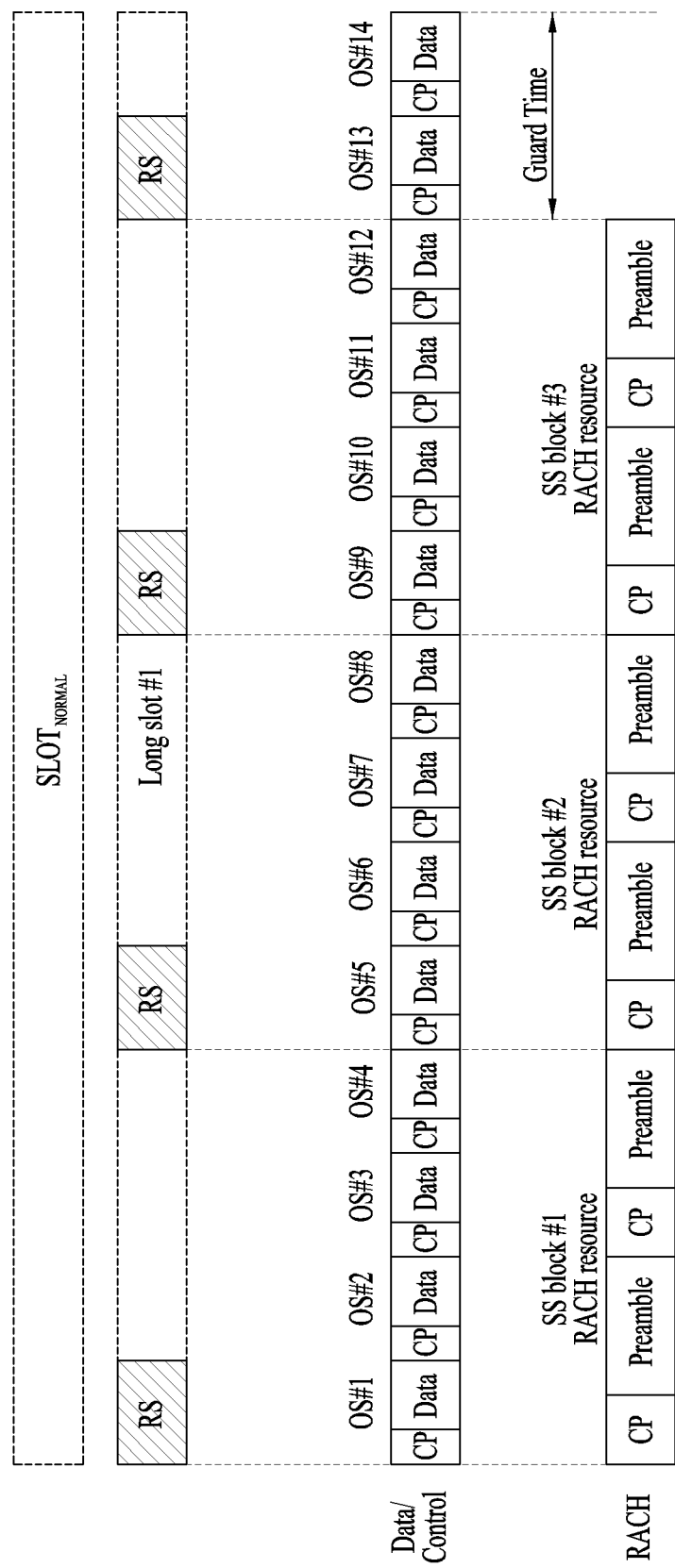
FIG. 15 illustrates an example of concatenating mini slots in the same length as a normal slot with an effective BC to transmit data.

FIG. 15 illustrates an example of transmitting data by performing mini slot concatenation with the same length as a normal slot when BC holds. Particularly, FIG. 15 illustrates transmission of concatenated mini slots and insertion of a reference signal during a RACH resource duration when BC holds. For example, one data packet may be transmitted throughout a long slot obtained by concatenating mini slots so that the long slot may have the same length as a normal slot. In this case, one data packet is dividedly transmitted in mini slots within the long slot.

Thus, in the case of data transmission using the concatenated mini slots, since the gNB forms an Rx beam of each RACH resource using information about an SS block transmission direction, the UE desirably transmits a signal in a direction capable of receiving each SS block with the best quality. Therefore, the gNB informs the UE of information related to Rx beam formation (e.g., information associated with the SS block) with respect to each OFDM symbol (when BC does not hold) or with respect to each RACH resource (when BC holds) in a RACH resource time region. In this case, smooth reception of the data channel may not be performed because the Rx beam of the gNB is changed during signal transmission while the UE performs signal transmission through concatenated mini slots and transmits a reference signal in a format defined for a normal slot. Therefore, it is necessary to insert the reference signal in a unit in which the Rx beam direction of the gNB varies in consideration of variation in the Rx beam direction of the gNB. To this end, a reference signal structure for the concatenated mini slots allocated in a RACH resource duration may be desirably defined. The UE to which the data or control channel of a concatenated mini slot format is allocated in the RACH resource duration should transmit the reference signal of the concatenated mini slot format.

During transmission of a PUSCH or a PUCCH, if one stable gNB Rx beam for a UE Tx beam direction of the PUSCH or the PUCCH is not present or a plurality of beams has similar quality, the PUSCH or a long PUCCH may be stably received by transmitting the PUSCH or the PUCCH through concatenated mini slots so as to use a beam diversity characteristic. In this case, the gNB may efficiently use a time resource to which a RACH resource is allocated by transmitting the PUSCH or the PUCCH in a RACH resource region.

Additionally, the gNB performs beam tracking for a Tx beam or an Rx beam so that a beam having the best quality is maintained as a serving beam in order to stably maintain a service in a multi-beam environment. Accordingly, the gNB may measure quality of the gNB Rx beam or the UE Tx beam and perform beam tracking by causing the UE to perform repetitive transmission of the PUSCH, the long PUCCH, or a short PUCCH in each RACH resource region or transmit an RS defined for beam tracking through a plurality of mini slots, using a characteristic in which the gNB changes the Rx beam in a slot duration to which the RACH resource is allocated. That is, for efficient use of a resource for beam tracking, the gNB may cause the UE to transmit a physical channel suitable for a characteristic for a time region to which the RACH resource is allocated and the gNB may use the physical channel as a resource for beam tracking. In other words, for efficient use of the resource for beam tracking, the gNB may indicate, to the UE, that the UE should transmit the physical channel through a UE Tx beam suitable for each of mini slot(s) configured in the time region to which the RACH resource is allocated and the gNB may use the physical channel in each mini slot for beam tracking. In order for the UE to efficiently transmit a signal for beam tracking, the gNB informs the UE of information about change in a beam direction as described above and the UE inserts a reference signal into each Rx beam of the gNB according to this information and a predefined rule and transmits the reference signal. The gNB may use the reference signal as a signal for channel estimation for an Rx beam duration or a signal for signal quality measurement for beam tracking.

Upon transmitting the PUSCH or the long PUCCH which is received in the gNB through beam diversity, since the gNB attempts to receive a signal in each Rx beam duration, antenna gain may have a different characteristic. Therefore, the UE may differently configure transmission power of the PUSCH/PUCCH with respect to each Rx beam direction (e.g., each RACH resource region). To this end, the gNB may inform the UE that reference channel/signal information and a power control parameter, for pathloss calculation used for open loop power control, should be separately configured with respect to each RACH resource region. The UE configures and transmits different transmission powers in a RACH resource time region using this information.

Unlike this, during transmission of a signal for beam tracking (or beam management) in a plurality of RACH resource regions, the respective RACH resource regions should maintain the same transmission power in order for a gNB to measure quality of a signal received by the gNB. In this case, only one reference channel/signal is needed for control of one power. If the gNB informs the UE of information about the reference channel/signal or the information is predefined by a rule, the UE may determine the magnitude of transmission power using the reference channel/signal and transmit the PUSCH/PUCCH by equally applying the transmission power to all regions.

The gNB may inform the UE of whether UL data or the control channel transmitted in a RACH resource transmission time region, i.e., a time region to which the RACH resource is configured in a corresponding cell, is used for beam diversity or for beam tracking with respect to each UL channel and cause the UE to perform a power control operation according to the above usage.

<PRACH Configuration>

PRACH configuration includes time/frequency information of a RACH resource and may be included in the remaining minimum system information (RMSI). The RMSI may be interpreted as a system information block 1 (SIB1) and represents system information that the UE should acquire after receiving a master system information block (MIB) through a physical broadcast channel (PBCH). Upon receiving the PRACH configuration information, the UE is able to transmit PRACH message 1 (Msg1) on a designated time and frequency resource using one preamble in a preamble set included in the PRACH configuration. A preamble format in the PRACH configuration information may also provide CP length, number of repetitions, subcarrier spacing, sequence length, etc.

Hereinafter, PRACH configuration will be described in detail.

1. RACH Resource Configuration in Time Domain

RACH resource configuration in the time domain will be described with reference to FIGS. 16 and 17. Here, RACH resources refer to time/frequency resources through which PRACH Msg. 1 can be transmitted. RACH preamble index configuration in RACH resources is described. RACH resources are associated with SS blocks to identify a preferred downlink Tx beam direction. That is, each RACH resource in the time domain is associated with an SS block index.

In addition, a RACH resource set in the time domain may be defined with respect to SS block default periodicity in a cell. A plurality of RACH resources associated with a single SS block may be within the RACH resource set in the time domain. Referring to FIG. 16, an SS block period and a RACH resource set period may be set as shown in FIG. 16. The RACH resource set period may be determined on the basis of the SS block period and a plurality of RACH resources may be configured in the RACH resource set period. The RACH resource set period may be set according to PRACH configuration information, as described above. In this case, the RACH resource set period may be identical to a PRACH configuration period. In the present disclosure, the PRACH configuration period, that is, the RACH configuration period may refer to a time period in which a set of RACH resources appears according to the corresponding RACH configuration.

Figure 16:
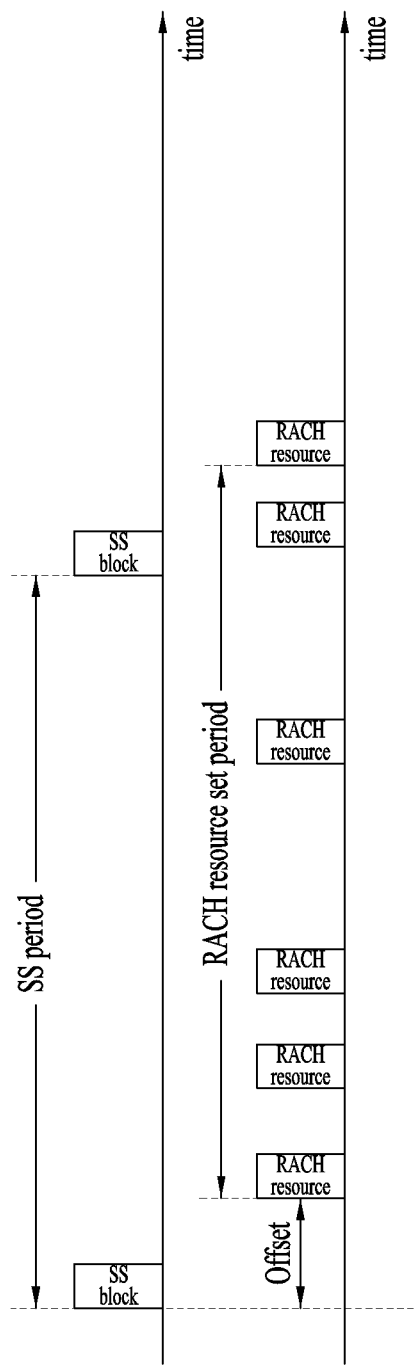

In FIG. 16, a time instance to which a RACH resource is allocated is called a RACH occasion. That is, one RACH resource may be called one RACH occasion when only the time domain and frequency domain are considered without a sequence domain. If the RACH resource set period is determined on the basis of the SS block period, a correct timing instance may be indicated as an offset from transmission timing of an SS block associated with the corresponding RACH resource. Correct positions of RACH occasions in a RACH resource set are also provided to UEs.

Figure 17:
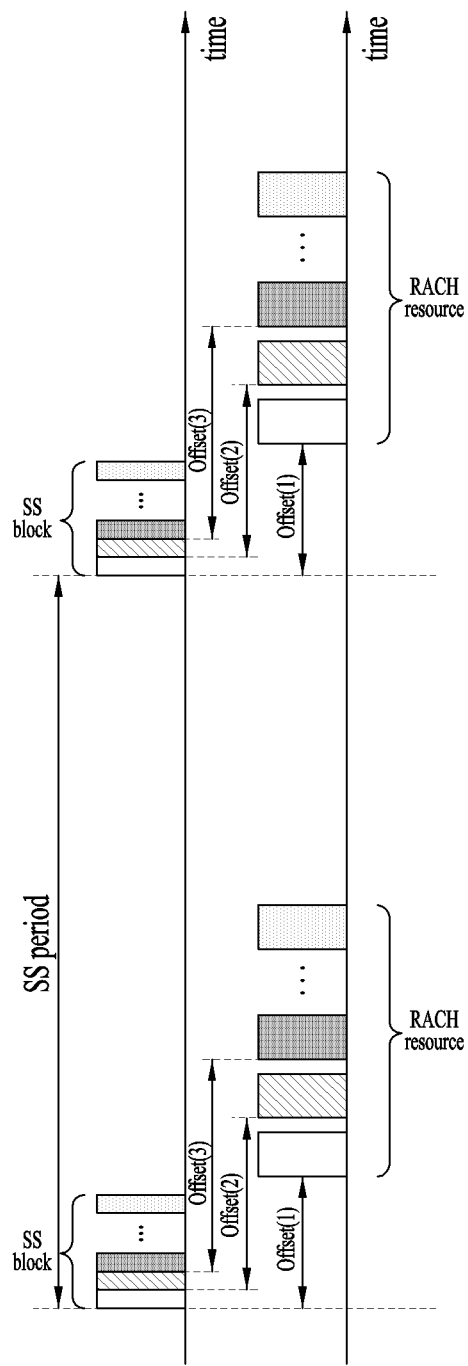

FIG. 17 illustrates a method of indicating association between SS blocks and RACH resources. Each RACH resource set is set using an SS block period. Since correct starting points of RACH resource sets corresponding to SS blocks in the time domain may be different, a timing offset between each SS block and a RACH resource set corresponding thereto may be signaled.

A RACH resource duration is determined by a PRACH preamble format. The length (e.g., preamble format) of a RACH preamble including a guard time is set according to cell coverage. In addition, the number of repetition of a preamble determines the RACH resource duration. Accordingly, RACH resource configuration includes the number of repetition of a RACH sequence for indicating a preamble length in addition to the RACH preamble format for a CP length.

As described above, an initial downlink beam acquisition procedure in an NR system using multiple beams is preferentially performed through detection of an SS block having highest reception quality. Accordingly, information about a downlink beam preferred by a UE is signaled to a gNB through an initial RACH procedure. Therefore, information about a beam index corresponding to an SS block detected by a UE may be indirectly signaled through the positions of resources for RACH preamble transmission in the NR system. For example, a RACH resource is linked to each SS block and a UE signals, to a gNB, information about a beam index in the form of a RACH resource linked to each SS block, as described above with reference to FIG. 5. That is, the UE may signal a preferred downlink beam, that is, SS block, to the gNB by transmitting a PRACH using the RACH resource associated with the SS block detected by the UE.

As described above, time/frequency resources of RACH resources are linked to SS blocks basically, and thus it is desirable to allocate RACH resources on the basis of a default SS block transmission period used in an initial access stage. However, when the number of UEs located in a cell of a gNB is small, RACH resources may be intermittently allocated compared to a default transmission period. Accordingly, the present disclosure proposes definition of a slot to which RACH resources are allocated as a RACH slot and allocation of a RACH slot period to a multiple of a default SS block transmission period. Although the above description is based on a multi-beam environment, it may be efficient to allocate RACH resources in the same manner in a single-beam environment in order to maintain the same structure. In addition, the RACH slot period may be associated with a RACH configuration period set by the aforementioned PRACH configuration information, and a period between RACH slots located at the same position within a RACH configuration period or having the same index may be identical to the RACH configuration period. Information about RACH time resources among RACH resource allocation information transmitted from a network/gNB to UEs may include the following.

1) An associated SS block index
2) The position of a RACH slot from an SS block
3) A RACH slot period represented by a multiple of an SS block period or a function of the SS block period
4) An offset value for indicating a correct position without ambiguity when a RACH slot period with respect to an SS block period is greater than 1. Here, the offset value is set on the basis of subframe number 0.

When time/frequency resources to which RACH resources are allocated are linked to SS blocks, the number of RACH resources in which a UE can perform RACH transmission may be identical to the number of SS blocks. Although RACH resources include time, frequency and code domain resources capable of carrying a RACH preamble in general, RACH resources are used as time/frequency resource blocks capable of carrying a RACH preamble in the present disclosure for convenience of description. However, RACH resources mentioned along with a preamble sequence may be used as a concept including a sequence domain, that is, a code domain. For example, when RACH resources are represented as sharing the same time/frequency resource, the RACH resources may correspond to a plurality of RACH resources when the sequence domain is also considered although they are one RACH resource from the viewpoint of time/frequency resources.

However, it may be inefficient to allocate different RACH resources to SS blocks in an environment in which the number of UEs located in a gNB is small. Accordingly, if the gNB is able to receive RACH preambles through the same Rx beam or simultaneously receive RACH preambles through a plurality of beams, the same time/frequency resource may be allocated for RACH resources linked to a plurality of SS blocks. That is, a plurality of SS blocks may be associated with a single RACH time-frequency resource. In this case, SS blocks with respect to a RACH resource may be discriminated by preamble indices or preamble index sets used in the RACH resource. That is, the number of RACH resources may be allocated to be less than or equal to the number of SS blocks.

The gNB determines a time/frequency domain to which RACH resources will be allocated and signals information thereabout to a UE through system information. In the case of LTE, one or two subframes constitute a RACH slot according to a preamble format and thus a UE can be aware of the position of a RACH resource in the time domain if the gNB designates a specific subframe position through PRACH configuration information. On the other hand, the NR system requires different types of information according to gNB configuration and environment. Particularly, a RACH preamble is set in such a manner that a short basic sequence is defined for robustness against a high Doppler frequency, Rx beam scanning, design conforming to TDD/FDD and the like and repeated for beam scanning and securing coverage. Accordingly, the position of a RACH time resource may be very variable depending on a gNB or environment. In addition, the NR system may be composed of a plurality of very small cells. In this case, the RACH preamble may become considerably short and thus a RACH slot in which a plurality of RACH preambles can be transmitted may be configured in the time domain. For example, RACH time resource information may be provided to UEs as illustrated in FIG. 18.

FIG. 18 illustrates RACH time resource information. Information about time resources of RACH resources, that is, PRACH time resource information, may include the following information.

1) A relative position of a RACH resource/slot with respect to an SS block position or a position of a RACH slot with respect to an SS period 2) The position of an OFDM symbol at which a RACH resource starts in a RACH slot 3) A preamble format (i.e., CP length and sequence length) with respect to a RACH resource and the number of repetition of a sequence and/or 4) Information about how many RACH resources defined as above will be allocated to a time axis. Information corresponding to the position of each of a plurality of RACH resources, for example, a relative position or an absolute position of each RACH resource when the RACH resources are allocated and are not consecutive on the time axis.

Meanwhile, even if RACH resources linked to a plurality of SS blocks share the same time/frequency resources, a UE needs to discriminate and transmit RACH preambles with respect to respective RACH resources linked to SS blocks for the same time/frequency resources in order to transfer beam acquisition information to the gNB. To this end, preamble sequences available in a single RACH resource need to be divided for SS blocks and allocated thereto. Preamble sequences in LTE and NR systems are composed of a root sequence which determines a basic sequence and combination of cyclically shifted sequences having zero correlation in each root sequence and an orthogonal cover sequence. Here, to improve resource efficiency, a plurality of root sequences may be allocated in order to secure a large number of preamble sequences within a RACH resource. In general, a cross correlation between root sequences is greater than cross correlation between sequences having different cyclic shift versions or sequences having different orthogonal cover sequences. Further, a signal received through a beam different from a beam suitable for a UE is weak due to beam characteristics, and thus cross correlation between corresponding sequences does not significantly affect RACH reception performance even if the cross correlation is slight large in a beam direction different from a beam direction for the UE. Accordingly, when a plurality of RACH resources shares the same time/frequency resource, it is desirable that each RACH resource be composed of preamble sequences having a small cross correlation. If RACH preamble sequences are composed of a root sequence and a combination of sequences having different cyclic shift versions or orthogonal cover sequences in the root sequence as in the above-described embodiment, preamble sequences having different cyclic shift versions in the same root sequence or preamble sequences having different orthogonal cover sequences in the same root sequence may be preferentially allocated to the same beam, that is, RACH resources linked to a single SS block, and then different root sequence indices may be allocated. For example, preamble sequences may be allocated to RACH time/frequency resources as illustrated in FIG. 19.

FIG. 19 illustrates an example of RACH preamble sequence allocation.

Referring to FIG. 19, root sequences {15, 27, 127, 138} are allocated to a single time/frequency resource and an orthogonal cover {0, 1} and a cyclic shift version {0, 1, 2, 3} are allocated to each root sequence. Here, when two RACH resources are allocated to the time/frequency resource, an OCC index and a ZC index composed of a cyclic shift version are preferentially allocated to a RACH resource linked to an N-th SS block, and a RACH preamble sequence set composed of two root sequences {15, 27} is allocated. A RACH preamble sequence set is allocated to a RACH resource linked to an (N+1)-th SS block in the same order. To signal RACH resources to a UE, a gNB signals information for configuring a RACH preamble sequence set per RACH resource and determines the order of RACH preamble sequences in the RACH preamble sequence set according to a predefined rule. Here, the predefined rule preferentially increases a RACH preamble sequence index for {OCC index, cyclic shift version} and then increases the next RACH preamble sequence index on the basis of a root sequence index. That is, the RACH preamble sequence index preferentially increases in ascending order of cross correlations between sequences.

2. RACH Resource Configuration in Frequency Domain

PRACH configuration may provide information about a frequency domain of a RACH resource. When a UE attempts PRACH transmission in a situation in which the UE has not yet been connected to a cell, the UE may not recognize the system bandwidth or resource block indexing.

In LTE, a UE can easily acquire a correct position of a RACH resource because a synchronization signal is transmitted at the center of the system bandwidth and a PBCH provides the system bandwidth. However, NR does not guarantee transmission of the synchronization at the center of the system bandwidth. Accordingly, a UE may not easily acquire resource block indexing for PRACH transmission in NR. Therefore, a method of providing a RACH resource position in the frequency domain is required.

Since UEs in an idle mode acquire frequency synchronization on the basis of an SS block, it is desirable that information about a frequency position of a RACH resource be provided with respect to an SS block bandwidth. That is, a RACH resource in the frequency domain needs to be positioned within an SS block bandwidth in which a UE detects an SS block. A RACH preamble transmission bandwidth has a value fixed in a default subcarrier spacing of 15 kHz of a PSS/SSS/PBCH. For example, the RACH preamble transmission bandwidth may be fixed to 1.08 MHz in the default subcarrier spacing of 15 kHz. In addition, when the RACH preamble transmission bandwidth is 1.08 MHz, an SS block transmission bandwidth on the assumption that a subcarrier spacing is 15 kHz is quadruple the RACH transmission bandwidth. A network needs to provide a correct RACH resource position in the frequency domain within an SS block.

If the network configures a RACH resource outside an SS block in which a PSS/SSS/PBCH is transmitted, information about the RACH resource needs to be signaled on the basis of the bandwidth of the SS block and the bandwidth of the RACH. Here, the system bandwidth is indexed in units of the SS block bandwidth.

3. The Number of Resources in Time Domain

A short ZC sequence is used as an NR PRACH preamble. The short ZC sequence may cause lack of sequences in a time resource defined as a provisional CP and RACH preamble. To solve this problem, a plurality of time and frequency resources may be allocated to RACH resources in a RACH slot and a gNB needs to signal the quantity of time resources used in the RACH slot in addition to frequency resource information to UEs.

4. Sequence Information

In LTE, 64 sequences are allocated to a RACH resource and, when a root code (i.e., root sequence) is allocated, the cyclic shift version of the root code is mapped to a preamble index first before other root codes are used due to the zero cross correlation characteristic.

The same characteristic may be reused in an NR-PRACH. Sequences having zero cross correlation may be preferentially allocated for a RACH preamble. Here, the zero cross correlation is provided according to a cyclic shift version and a defined orthogonal cover (when defined). When a root code is allocated, an orthogonal cover is allocated according to a predefined rule or settings and a cyclic shift version having the root code and the orthogonal cover is mapped to a preamble index.

In summary, PRACH configuration signaled by the gNB to UEs may include the following parameters.

RACH resource allocation in the time/frequency domain: a preamble format (a CP duration and the number of repetition of a ZC sequence)

Sequence information: a root code index, an orthogonal cover index (if defined), and a cyclic shift length 5. RACH Slot Pattern A plurality of slot patterns within a specific time interval in which RACH resources can be included is determined on the basis of RACH msg 1 subcarrier spacing.

(1) RACH Slot Pattern Configuration Method 1

When an SS block transmission period is 5 ms, all of first slots within the period of 5 ms are reserved for SS block transmission. If the SS block transmission period is 10 ms, the first slot of the first half frame with the period of 10 ms is reserved for SS block transmission.

Although NR defines slot positions for SS block transmission, that is, SS block candidate slot positions at which SS block transmission is possible, SS blocks are not transmitted at the candidate slot positions all the time. That is, the candidate slot positions are not reserved for SS block transmission all the time.

Meanwhile, a RACH slot pattern for RACH resources considerably depends on the candidate slot positions for SS block transmission. However, it is not efficient to define a RACH slot pattern depending only on the candidate slot positions for SS block transmission in terms of resource flexibility, and thus the RACH slot pattern needs to be defined in consideration of slots in which SS blocks are actually transmitted. Accordingly, the present disclosure defines a rule for RACH slot allocation for RACH resources as follows.

A slot in which SS blocks can be transmitted may be reserved for RACH resources according to actually transmitted SS blocks. Here, information about the actually transmitted SS blocks is signaled through RMSI.

Even if a RACH slot is reserved as RACH resources according to PRACH configuration, the RACH slot may not be used as RACH resources according to an SS block transmission period.

Even though RACH slots are reserved as RACH resources according to PRACH configuration, a RACH slot signaled as a slot in which SS blocks are actually transmitted through RMSI may not be used as RACH resources.

Since the positions of actually transmitted SS blocks are determined according to selection of the network, corresponding information is signaled to UEs through RMSI but it is difficult to define a single RACH slot pattern fixed for RACH resources according to actually transmitted SS block patterns and different SS block transmission periods. Accordingly, a rule for defining a RACH slot pattern may be defined such that information about an actually transmitted SS block has precedence over RACH resource configuration.

A RACH slot configuration duration for RACH resources may be 10 ms/20 ms and is determined in consideration of network operation and load. In addition, to support RACH slot pattern configuration for RACH resources which has a longer period such as 80 ms or 160 ms, the network needs to provide a RACH slot pattern period on the basis of a basic slot pattern such as a 20 ms slot pattern.

Specifically, a slot pattern which may include RACH resources may be configured irrespective of candidate slot positions in which SS blocks may be transmitted or configured at a candidate slot position in which SS blocks may be transmitted.

Figure 20:
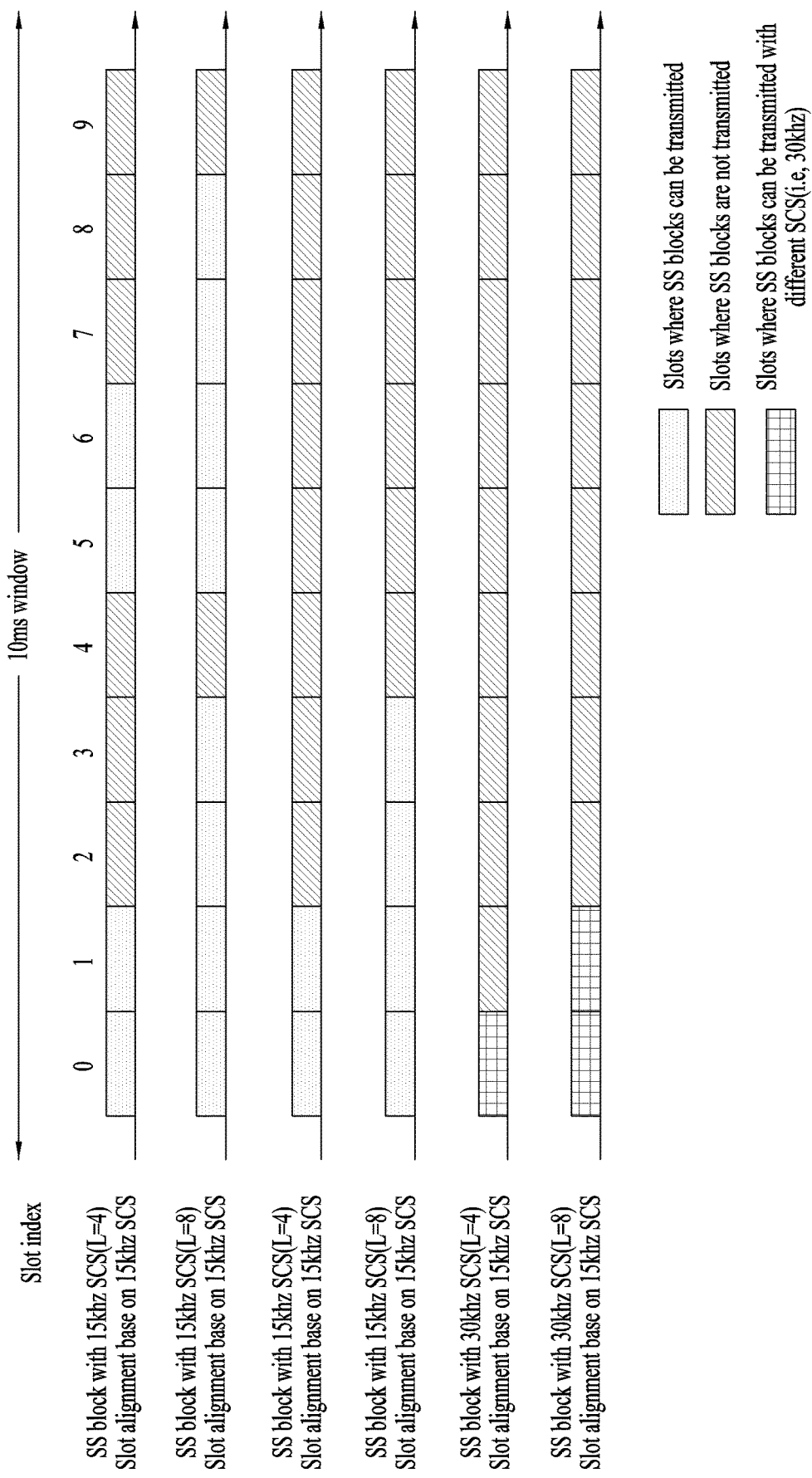

FIG. 20 illustrates candidate slot positions where SS blocks can be transmitted within a 10 ms window in bands of 6 GHz or less. Subcarrier spacing available for SS block transmission at 6 GHz or less is 15 kHz and 30 kHz and the number of slot positions where SS blocks can be transmitted is a maximum of 8.

If a long sequence having a subcarrier spacing of 1.25 kHz or 5 kHz is used for RACH preamble transmission at 6 GHz, RACH slot pattern configuration that may be reserved as RACH resources may be set on the basis of a slot having a length of 1 ms. Table 8 shows examples of RACH slot pattern configurations set on the basis of the slot having a length of 1 ms, as described above.

Meanwhile, accurate information about the RACH preamble format used in Table 8 may be separately signaled.

TABLE 8

| Slot pattern configuration index | Preamble format | System frame number | Subframe (or slot) number |
|---|---|---|---|
| 0 | 0, 1, 3 | Even | 0 |
| 1 | 0, 1, 3 | Even | 1 |
| 2 | 0, 1, 3 | Even | 2 |
| 3 | 0, 1, 3 | Even | 3 |
| 4 | 0, 1, 3 | Even | 4 |
| 5 | 0, 1, 3 | Even | 5 |
| 6 | 0, 1, 3 | Even | 6 |
| 7 | 0, 1, 3 | Even | 7 |
| 8 | 0, 1, 3 | Even | 8 |
| 9 | 0, 1, 3 | Even | 9 |
| 10 | 0, 1, 3 | Any | 1 |
| 11 | 0, 1, 3 | Any | 2 |
| 12 | 0, 1, 3 | Any | 3 |
| 13 | 0, 1, 3 | Any | 4 |
| 14 | 0, 1, 3 | Any | 5 |
| 15 | 0, 1, 3 | Any | 6 |
| 16 | 0, 1, 3 | Any | 7 |
| 17 | 0, 1, 3 | Any | 8 |
| 18 | 0, 1, 3 | Any | 9 |
| 19 | 0, 1, 3 | Even | 1, 5 |
| 20 | 0, 1, 3 | Even | 1, 6 |
| 21 | 0, 1, 3 | Even | 2, 7 |
| 22 | 0, 1, 3 | Even | 3, 8 |
| 23 | 0, 1, 3 | Even | 4, 9 |
| 24 | 0, 1, 3 | Any | 1, 6 |
| 25 | 0, 1, 3 | Any | 2, 7 |
| 26 | 0, 1, 3 | Any | 3, 8 |
| 27 | 0, 1, 3 | Any | 4, 9 |
| 28 | 0, 1, 3 | Even | 0, 3, 7 |
| 29 | 0, 1, 3 | Even | 1, 4, 8 |
| 30 | 0, 1, 3 | Even | 2, 4, 7 |

TABLE 8-continued

| Slot pattern configuration index | Preamble format | System frame number | Subframe (or slot) number |
|---|---|---|---|
| 31 | 0, 1, 3 | Even | 3, 6, 8 |
| 32 | 0, 1, 3 | Even | 4, 7, 9 |
| 33 | 0, 1, 3 | Any | 1, 3, 6 |
| 34 | 0, 1, 3 | Any | 2, 4, 7 |
| 35 | 0, 1, 3 | Any | 3, 7, 9 |
| 36 | 0, 1, 3 | Any | 4, 7, 9 |
| 37 | 0, 1, 3 | Even | 2, 4, 7, 9 |
| 38 | 0, 1, 3 | Any | 2, 4, 7, 9 |
| 39 | 2 | Even | 0, 1, 2, 3 |
| 40 | 2 | Even | 5, 6, 7, 8 |
| 41 | 2 | Even | 0, 1, 2, 3, 5, 6, 7, 8 |
| 42 | 2 | Any | 3, 4, 5, 6 |
| 43 | 2 | Any | 4, 5, 6, 7 |
| 44 | 2 | Any | 5, 6, 7, 8 |
| ... | ... | ... | ... |

A RACH slot pattern in the case of a short sequence needs to be determined on the basis of the subcarrier spacing of Msg 1 in consideration of alignment with a PUSCH slot boundary having a subcarrier spacing of a RACH preamble such as 15/30/60/120 kHz. Determining a RACH slot pattern on the basis of the subcarrier spacing of Msg 1 means that RACH slot pattern information is determined using a slot length determined by the subcarrier spacing of Msg 1 as a base unit and signaled to UEs. The subcarrier spacing of Msg 1 is 15/30 kHz at 60 GHz or less and 60/120 kHz at 6 GHz or higher.

The subcarrier spacing of SS blocks may differ from the subcarrier spacing of Msg 1. For example, in bandwidths of 6 GHz or less, the subcarrier spacing of SS blocks may be 15 kHz and the subcarrier spacing of Msg 1 is 30 kHz or the subcarrier spacing of SS blocks may be 30 kHz and the subcarrier spacing of Msg 1 is 15 kHz. Similarly, the subcarrier spacing of SS blocks may be 120 kHz and the subcarrier spacing of Msg 1 is 60 kHz or the subcarrier spacing of SS blocks may be 240 kHz and the subcarrier spacing of Msg 1 is 120 kHz.

Meanwhile, the RACH slot pattern relates to uplink slot configuration information and thus needs to have at least resolution of Msg 1 numerology. Accordingly, the RACH slot pattern for RACH resources needs to be determined on the basis of the subcarrier spacing of Msg 1 in consideration of a slot/time duration in which SS blocks can be transmitted irrespective of the subcarrier spacing of SS blocks. In addition, as described above, the principle of RACH resource allocation considering SS block allocation may be defined such that information about actually transmitted SS blocks has precedence over RACH resource configuration as discussed above with respect to the long sequence based RACH preamble.

Furthermore, in the case of a RACH preamble format having a subcarrier spacing of 15 kHz, a RACH slot duration is determined on the basis of the subcarrier spacing of 15 kHz. That is, in this case, the RACH slot duration is 1 ms and thus a RACH preamble having the subcarrier spacing of 15 kHz may have a RACH slot pattern disposed in at least one symbol (preferably, two or more symbols) in a slot of 1 ms. In addition, since the RACH slot duration based on the subcarrier spacing of 15 kHz is 1 ms, the RACH slot pattern based on the subcarrier spacing of 15 kHz may be used as a RACH slot pattern for a long sequence, which is defined with respect to the slot of 1 ms.

That is, a slot pattern for the RACH preamble format having the subcarrier spacing of 15 kHz may use the same pattern as the RACH preamble format having a long sequence, as shown in Table 8.

In addition, in the case of a RACH preamble format having a subcarrier spacing of 30 kHz, a RACH slot duration is determined on the basis of the subcarrier spacing of 30 kHz. That is, the RACH slot duration is 0.5 ms and 20 slots are included per radio frame. Similarly, in the case of a RACH preamble format having a subcarrier spacing of 60 kHz, a RACH slot pattern includes a 0.25 ms slot, that is, 40 slots per radio frame. In the case of a RACH preamble format having a subcarrier spacing of 120 kHz, a RACH slot pattern is determined on the basis of 80 slots per radio frame. Accordingly, the RACH slot pattern may be specified according to a subcarrier spacing of a RACH preamble. In other words, M states need to be specified according to the subcarrier spacing of the RACH preamble, and the states according to the subcarrier spacing have different RACH slot frequencies (the numbers of RACH slots in a specific time period) and/or periodicities.

Alternatively, a basic slot pattern such as a RACH slot pattern for the subcarrier spacing of 15 kHz may be used for a wider subcarrier spacing by being repeated in the time domain.

This method reuses the above-described RACH slot pattern based on a slot having a length of 1 ms and reduces the slot length according to the subcarrier spacing through a scale down method to configure a pattern. For example, when the subcarrier spacing is 30 kHz, the slot length is reduced to 0.5 ms and 20 slots are included in a radio frame. That is, in the case of RACH slot pattern configuration index 0 in Table 8, slot index 0 is reserved for a RACH resource in frames having even numbers. That is, it is assumed that a RACH slot pattern base includes 10 slots in a radio frame of 10 ms. When this is scaled into a slot having a subcarrier spacing of 30 kHz, two groups of 10 slots are present in a radio frame of 10 ms. That is, two slot patterns having 10 slots as a RACH slot pattern base are present in the corresponding time duration (10 ms). Here, a slot actually allocated to RACH resources may be signaled in units of a RACH slot pattern base. For example, a slot allocated to RACH resources may be specified by signaling a bitmap per even-numbered system frame number as follows.

"11": Patterns of 10 slots in two groups repeated in a radio frame of 10 ms are effective as a RACH slot pattern for RACH resources.

"10": Only first pattern of the patterns of 10 slots in two groups repeated in the radio frame of 10 ms is effective as a RACH slot pattern for RACH resources.

"01": Only second pattern of the patterns of 10 slots in two groups repeated in the radio frame of 10 ms is effective as a RACH slot pattern for RACH resources.

Similarly, when the aforementioned RACH slot pattern base is scaled into a slot having a subcarrier spacing of 60 kHz, four groups of 10 slots are present in a radio frame of 10 ms. Four RACH slot patterns having 10 slots as a RACH slot pattern window are present in the corresponding time duration (10 ms). In the case of a slot having a subcarrier spacing of 120 kHz, 8 RACH slot patterns are present.

That is, RACH slot pattern configuration is configured first on the basis of the subcarrier spacing of 15 kHz, a plurality of slot patterns may be repeated within a base time (e.g., 10 ms) as the subcarrier spacing which determines the slot length of the RACH slot pattern increases, and any one of N repeated slot groups which is actually used for RACH resources may be signaled in the form of a bitmap or the like.

(2) RACH Slot Pattern Configuration Method 2

Since a RACH preamble for a long sequence has a length of at least 1 ms, a RACH slot pattern needs to be configured with respect to a slot having a length of 1 ms. FIG. 20 shows positions of slots in which SS blocks can be transmitted within a window of 10 ms at 6 GHz or lower. Referring to FIG. 20, however, positions of candidate slots in which SS blocks can be transmitted are defined but the candidate slots are not always reserved for SS blocks. In addition, a RACH slot pattern for RACH resources considerably depends on a slot position for SS block transmission. Accordingly, it is practically difficult to define the RACH slot pattern in consideration of slots in which SS blocks are transmitted. Therefore, the present disclosure proposes slot allocation for RACH resources in consideration of a maximum number of SS blocks which can be transmitted according to bandwidth.

TABLE 9

|  | 5 ms SSB periodicity | 10 ms SSB periodicity |
|---|---|---|
| SSB with 15 kHz SCS, L = 4 | 2, 3, 4, 7, 8, 9 | 2, 3, 4, 5, 6, 7, 8, 9 |
| SSB with 15 kHz SCS, L = 8 | 4, 9 | 4, 5, 6, 7, 8, 9 |
| SSB with 30 kHz SCS, L = 4 | 1, 2, 3, 4, 5, 6, 7, 8, 9 | 1, 2, 3, 4, 5, 6, 7, 8, 9 |
| SSB with 30 kHz SCS, L = 8 | 2, 3, 4, 7, 8, 9 | 2, 3, 4, 5, 6, 7, 8, 9 |

Table 9 shows RACH slot indices for RACH resources in a radio frame at 6 GHz or lower. A method of supporting a maximum number of RACH resources corresponding to a maximum number of SS blocks is described with reference to Table 9. CDM/FDM is mainly used at 6 GHz or lower, and thus RACH resources may be discussed in consideration of an SS block transmission period of 5 ms and a RACH resource pattern may be configured in a 10 ms/20 ms duration.

Meanwhile, to support RACH resource allocation within an 80 ms/160 ms window, an offset value with respect to a RACH resource starting position may be determined on the basis of a basic time duration such as 10 ms or 20 ms.

In the case of a short sequence, a RACH slot pattern needs to be determined on the basis of the subcarrier spacing of Msg 1 in consideration of alignment with a boundary of a PUSCH slot having a subcarrier spacing of a RACH preamble such as 15/30/60/120 kHz. In the case of the subcarrier spacing of Msg 1, a subcarrier spacing of 15/30 kHz is used at 6 GHz or lower and a subcarrier spacing of 60/120 kHz is used at 6 GHz or higher.

A subcarrier spacing of SS blocks may differ from the subcarrier spacing of Msg 1. For example, a subcarrier spacing of SS blocks may be 15 kHz and the subcarrier spacing of Msg 1 may be 30 kHz or the subcarrier spacing of the SS blocks may be 30 kHz and the subcarrier spacing of Msg 1 may be 15 kHz in bandwidths of 6 GHz or lower. Similarly, SS blocks having a subcarrier spacing of 120 kHz and Msg 1 having a subcarrier spacing of 60 kHz may be transmitted or SS blocks having a subcarrier spacing of 240 kHz and Msg 1 having a subcarrier spacing of 120 kHz may be transmitted in bandwidths of 6 GHz or higher. Meanwhile, the RACH slot pattern relates to uplink slot configuration information and thus needs to be configured on the basis of resolution of Msg 1 numerology. Accordingly, the RACH slot pattern for RACH resources needs to be determined on the basis of the subcarrier spacing of Msg 1 in consideration of a slot/time duration in which SS blocks can be transmitted irrespective of the subcarrier spacing of SS blocks. Here, determination of the RACH slot pattern on the basis of the subcarrier spacing of Msg 1 means that RACH slot pattern information is determined using a slot length determined by the subcarrier spacing of Msg 1 as a base unit and signaled to UEs.

In addition, in the case of a RACH preamble format having a 15 kHz subcarrier spacing, the length of a RACH slot is determined on the basis of the 15 kHz subcarrier spacing. In this case, the length of the RACH slot is 1 ms and thus the RACH preamble having the 15 kHz subcarrier spacing may have a RACH slot pattern disposed in at least one symbol (preferably, two or more symbols) within a 1 ms slot. Further, since the length of the RACH slot based on the 15 kHz subcarrier spacing is 1 ms, the RACH slot pattern based on the 15 kHz subcarrier spacing may be used as a RACH slot pattern for a long sequence for which a RACH slot pattern is defined with respect to a slot having a length of 1 ms.

Figure 21:
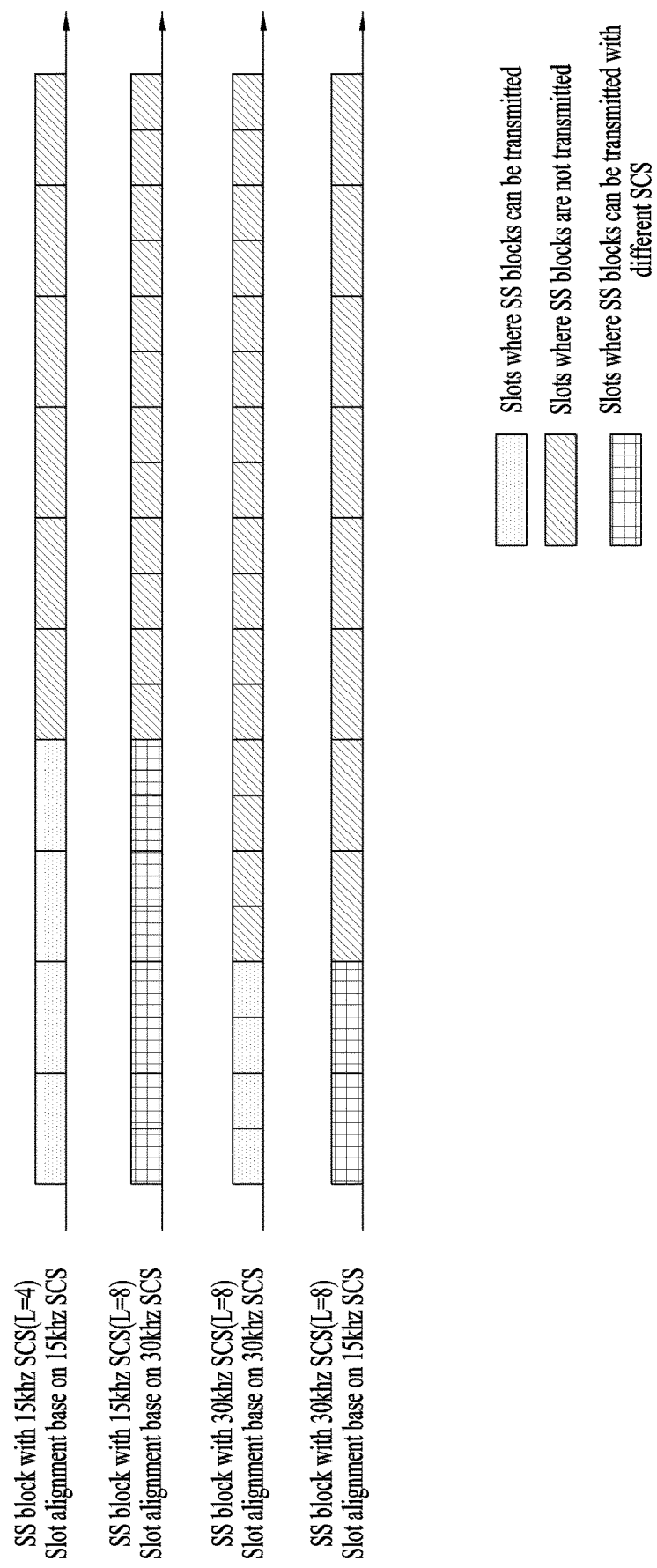

In addition, in the case of a RACH preamble format having a 30 kHz subcarrier spacing, a RACH slot length is determined on the basis of the 30 kHz subcarrier spacing. That is, the RACH slot length if 0.5 ms and includes 20 slots per radio frame. FIG. 21 shows positions of slots in which SS blocks can be transmitted in bandwidths of 6 GHz or lower. The position of a slot for RACH resources in a radio frame may be determined as shown in Table 10 on the basis of a subcarrier spacing of SS blocks and the subcarrier spacing of Msg 1.

TABLE 10

|  | Msg 1 with 15 kHz SCS, 10 ms SSB periodicity | Msg 1 with 30 kHz SCS, 10 ms SSB periodicity |
|---|---|---|
| SSB with 15 kHz SCS, L = 8 | 4, 5, 6, 7, 8, 9 | 8~19 |
| SSB with 30 kHz SCS, L = 8 | 4~19 | 2~9 |

Figure 22:
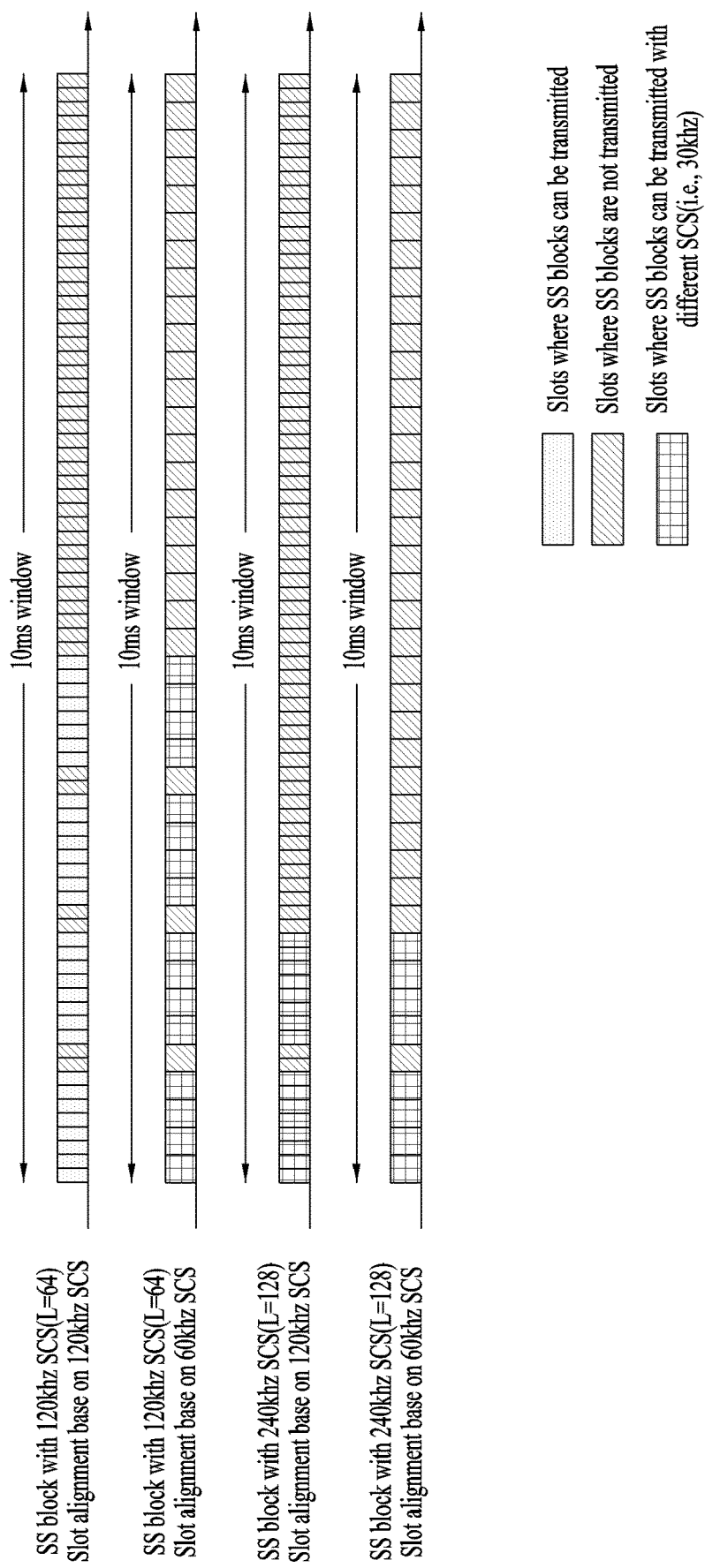

The RACH slot pattern is based on a slot having a length of 0.25 ms and inclusion of 40 slots per radio frame when a 60 kHz subcarrier spacing is used and based on a slot having a length of 0.125 ms and inclusion of 80 slots per radio frame when a 120 kHz subcarrier spacing is used. Accordingly, the RACH slot pattern varies according to the subcarrier spacing of the RACH preamble. FIG. 22 shows positions of slots in which SS blocks can be transmitted on the basis of a subcarrier spacing of SS blocks and the subcarrier spacing of Msg 1. The position of a slot for RACH resources may be determined as shown in Table 11 on the basis of the subcarrier spacing of SS blocks and the subcarrier spacing of Msg 1.

TABLE 11

|  | Msg 1 with 60 kHz SCS, 10 ms SSB periodicity | Msg 1 with 120 kHz SCS, 10 ms SSB periodicity |
|---|---|---|
| SSB with 120 kHz SCS, L = 64 | 4, 9, 14, 19-39 | 8, 9, 18, 19, 28, 29, 38-79 |
| SSB with 240 kHz SCS, L = 128 | 4, 9-39 | 8, 9, 18-79 |

In summary, M states per subcarrier spacing for the RACH preamble need to be specified and the respective states according to the subcarrier spacing may have different RACH slot frequencies and/or periods.

6. Priority Between ATSS (Actual Transmitted Synchronization Signal) and RACH Resource Hereinafter, methods for solving problems in a case in which an SS block is actually transmitted (hereinafter, an actually transmitted SS block is referred to as "ATSS") in a specific slot included in a RACH slot pattern for RACH resource configuration or a case in which an ATSS is generated for a duration corresponding to a specific RACH slot pattern within a PRACH configuration window or a PRACH configuration period are proposed.

Collision between RACH resources and an ATSS may occur in both the above-described RACH slot pattern configuration methods 1 and 2. A difference between the two methods is that collision with an ATSS occurs in units of a slot in method 1 whereas collision occurs according to SS block transmission period in method 2.

To solve such a problem more efficiently, the aforementioned RACH slot pattern configuration table may be configured using m specific slots, for example, 10 or 20 slots, as a basic unit, distinguished from the Table 8 for configuring a RACH slot pattern in which a RACH slot configuration index varies according to the system frame number corresponding to the third column is an even number.

Here, a base for RACH slot pattern configuration may vary according to the RACH preamble format, the subcarrier spacing of Msg 1 and the length of a slot constituting a RACH slot pattern. For example, the base for RACH slot pattern configuration may be 10 slots in the case of a 1 ms slot and 20 slots in the case of a 0.25 ms slot. Hereinafter, it is assumed that a unit length which determines a RACH slot pattern is referred to as a RACH slot pattern base and the RACH slot pattern base is designated by the number of slots rather than an absolute time unit, that is, ms.

When the RACH slot pattern base for RACH resource configuration is configured similarly to Table 8, Table 12 is obtained.

TABLE 12

| Slot pattern configuration index | Subframe (or slot) number | Slot pattern configuration index | Subframe (or slot) number | Slot pattern configuration index | Subframe (or slot) number |
|---|---|---|---|---|---|
| 0 | 0 | 13 | 3, 8 | 26 | 3, 4, 5, 6, |
| 1 | 1 | 14 | 4, 9 | 27 | 4, 5, 6, 7 |
| 2 | 2 | 15 | 1, 3, 7 | 28 | 5, 6, 7, 8 |
| 3 | 3 | 16 | 0, 4, 8 | 29 | 6, 7, 8, 9 |
| 4 | 4 | 17 | 2, 4, 7 | 30 | 0, 1, 2, 3, 4, 5, 6, 7 |
| 5 | 5 | 18 | 3, 6, 8 | 31 | 2, 3, 4, 5, 6, 7, 8, 9 |
| 6 | 6 | 19 | 4, 7, 9 | ... | ... |
| 7 | 7 | 20 | 0, 2, 4, 6 | | |
| 8 | 8 | 21 | 1, 3, 5, 7 | | |
| 9 | 9 | 22 | 2, 4, 6, 8 | | |
| 10 | 0, 5 | 23 | 3, 5, 7, 9 | | |
| 11 | 1, 6 | 24 | 0, 1, 2, 3, | | |
| 12 | 2, 7 | 25 | 2, 3, 4, 5 | | |

A difference between Table 8 and Table 12 is that the RACH slot pattern configuration table is configured in units of a RACH slot pattern base length. That is, one or more RACH slot pattern bases may be repeated in an actual RACH resource configuration window. The RACH resource configuration window designates a time duration in which RACH resources are configured and RACH resource configuration is repeated per window. For example, if the RACH resource configuration window is composed of 40 slots while the RACH slot pattern base is 10 slots, a RACH slot pattern base of 10 slots is repeated four times during 40 slots. Here, all the four repeated RACH slot pattern bases may be allocated to RACH resources or only some thereof may be allocated to RACH resources. That is, the number of a RACH slot pattern base allocated to RACH resources among four RACH slot pattern bases #0, #1, #2 and #3 may be signaled. For example, When all RACH slot pattern bases are allocated: 1111

When only some of the RACH slot pattern bases are allocated to RACH resources: the number of a RACH slot pattern base actually allocated to RACH resources is directly signaled (e.g., when RACH slot pattern bases #1 and #3 are allocated to RACH resources: 0101)

When it is determined whether a specific RACH slot pattern base is allocated to RACH resources and the specific RACH slot pattern base is signaled, the SS block transmission period also needs to be considered. For example, when the RACH slot length is 1 ms and the SS block transmission period is 20 ms in the above-described embodiment, RACH resources may not be configured in a duration corresponding to frames in which SS blocks are transmitted. More specifically, RACH slot pattern bases #0, #1, #2 and #3 may be mapped to zeroth, first, second and third frames each having a length of 10 ms. When SS blocks are transmitted in frames #0 and #2, RACH slot pattern bases #0 and #2 are excluded from RACH resource configuration and a RACH slot pattern for RACH resources is applied to frames #1 and #3. However, when the SS block transmission period if 40 ms, the zeroth frame is excluded from RACH resource configuration and the first, second and third frames may be configured as RACH resources. Additional signaling is required for frames which are not configured as RACH resources.

When the PRACH configuration window has a length of an integer multiple of a RACH slot pattern base, which is greater than 1, if the number of a RACH slot pattern base effective for RACH resources among repeated RACH slot pattern bases is signaled, a UE recognizes that RACH resources are configured only in a duration to which the RACH slot pattern base is applied and does not recognize other durations as RACH resources.

In other words, when a part of a RACH slot pattern base duration effective for use of RACH resources overlaps with an ATSS, 1) The entire RACH slot pattern base duration is not used as RACH resources. Even in this case, however, when an effective RACH slot pattern base which does not overlap with an ATSS in the PRACH configuration window is additionally present, this RACH slot pattern base may be used.

2) A half frame or a frame in which an ATSS is included in units of a half frame in the corresponding RACH slot pattern base duration is not used as RACH resources and a half frame or a frame in which an ATSS is not included is used as RACH resources. Particularly, when a plurality of RACH slot pattern bases is present within the PRACH configuration window and the SS block transmission period is longer than the RACH slot pattern base length, this method can be applied.

3) A slot in which an ATSS is included in the corresponding RACH slot pattern base duration is not used as RACH resources and a slot in which an ATSS is not included may be used as RACH resources. Particularly, when only one RACH slot pattern base is present in the PRACH configuration window and the SS block transmission period is equal to the RACH slot pattern base length, this method must be used.

4) Which one of the above methods 1), 2) and 3) will be employed to use RACH resources while avoiding collision with an ATSS needs to be additionally signaled or appointed, and the three methods may be combined/selected according to conditions/environments.

The method of signaling a RACH slot pattern for RACH resource configuration on the basis of the subcarrier spacing of Msg 1 in the case of a short sequence and signaling the RACH slot pattern on the basis of the length (1 ms) of a slot configured on the basis of a subcarrier spacing of 15 kHz in the case of a long sequence has been proposed. In addition, in the case of Msg 1 based on a short sequence, the RACH slot pattern is configured using Msg 1 for slot boundary alignment for PUSCH transmission. This may be interpreted to mean that transmission of a PUSCH such as Msg 3 needs to conform to the subcarrier spacing of Msg 1. The subcarrier spacing of Msg 1 may become different from the subcarrier spacing of Msg 3 for various reasons. Furthermore, the network may set a default numerology or a reference numerology such as a subcarrier spacing or a slot length for operations such as a fallback mode. In this case, a RACH slot pattern for RACH resource configuration needs to be determined on the basis of the default numerology or reference numerology. The default numerology or reference numerology may be signaled by the network to UEs as PRACH configuration or system information. In addition, the default numerology or reference numerology may be directly designated as a specific value or may be connected to a numerology of a RACH slot which determines a slot pattern for RACH resource configuration per subcarrier spacing of Msg 1.

7. Association Between RACH Resource and SS Block Index

Hereinafter, a method of signaling a Tx beam direction of a gNB and connection information about RACH resources to UEs in an initial access state will be described in detail. The Tx beam direction of the gNB refers to a beam direction of SS blocks as described above. Additionally, when a UE can observe/measure a specific RS other than SS blocks in the initial access state, the Tx beam direction may refer to the RS. For example, the specific RS may be a CSI-RS.

In NR, a plurality of SS blocks may be formed and transmitted according to the number of beams of a gNB. In addition, each SS block may have a unique index and a UE may infer the index of an SS block including a PSS/SSS/PBCH by detecting the PSS/SSS and decoding the PBCH. System information transmitted by the gNB includes RACH configuration information. The RACH configuration information may include a list with respect to a plurality of RACH resources, information for identifying the plurality of RACH resources, and connection information about each RACH resource and SS block.

Similarly to the above description in which RACH resources are limited to time/frequency resources in which a UE can transmit a PRACH preamble, RACH resources are limited to time/frequency resources in the following description. A method for indicating a RACH position on the frequency axis as well as a RACH position on the time axis will be described below. In the above description, one RACH resource is linked to one or more SS blocks and RACH resources consecutive on the time axis are defined as a RACH resource set. A plurality of RACH resource sets consecutive on the frequency axis as well as the time axis are defined as a RACH resource block.

Figure 23:
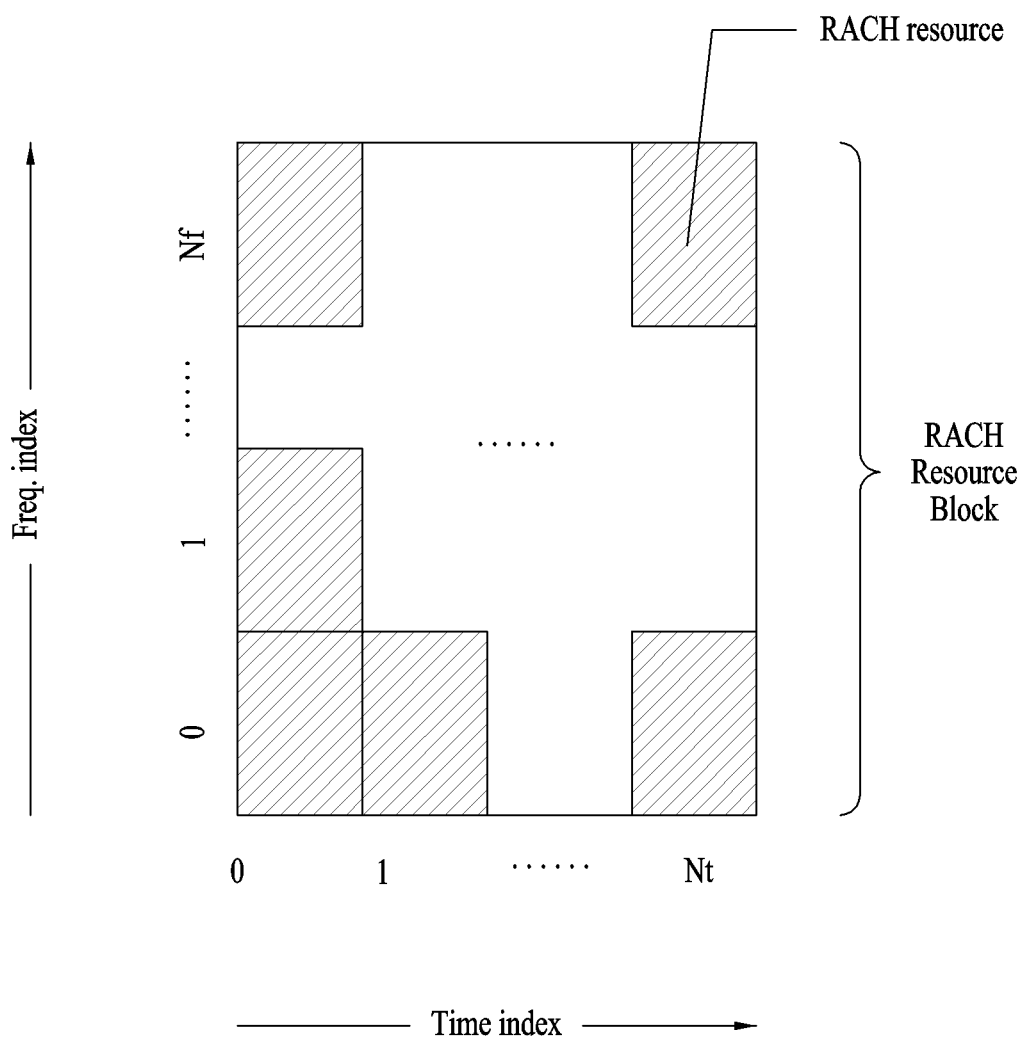

FIG. 23 illustrates a RACH resource block.

As illustrated in FIG. 23, the RACH resource block may be defined as a time/frequency chunk of RACH resources and each RACH resource in the RACH resource block has a unique index determined by the time/frequency position.

The RACH resource index in the RACH resource block is mapped according to a specific rule. For example, the RACH resource index may be assigned according to frequency-time ordering or time-frequency ordering. For example, referring to FIG. 21, RACH resources in the RACH resource blocks may be indexed as follows in the case of frequency-time ordering.

RACH resource #0 (time, frequency): (0, 0)
RACH resource #1: (1, 0)
RACH resource #2: (2, 0)
. . .

Here, the unit of the time axis length in the RACH resource block may be determined by a RACH preamble format and the unit of the frequency axis length may be determined by a RACH resource bandwidth (e.g., 1.08 MHz) or a resource block group (RBG) unit.

When a UE requests system information transmission by transmitting a specific RAH preamble, a plurality of RACH resource blocks may be designated in order to transmit information on the number of SS blocks or system information in a system/cell. Particularly, when there are a large number of SS blocks, if all RACH resources corresponding to the respective SS blocks are configured to be consecutive, as described above, considerable restrictions may be imposed on uplink/downlink data services. Accordingly, the network may configure RACH resources consecutive on the time/frequency axis as RACH resource blocks and arrange the configured RACH resource blocks discontinuously. Therefore, a plurality of RACH resource blocks may be configured and each RACH resource block may also have a unique index.

Figure 24:
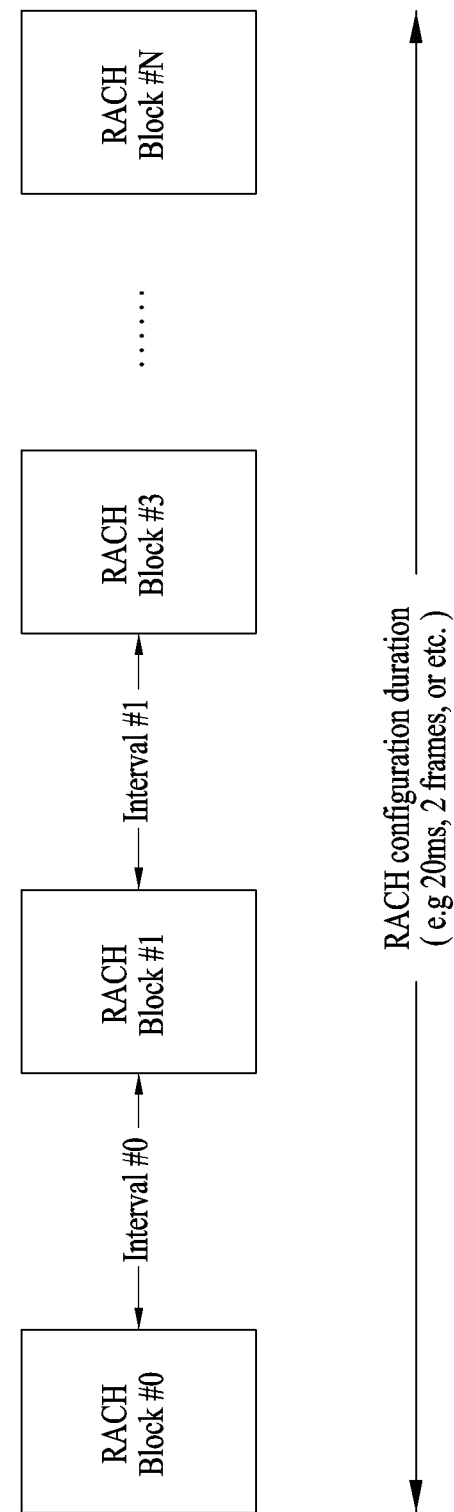

In other words, a duration in which RACH resource blocks are configured (referred to as a RACH configuration duration hereinafter) may be designated in a system/cell, and one or more RACH blocks may be present in the RACH configuration duration. FIG. 22 illustrates a RACH configuration duration according to the present disclosure. Information that needs to be signaled by the network/gNB to UEs may include the length of the RACH configuration duration, the number of RACH resource blocks (i.e., RACH blocks), the position of each RACH block, and the like. As illustrated in FIG. 24, UEs may be notified of intervals of RACH blocks in the RACH configuration duration (i.e., RACH configuration period). For example, the network/gNB may signal the number of slots or relative positions such as offset information in an absolute time unit from RACH block #0 as RACH block position information or directly signal the starting slot index of a RACH block in the RACH configuration duration per RACH block.

Figure 25:
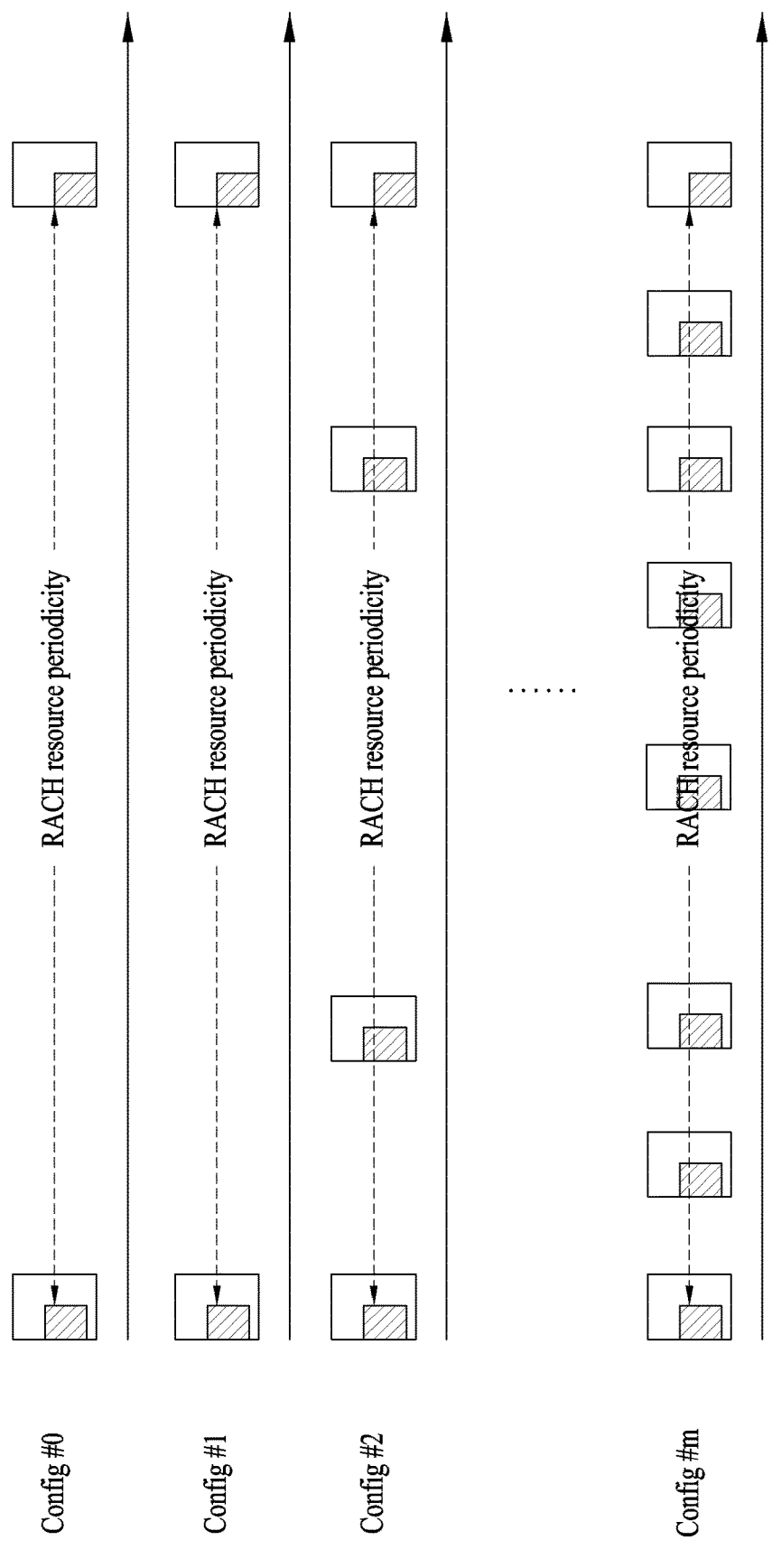

Each RACH resource in a RACH resource block may have a unique configuration. In this case, RACH resources may have different generation frequencies and periods and each RACH resource may be connected to a specific SS block CSI-RS or downlink beam direction. When there is such a connection relation, information about the connection is also provided to UEs. FIG. 22 illustrates a configuration per RACH resource in a RACH resource block. Slot indices which may be reserved for RACH resources in a specific RACH resource period may be defined in the standard document, and different configuration numbers may be allocated according to RACH resource generation frequency as illustrated in FIG. 25. The network/gNB may signal a generation frequency/period of a specific RACH resource to UEs by signaling a specific configuration number through the system information.

The network may signal the number of RACH resource blocks (i.e., RACH blocks) and a starting point (e.g., slot index) of each RACH resource to UEs. In addition, the network signals the number of RACH resources, Nt, on the time axis and the number of RACH resources, Nf, on the frequency axis when signaling information about each RACH resource block to UEs. Nt and Nf may be different for RACH resource blocks. The network/gNB maps RACH resource indices according to time/frequency positions of RACH resources in a RACH resource block and signals information indicating a period/generation frequency per RACH resource (e.g., configuration number) and information such as a connected SS block or a CSI-RS index to UEs. Here, the network/gNB may signal the period/generation frequency per RACH resource by indicating a specific configuration number set according to RACH resource generation frequency, as described above.

In addition, the RACH preamble format may be set per RACH resource. Although all RACH preamble formats may be configured to be identical in the system, the same subcarrier spacing and the number of repetitions are maintained in a RACH resource block and different RACH preamble formats may be set for respective RACH resource blocks. However, the number of repetitions of a RACH preamble is fixed in the same RACH resource block but respective RACH resources included in the RACH resource block may be configured to use different preamble sequences. For example, different root indices or different cyclic shift (CS) versions may be set for the respective RACH resources included in the RACH resource block.

Signaling of RACH configuration is summarized as follows. The network performs a process of identifying time/frequency resources, that is, RACH resources for RACH preamble transmission. To this end, a RACH resource index may be determined by a RACH resource block index and a RACH resource index in a RACH resource block, and a RACH resource generation frequency/period per RACH resource index may correspond to each of a plurality of RACH configuration numbers in the present disclosure. In addition, the network transmits RACH preamble information which can be used per RACH resource to a UE and transmits connected SS block index or CSI-RS index information. Accordingly, the UE may acquire information about RACH time/frequency resources and preamble resources to be used when the UE intends to perform RACH in a specific downlink beam direction and perform RACH using the corresponding resources.

Meanwhile, when a RACH slot pattern for RACH resource configuration is determined, as described above, a RACH slot pattern which can include RACH resources may be configured irrespective of slots in which SS blocks can be transmitted or may be configured for slots in which SS blocks can be transmitted.

(1) RACH Resource Multiplexing (TDM/FDM/CDM)

Up to 8 SS blocks can be transmitted in bands of 6 GHz or lower. For cases in which a maximum of 8 SS blocks are transmitted, 8 slots in which RACH resources can be reserved may be necessarily required in a RACH slot pattern window or the 8 slots may not be necessarily reserved. This is because restrictions that a gNB needs to transmit/receive signals only in one direction at a time are eliminated since reservation of 8 slots having a length of 1 ms for RACH resource, which correspond to the number of SS blocks, causes considerable overhead of the system and digital beamforming can be applied distinguished from mmWave because of bands of 6 GHz or lower.

Accordingly, RACH resources in bands of 6 GHz or lower may be code-division-multiplexed or frequency-division-multiplexed in a configured slot. That is, as the number of transmitted SS blocks increases, the number of frequency axis resources needs to be increased or RACH preamble resources need to be divided and used by SS blocks.

Up to 64 or 128 SS blocks can be transmitted in bands of 6 GHz or higher. For transmission of 128 SS blocks, 128 RACH resources may not be configured according to TDM all the time. When a large subcarrier spacing is used, a slot length on the time axis is reduced but configuration of 128 RACH resources according to TDM all the time acts on the network as a burden, distinguished from the cases in which a small subcarrier spacing is used. Accordingly, although beamforming is performed only in one direction for SS block transmission, CDM/FDM of RACH resources need to be considered in addition to TDM of RACH resources as in the aforementioned system of 6 GHz or lower when RACH preambles can be simultaneously received in a plurality of directions or signals can be simultaneously transmitted in a plurality of directions according to gNB capability.

To this end, the number of frequency-division-multiplexed resources needs to be signaled in an indicated RACH slot pattern configuration. Frequency axis information for RACH preamble transmission, that is, starting frequency information, the number of frequency bands allocated to RACH resources, and whether frequency allocation is performed in a direction in which a frequency increases from a starting frequency or in a direction in which a frequency decreases from the starting frequency when RACH resources are frequency-division-multiplexed, needs to be signaled or appointed as a specific direction between a UE and a gNB. When multiple resources are frequency-division-multiplexed on the frequency axis, frequency-division-multiplexed resources or bands may be indexed at a specific time or in a specific slot, and frequency resource index information mapped per SS block needs to be signaled or appointed in a specific manner between the UE and the gNB.

Furthermore, in the case of CDM using a RACH preamble, information about the number of RACH preambles allocated per SS block needs to be signaled. In addition, the number of RACH preambles allocated per SS block needs to be signaled in consideration of cases in which CDM/FDM are performed.

(2) ATSS Block in RMSI (SIB 1/2)

Although up to 8 or 128 SS blocks can be transmitted, 8 or 128 or less SS blocks can be transmitted in an actual system. If the gNB does not additionally signal information about the number of transmitted SS blocks, the gNB needs to signal the information through RMSI (Remaining Minimum System Information) because UEs exactly know the information. This information is referred to as actual transmitted SS blocks (ATSSs).

It is desirable to allocate RACH resources on the basis of actually transmitted SS blocks rather than allocating the same on the basis of an assumed maximum number of SS blocks realized in the standard in order to prevent system waste. As shown in Table 9, when a RACH slot pattern for RACH resource allocation is configured, SS blocks may be transmitted or may not be transmitted in a slot indicated in RACH slot pattern configuration. Such information may be detected through an ATSS included in the RMSI. Although a RACH slot pattern for RACH resources is configured except slots in which SS blocks can be transmitted even in RACH slot pattern configuration method 2, mapping to actual RACH resources is based on ATSSs. When RACH slot pattern configuration collides with some of ATSS information, that is, when the RMSI indicating ATSSs transmission of SS blocks in a slot indicated by a RACH slot pattern, a UE recognizes that the SS blocks are transmitted in the slot and thus the slot cannot be used. That is, the UE does not attempt RACH preamble transmission in the slot and the slot is excluded from mapping for association between SS blocks and RACH resources.

The UE checks the number and positions of available RACH slots by combining PRACH configuration and ATSS information. The number of slots available on the time axis, the number of RACH resources in a RACH slot according to a RACH preamble format, the number of resources on the frequency axis and/or the number of RACH preambles available per SS block are combined to determine association between SS blocks and RACH resources. That is, association between SS blocks and RACH resources is not previously set according to a RACH slot pattern for RACH resource allocation and a maximum number of SS blocks but is determined according to provided signaling and mapping between SS blocks and RACH resources is performed.

If RACH resources are time-division-multiplexed and then RACH resources are frequency-division-multiplexed, the positions of frequency axis resources, the number of frequency axis resources, information about the number of frequency resources to which one SS block is allocated, and information about the number of RACH preambles allocated per frequency resource need to be signaled. If RACH resources are time-division-multiplexed and then RACH resources are code-division-multiplexed, information about the number of RACH preambles which can be used per SS block needs to be signaled.

In other words, when Ns is the number of SS blocks, the following information needs to be signaled.

Nf: The number of RACH resources which are frequency-division-multiplexed at a time.

Nfc: The number of RACH preambles which can be used in one frequency resource

Nfs: The number of frequency resources that can be associated with one SS block

Nc: The number of RACH preambles allocated per SS block

A UE detects the number and positions of slots which can be used as RACH resources available on the time axis by combining RACH slot pattern configuration and ATSS information and calculates the number of RACH resources on the time axis using a signaled RACH preamble format.

Then, the UE calculates time/frequency/code information which can be used as RACH resources by combining the signaled frequency and code domain information, performs indexing for corresponding RACH resources and then performs mapping between SS blocks and corresponding RACH resource indices. Meanwhile, a method by which the UE calculates a RACH resource index needs to be performed through a method previously appointed between the UE and the network, and actually transmitted SS blocks are mapped/associated with RACH resource indices in ascending order of SS block indices.

That is, when SS block indices signaled through RMSI indicating ATSSs are 2, 5, 5 and 7 and RACH resource indices are 0, 1, 2 and 3, SS blocks #2, #4, #5 and #7 are respectively mapped to RACH resources #0, #1, #2 and #3.

RACH resource indexing is performed in such a manner that RACH resources are indexed in the order of code resources in a base time/frequency domain of indexing, indexing for code resources is performed at the same time, and then indexing is performed in ascending order of frequency resources and indexing is performed in the order of code resources. Alternatively, indexing for frequency resources is performed at the same time and then indexing is performed for time resources.

After indexing for RACH resources is performed in a given order, the number of RACH resources may not correspond to the number of SS blocks all the time. In this case, the number of RACH resources is usually equal to or greater than the number of SS blocks. When there are RACH resources remaining after association with all ATSSs and thus there are RACH resources which are not associated with any SS block in a RACH resource configuration window or a RACH slot pattern configuration window, the corresponding RACH time/frequency resources are not reserved for RACH resources. The UE does not assume that RACH is transmitted in the corresponding resources and uplink is transmitted all the time. If there is no RACH resource associated with a specific ATSS, that is, RACH resources are insufficient for the number of SS blocks, the network may transmit signaling for permitting slots adjacent to a specific slot included in RACH slot pattern configuration for RACH resources as RACH resources for the UE.

Here, a specific slot index and the number of slots may be designated through the signaling, and the first slot in which SS blocks are not transmitted among slots adjacent to the last one of slots implicitly indicated in the RACH slot pattern configuration or an indicated specific slot as RACH resources.

Alternatively, the UE may additionally use RACH resources corresponding to the number of slots in which RACH slot pattern configuration collides with ATSS information. When two slots are used for SS block transmission, the UE may use slots, which are adjacent to the two slots used for SS block transmission among slots indicated by the corresponding RACH slot pattern configuration, as slots for RACH. The corresponding slots must be slots which are not used for SS block transmission. When SS blocks are transmitted in a neighboring slot, a slot following the slot is selected. Processing for remaining RACH resources is performed in the same manner as described above.

Figure 26:
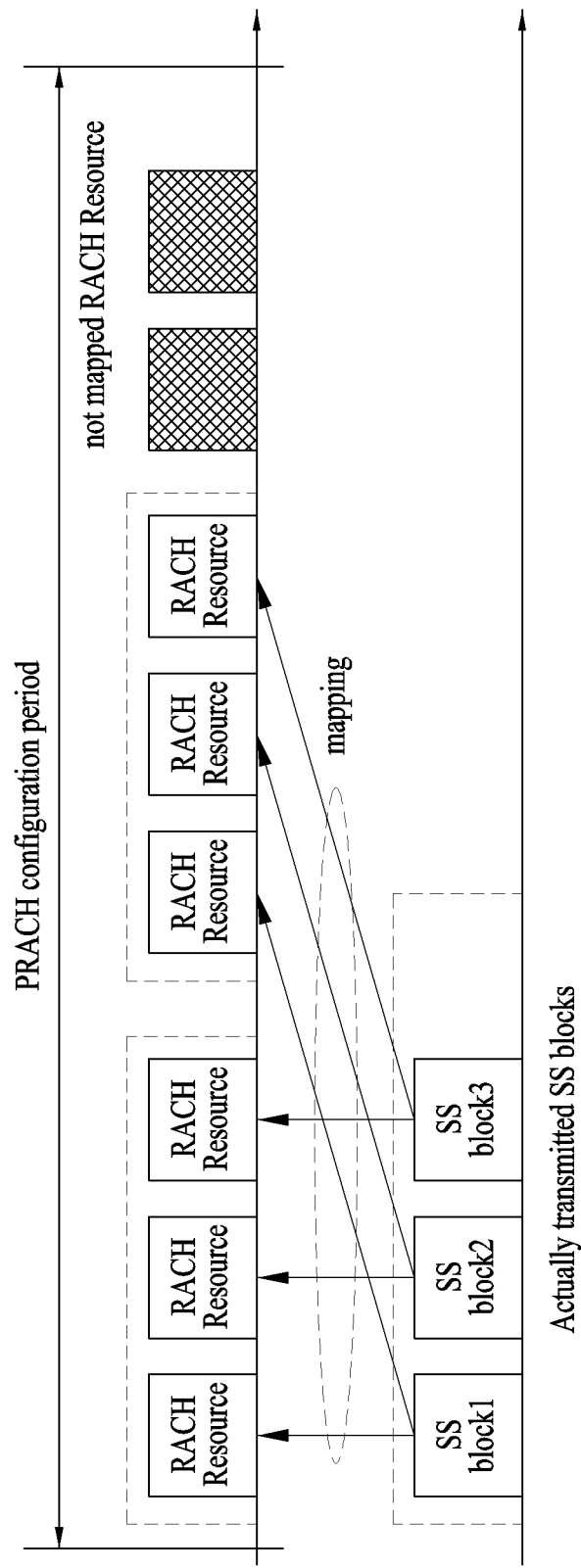

As another method for cases in which there are RACH resources which are not associated with any SS block, remaining RACH resources are sequentially mapped from the first ATSS again. That is, the number of RACH resources may be greater than the number of ATSSs and, preferably, a RACH resource is mapped k times per ATSS. In other words, ATSSs are cyclically associated with RACH resources k times. Referring to FIG. 26, when there are 3 ATSSs and 8 RACH resources, the 3 ATSSs are mapped to 3 RACH resources and mapped to the next 3 RACH resources again, and the remaining 2 RACH resources are not associated with the ATSSs. The number of ATSSs is related to the number of RACH resources such that at least one RACH resource needs to be mapped per ATSS in a PRACH configuration window and an ATSS-RACH resource mapping pattern can be repeated k times according to a degree of freedom of the network. If there are remaining RACH resources even after ATSSs are mapped to RACH resources k times, the remaining RACH resources are not reserved for RACH resources. When the remaining RACH resources have a slot/mini slot length, the UE performs DCI monitoring in the corresponding slots. Here, k is a positive integer and may be a maximum number of times of mapping ATSSs to RACH resources. That is, k may be a floor (the number of RACH resources/the number of ATSSs). In other words, ATSSs are repeatedly mapped to RACH resources by k which is a positive integer in the PRACH configuration window and remaining RACH resources are not effective as RACH resources.

In addition, a pattern in which each ATSS is mapped to at least one RACH resource may be repeated in the PRACH configuration window. This is described in detail through the above-described example. When 3 ATSSs are mapped to 8 RACH resources twice in a PRACH configuration window of a specific duration and 2 RACH resources remain, 3 ATSSs are sequentially mapped to 8 RACH resources twice in the same pattern in a PRACH configuration window of the next duration and 2 remaining RACH resources are ineffective RACH resources and thus may not be reserved for RACH resources.

The PRACH configuration window may have the same duration as a PRACH configuration period unless there are special circumstances such as setting of the PRACH configuration window through additional signaling. That is, the PRACH configuration window may be the same as the PRACH configuration period unless otherwise mentioned.

(3) Indication of ATSS Through RRC Signaling

The aforementioned ATSS is information transmitted at the same time as the time at which PRACH configuration is performed and is transmitted through RMSI carrying most basic information of the system after PBCH transmission, that is, SIB1/2. However, this information needs to be broadcast to all UEs in a cell and causes considerable signaling overhead to indicate whether a maximum of 128 SS blocks is transmitted.

Accordingly, information about ATSSs is transmitted in the form of a compressed bitmap instead of a full bitmap in the RMSI. The system provides accurate ATSS information for serving cell measurement after a random access procedure and the ATSS information is transmitted through RRC. ATSS information received through the RMSI may differ from ATSS information received through RRC. In this case, the ATSS information transmitted through RRC signaling has precedence over the ATSS information transmitted through the RMSI. In this case, an additional factor needs to be considered for UE operation with respect to RACH resources.

A UE does not assume that a PUSCH/PUCCH and a downlink channel are transmitted/received in time/frequency resources allocated to RACH resources. Resources reserved for RACH have priority of resource allocation immediately following resources in which SS blocks are transmitted. However, when the UE knows that some SS blocks among ATSSs received through the RMSI have not actually been transmitted through ATSS information transmitted through RRC, the UE releases all RACH resources associated with the SS blocks which have not actually been transmitted. That is, it is assumed that a RACH preamble is not transmitted in the released resources. Furthermore, the released resources may be used as downlink resources. That is, the UE performs DCI monitoring in the released resources/slots.

8. Resource Allocation in RACH Slot

When information about RACH slots is correctly provided, RACH resources in each RACH slot may be acquired on the basis of a combination of a RACH preamble format and a subcarrier spacing indicated by Msg 1.

Figure 27:
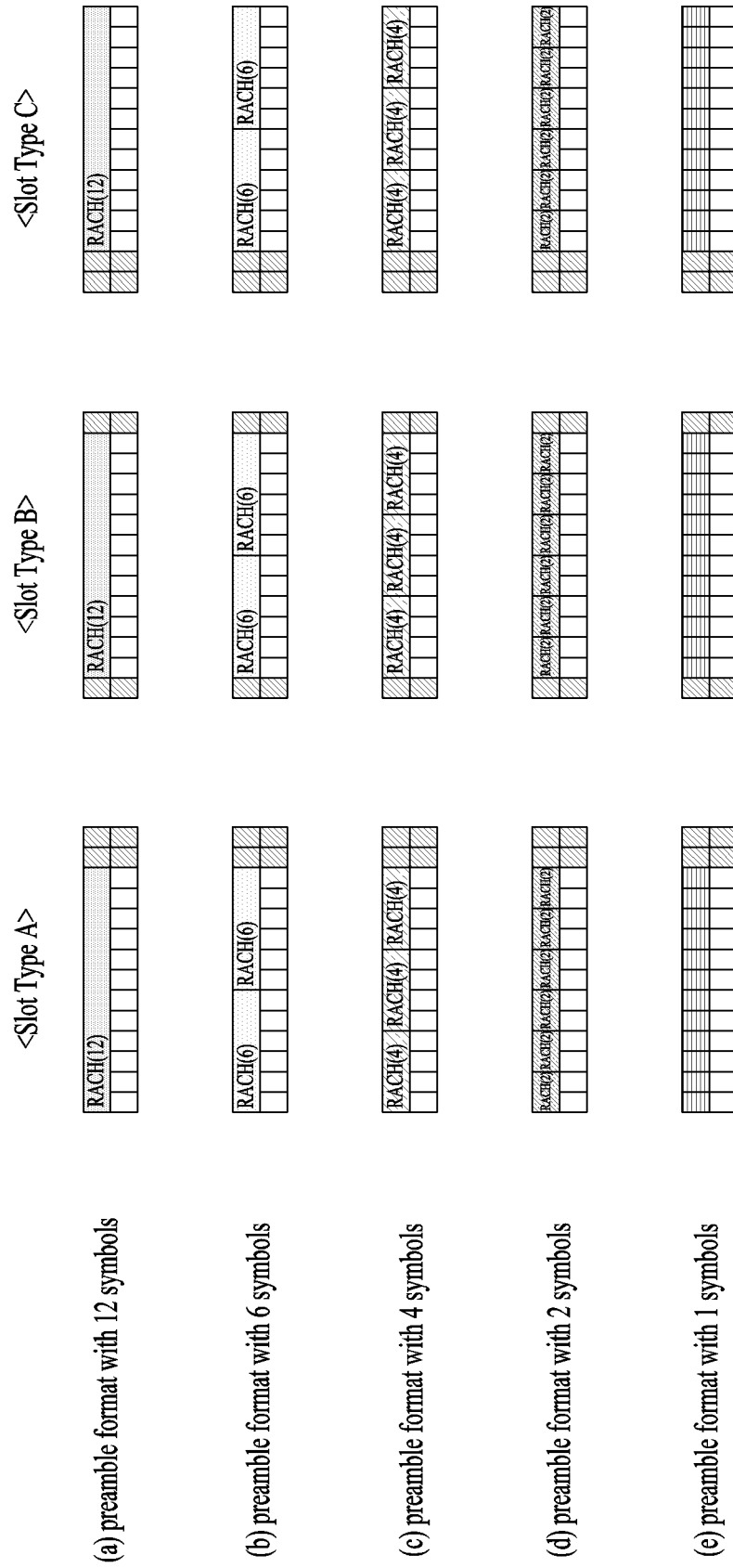

In addition, to signal correct positions of RACH resources in slots, the network needs to signal RACH slot type information such as a starting symbol index of a RACH resource, as shown in FIG. 27. Here, the starting symbol index may be 0, 1 or 2. Although RACH slot type information signaling may be performed per RACH slot, it is more desirable to perform RACH slot type information signaling for all RACH slots in order to reduce signaling overhead.

(1) Frequency Domain Configuration

Frequency positions of RACH resources are signaled on the basis of an initial bandwidth part (BWP) for uplink in a bandwidth part and resource allocation information for RACH transmission.

(2) RACH Resource Allocation in RACH Slot

When a RACH preamble based on a short sequence is used, a plurality of RACH resources may be included in a single RACH slot. In this case, RACH resources may be consecutively or inconsecutively allocated. Although inconsecutive allocation of RACH resources may be advantageous in terms of flexibility and latency reduction, the network needs to indicate which symbol is reserved for RACH. Accordingly, it is desirable to consecutively allocate RACH resources in a RACH slot in consideration of resource efficiency and signaling overhead. That is, when a plurality of RACH resources is included in a RACH slot, it is desirable that the RACH resources be consecutively arranged even though all the resources included in the RACH slot are not used as RACH resources.

When RACH resources are consecutive, RACH preamble format B is applied to the last RACH resource among consecutive RACH resources in a RACH slot and RACH preamble format AB is applied to the remaining RACH resources.

In addition, to support URLLC in NR, RACH slots may be configured as follows.

Option 1: RACH resource allocation in a RACH slot is configured on the basis of a mini slot and the length of the mini slot is determined according to transmission of RMSI in an idle mode or other system information.

Option 2: A RACH slot pattern is determined on the basis of a mini slot and the mini slot is supported by systems in the idle mode.

Option 3: Dynamic or semi-static signaling has precedence over RACH resource configuration.

In the case of options 1 and 2, RACH resources are consecutively allocated in a mini slot in a RACH slot and RACH resources are not allocated to a mini slot following the mini slot to which the RACH resources have been consecutively allocated. In addition, in the case of options 1 and 2, starting symbol indices of RACH resources included in a mini slot to which RACH resources are allocated may be signaled or mini slots may have the same RACH resource allocation pattern in a RACH slot.

However, in the case of option 2, the number of RACH slot patterns increases as the number of mini slots included in a RACH slot increases, and thus overhead for designating a RACH slot pattern may increase. Accordingly, network signaling may have precedence over RACH resource configuration for dynamic utilization and flexibility of resources. However, the above-described method is not desirable because RACH resources are reserved in the idle mode having high priority.

<RACH Resource Association>

When RACH resource information is acquired, an SS block index associated with each RACH resource needs to be obtained. The simplest method therefor is signaling the SS block index associated with each RACH resource. However, SS blocks need to be mapped to RACH resources using a predefined rule in order to reduce signaling overhead. For example, the predefined rule may be regarded as a method of sequentially mapping SS blocks to RACH resource groups in the time domain and mapping actually transmitted SS blocks to RACH resource groups again.

(1) Derivation of Effective RACH Slot and Effective RACH Symbol

Since RACH resources are mapped to RACH slots according to PRACH configuration irrespective of temporal positions of actually transmitted SS blocks in TDD/FDD, a UE needs to be able to derive effective RACH slots by combining information included in PRACH configuration and information about SS blocks actually transmitted through RMSI. In addition, candidate slot positions for SS block transmission are not always reserved for SS block transmission. That is, information about whether each SS block is actually transmitted is indicated by RMSI, that is, actually transmitted SS block information, as described above.

In other words, the UE needs to be able to combine information about SS blocks actually transmitted through the RMSI and PRACH configuration information and derive effective RACH slots in consideration of predefined rules.

In addition, when the UE derives effective RACH slots, the UE needs to be able to derive effective RACH symbols on the basis of a signaled RACH preamble format and starting symbol indices of RACH slots specified for all cells. Further, a symbol indicated as uplink by slot format indication (SFI) may be an effective RACH symbol, and thus the UE needs to derive effective RACH symbols in consideration of SFI. Here, effective RACH symbols need to satisfy the number of consecutive symbols defined by the RACH preamble format. In addition, a single effective RACH symbol set may be defined as a single RACH occasion.

In addition, since it is necessary to determine whether RACH resources are always consecutively allocated in a RACH slot and whether the number of RACH occasions per RACH slot is identical for all RACH slots, explicit signaling needs to be performed when the number of RACH occasions per RACH slot is different for cells. Furthermore, for calculation of a total number of RACH occasions by the UE, the network needs to signal the number of frequency-division-multiplexed RACH resources through RACH-Config index in the two-dimensional time/frequency resource regions.

(2) Rule for Mapping Effective RACH Resources or Effective RACH Occasions to SS Blocks If a total number of RACH occasions which can be allocated within a PRACH configuration period is determined, a method of mapping SS blocks to RACH occasions needs to be determined. If the number of RACH occasions per SS block is one, that is, if SS blocks are one-to-one mapped to RACH occasions, the method of mapping SS blocks to RACH occasions can be easily determined because SS blocks can be sequentially mapped to RACH occasions. Similarly, when there are frequency-division-multiplexed RACH occasions, it is desirable to map SS blocks to the frequency-division-multiplexed RACH occasions first and then map SS blocks to RACH occasions in the time domain. Here, a time period of RACH occasions needs to be set according to a PRACH configuration period.

Figure 28:
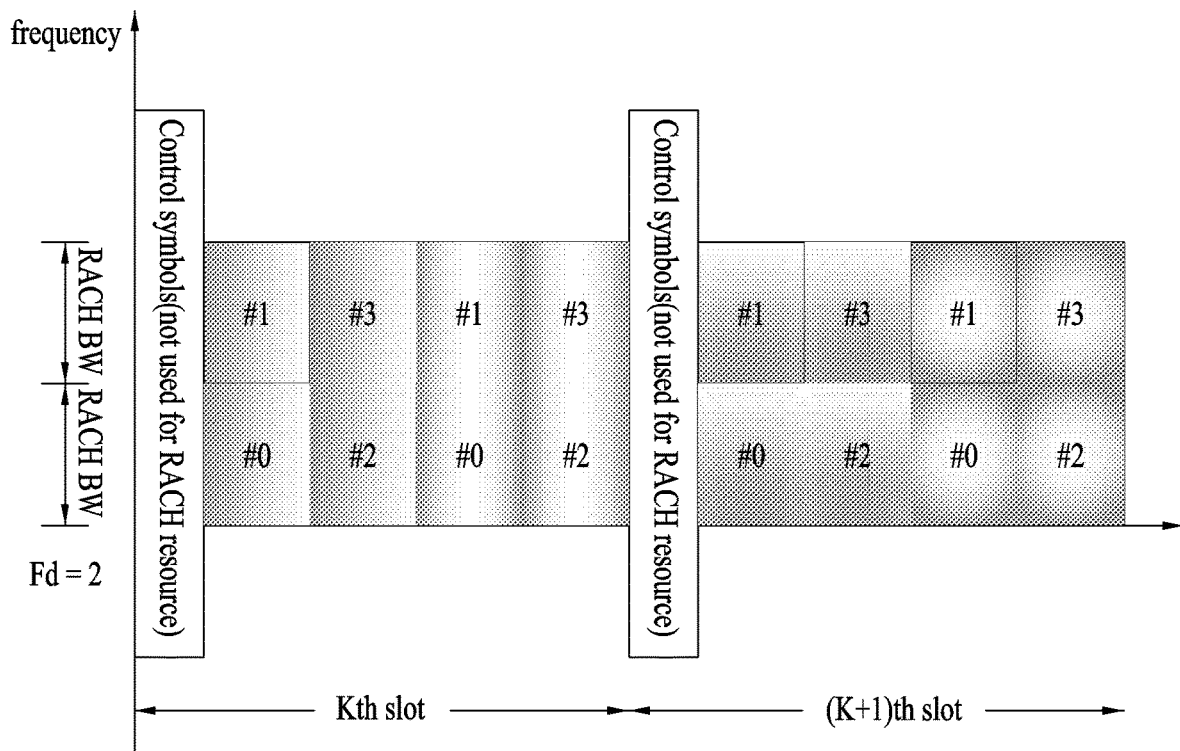

FIG. 28 shows a case in which a RACH preamble format having a length of 4 symbols, 4 RACH occasions in a time slot, and a starting symbol index of 2 are assumed. A mapping relationship between SS blocks and RACH occasions is described with reference to FIG. 28. When frequency-division-multiplexed RACH occasions are present, a method of mapping SS blocks to the frequency axis and then mapping SS blocks to the time axis may be used.

A RACH resource mapping pattern period is determined on the basis of actually transmitted SS blocks and a rule of mapping SS blocks to effective RACH occasions, and thus the RACH resource mapping pattern period may differ from the PRACH configuration period.

To create a more general mapping rule, the following parameters may be assumed.

X: The total number of RACH occasions $N_{SSB\_per\_RO}$: The number of SS blocks per RACH occasion $N_{seq\_per\_SSB\_per\_RO}$: The number of CBRA preambles per SS block with respect to RACH transmission occasions M: The number of RACH occasions per SS block. M is acquired by $N_{seq\_per\_SSB}/N_{seq\_per\_SSB\_per\_RO}$.

Fd: The number of RACH occasions which can be simultaneously mapped to one SS block 1) When M>1

When one SS block is mapped to a plurality of RACH occasions, that is, one-to-many mapping is performed, the value M is an integer corresponding to M>1, and Fd=1, M time-division-multiplexed RACH occasions may be sequentially mapped to one SS block.

In other words, when 1/M, which is the number of SS blocks per RACH occasion, is less than 1, an SS block may be mapped to M RACH occasions. Here, RACH occasions mapped to one SS block may be consecutive RACH occasions.

If Fd>1, M RACH occasions are mapped to an SS block in a frequency-first and time-next manner. Preferably, when M is a multiple of Fd, a single SS block may be mapped to frequency-division-multiplexed RACH occasions for a predetermined time. If a plurality of SS blocks is mapped to one RACH occasion within the same time, a direction in which the network can simultaneously receive beams corresponding to the plurality of SS blocks needs to be guaranteed.

The above description is summarized as shown in Table 13.

TABLE 13

|  | M = 1 | M > 1 |
| --- | --- | --- |
| Fd = 1 | Each SSB is mapped to an RO in a sequential manner in time domain. | One SSB is associated with TDMed $N_{RO\_per\_SSB}$ RACH occasions. |
| Fd > 1 | Each SSB is mapped to an RO in frequency-first and time-next manner according to the sequential order of SSB index. | One SSB is associated with $N_{RO\_per\_SSB}$ RACH occasions. The RACH occasions are mapped to an SSB in the frequency-first and time-next manner according to the sequential order of SSB index. |

2) When M<1

A case in which a plurality of SS blocks is mapped to one RACH occasion, that is, many-to-one mapping is performed is described. If 0<M<1, 1/M=N in which N is defined as the number of SS blocks mapped to one RACH occasion, and it is assumed that a plurality of SS blocks is code-division-multiplexed into one RACH occasion and beam directions corresponding to the plurality of SS blocks are directions in which the network can simultaneously receive the beams corresponding to the SS blocks.

If a maximum number of RACH preamble indices, such as 64, is allocated to a RACH occasion, RACH preambles mapped to SS blocks may be mapped in comb-type in order to increase RACH reception performance on the assumption that RACH preambles are received according to spatial division multiple access (SDM). In other words, if 2 SS blocks are mapped to one RACH occasion, other RACH preamble indices are mapped to the 2 SS blocks. Here, to improve RACH preamble reception performance, actual cyclic shifts allocated per SS block are defined as N*Ncs.

Meanwhile, when a plurality of SS block is associated with one RACH occasion, CBRA preamble indices for each SS block may be inconsecutively mapped for RACH performance improvement. In addition, mapping of a plurality of SS blocks to multiple RACH occasions may be considered, but this mapping method causes complexity of implementation and thus it is preferable to exclude the mapping method from mapping types.

(4) Rule for Mapping RACH Resource to RACH Preamble

Since a maximum number of RACH preambles per RACH resource and RACH resource group is limited, RACH preambles need to be allocated to a RACH resource/RACH resource group in a direction in which a root index cyclic shift increases, a root index increases and the time domain increases. Here, a starting root index mapped to the first RACH resource needs to be signaled.

A common RACH preamble format needs to be applied to all RACH resources by the same number of repetitions because there is no reason to use different RACH preamble formats for RACH resources in consideration of target coverage of a cell for at least a RACH procedure in the idle state.

1) Embodiment 1: The Number of RACH Preambles Per RACH Occasion or SS Block

Information about RACH preambles and a range of supported RACH preamble values that a UE needs to know in order to map RACH preambles to RACH occasions is shown in Table 14. In addition, the UE may calculate the number of RACH preambles per RACH occasion on the basis of the number of RACH preambles per SS block for contention based random access (CBRA) and the number of RACH occasions per SS block and signal the number of RACH occasions per SS block.

allocated to a RACH occasion having a maximum or minimum index associated with SS blocks. Alternatively, RACH preambles may be mapped to RACH occasions through a round robin method. For example, when the number of RACH preambles per SS block is 48 and the number of RACH occasions mapped to an SS block is 4, the number of preambles per RACH occasion is 12. If the number of RACH preambles per SS block is 48 and the number of RACH occasions mapped to an SS block is 5, at least 9 RACH preambles may be used per RACH occasion. The remaining 3 RACH preambles may be sequentially mapped to RACH occasion indices in frequency-first and time-next manner for each RACH occasion mapped to the SS block.

When M<1, if a plurality of SS blocks is mapped to one RACH occasion and the same RA-RNTI is shared by the plurality of SS blocks, the maximum number of RACH preambles per RACH occasion is 64 RAPID. If the sum of RACH preambles for the plurality of SS blocks is not greater than 64, the UE may use the number of RACH preambles per SS block for a signaled RACH occasion. However, if the sum of RACH preambles for the plurality of SS blocks is greater than 64, RACH preamble numbers which can be used by the UE may be recalculated such that the number of RACH preambles per SSB in the RACH occasion does not exceed 64. For example, when M is ¼ and the number of RACH preambles per SS block is 16, the sum of RACH preambles per SS block for 4 SS blocks does not exceed 64, and thus 16 preambles per RACH occasion are used. That is, if M is ¼ and the number of RACH preambles per SS block is 32, the number of RACH preambles per SS block of a RACH occasion needs to be limited to 16.

When a plurality of SS blocks is mapped to one RACH occasion, that is, M<1, RA-RNTI may be allocated per SS

TABLE 14

| Parameter | Value | Explanation for current suggestion |
|---|---|---|
| Number of PRACH preambles for CBRA per SSB | {4, 6, 8, 16, 24, 32, 48, 64} | This parameter is explicitly signaled by RMSI |
| Number of PRACH preambles for CBRA and CFRA per SSB | {8, 16, 32, 64} | This parameter is explicitly signaled by RMSI |
| Maximum number of PRACH preambles for CBRA per RACH occasion | {[64]} | This parameter is not explicitly signaled. Instead, the number of SSB associated to a RACH occasion is explicitly or implicitly signaled, which is related to PRACH preamble mapping rule. |
| Maximum number of PRACH preambles for CBRA and CFRA per RACH occasion | {[64], [128 or 256]} | The maximum number of PRACH preambles per RACH occasion should be determined for RAPID size, and [64] could be considered as baseline. The large number (e.g. 128, 256) can be used only for beam recovery or any other purpose (with smaller value of CS and lightly loaded scenario). RACH resource configuration is separately configured for beam recovery, not by RMSI, and this is provided for the purpose of same configuration framework. |

When M≥1, the number of RACH preambles for CBRA per RACH occasion is calculated as a value obtained by dividing the number of RACH preambles for CBRA per SS block by M. Here, if there is a non-zero remainder, RACH preambles which are not mapped to RACH occasions are block at the same time/frequency position. In other words, when M is ¼ and the number of RACH preambles per SS block is 32, 32*4 RACH preambles can be used for a RACH occasion having RA-RNTI specific to SS blocks, and thus different RARs are generated for SS blocks with respect to the RACH occasion. This relates to a method of calculating RA-RNTI irrespective of whether a virtual SS block index is calculated.

2) Embodiment 2: Method of Mapping SS Blocks and RACH Occasions to RACH Preamble Indices The number of RACH preambles per SS block and the number of RACH preambles per RACH occasion are determined according to a RACH preamble index mapping rule. RACH preamble indices are mapped in a RACH resource group. If a single SS block is associated with one RACH resource group, the RACH preamble indices are mapped to RACH occasions associated with SS blocks.

When $M \geq 1$, if the number of RACH preambles per RACH occasion is Npreamble_occasion and each RACH occasion has index #n (n=0, 1, ..., M−1), an n-th RACH occasion has RACH preamble indices {0 to (Npreamble_occasion−1)+(n*Npreamble_occasion)}.

On the contrary, when $M<1$, if RA-RNTI is shared by SS blocks in a RACH occasion and the calculated number of RACH preambles per SS block is Npreamble_SSB, RACH preamble indices {0 to (Npreamble_SSB−1)+(m*Npreamble_SSB)} are allocated to an m-th SS block. Here, m is an SS block index reordered on the basis of actually transmitted SS blocks. In addition, a RACH occasion may have values of 0 to Npreamble_occasion as RACH preamble indices for Npreamble_occasion. Here, Npreamble_occasion may be 64.

Meanwhile, RA-RNTI is allocated per SS block and RACH preamble indices {0 to (Npreamble_SSB−1)} are allocated per SS block. The number of RACH preambles which may be associated with a RACH occasion may be m*Npreamble_SSB. Here, m is the number of SS blocks mapped to the RACH occasion and Npreamble_SSB is the number of RACH preambles per SS block and may be acquired through signaling.

3) Embodiment 3: Method of Mapping RACH Occasion/SS Block to RACH Preamble

Basically, RACH preambles are allocated to RACH occasions in a direction in which a root index cyclic shift increases and a root index increases. If a RACH resource group is composed of time-division-multiplexed RACH occasions with Fd=1, RACH preambles may be allocated to the RACH resource group in a direction in which the root index cyclic shift increases, the root index increases and the time domain increases, that is, a RACH occasion index increases.

In addition, if a RACH resource group is composed of time-division-multiplexed RACH occasions with Fd>1, RACH preambles may be allocated to the RACH resource group in a direction in which the root index cyclic shift increases, the root index increases, the frequency domain increases, and the time domain increases.

If a RACH preamble sequence can be different for different RACH resource groups, RACH preambles may be generally allocated in a direction in which the root index cyclic shift increases, the root index increases and, when Fd>1, the frequency domain increases and the time domain increases.

(5) The Total Number of RACH Occasions in PRACH Configuration Period

The total number of RACH occasions can be calculated by multiplying the number of RACH slots in a subframe, the number of RACH occasions in a RACH slot, the number of subframes per PRACH configuration index, the number of frequency-division-multiplexed RACH occasions in a time instance indicated by a 2-bit value and a PRACH configuration period which are included in PRACH configuration.

In addition, the UE may derive the total number of RACH occasions in the two-dimensional time/frequency domain on the basis of the aforementioned information.

Meanwhile, the total number of RACH occasions may not be exactly the same as the number of RACH occasions required to be associated with actually transmitted SS blocks in the PRACH configuration period. When the total number of RACH occasions is greater than the number of required RACH occasions, the remaining RACH occasions are not used for RACH occasions and are used for uplink data transmission. When the total number of RACH occasions is less than the number of required RACH occasions, this needs to be recognized by the network as a configuration error and configuration of this type needs to be avoided.

Figure 29:
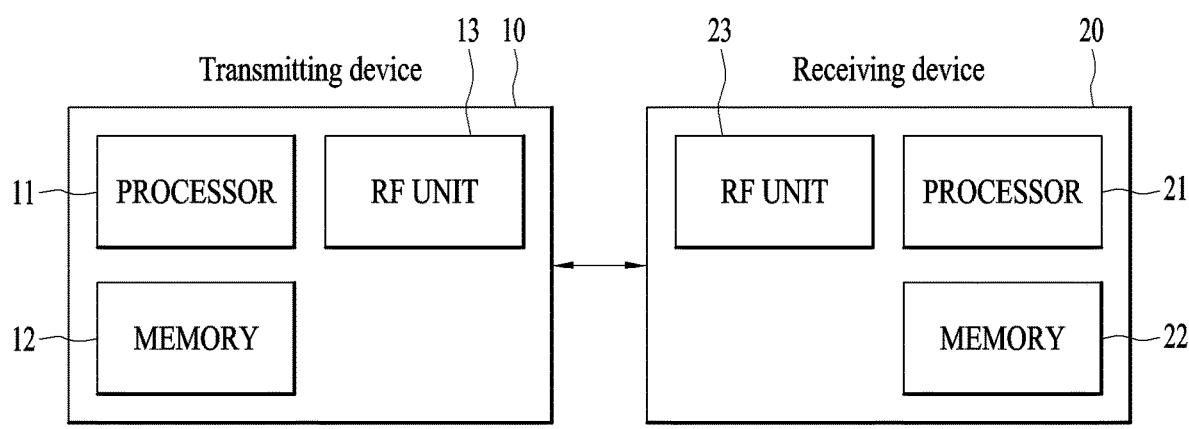
FIG. 29 is a block diagram illustrating components of a transmitter 10 and a receiver 20 which perform the present disclosure.

FIG. 29 is a block diagram illustrating components of a transmitting device 10 and a receiving device 20 which implement the present disclosure.

The transmitting device 10 and the receiving device 20, respectively include radio frequency (RF) units 13 and 23 which transmit or receive radio signals carrying information/ and or data, signals, and messages, memories 12 and 22 which store various types of information related to communication in a wireless communication system, and processors 11 and 21 which are operatively coupled with components such as the RF units 13 and 23 and the memories 12 and 22, and control the memories 12 and 22 and/or the RF units 13 and 23 to perform at least one of the foregoing embodiments of the present disclosure.

The memories 12 and 22 may store programs for processing and control of the processors 11 and 21, and temporarily store input/output information. The memories 12 and 22 may be used as buffers.

The processors 11 and 21 generally provide overall control to the operations of various modules in the transmitting device or the receiving device. Particularly, the processors 11 and 21 may execute various control functions to implement the present disclosure. The processors 11 and 21 may be called controllers, microcontrollers, microprocessors, microcomputers, and so on. The processors 11 and 21 may be achieved by various means, for example, hardware, firmware, software, or a combination thereof. In a hardware configuration, the processors 11 and 21 may be provided with application specific integrated circuits (ASICs), digital signal processors (DSPs), digital signal processing devices (DSPDs), programmable logic devices (PLDs), field programmable gate arrays (FPGAs), etc. In a firmware or software configuration, firmware or software may be configured to include a module, a procedure, a function, or the like. The firmware or software configured to implement the present disclosure may be provided in the processors 11 and 21, or may be stored in the memories 12 and 22 and executed by the processors 11 and 21.

The processor 11 of the transmitting device 10 performs a predetermined coding and modulation on a signal and/or data which is scheduled by the processor 11 or a scheduler connected to the processor 11 and will be transmitted to the outside, and then transmits the encoded and modulated signal and/or data to the RF unit 13. For example, the processor 11 converts a transmission data stream to K layers after demultiplexing, channel encoding, scrambling, modulation, and so on. The encoded data stream is referred to as a codeword, equivalent to a data block provided by the MAC layer, that is, a transport block (TB). One TB is encoded to one codeword, and each codeword is transmitted in the form of one or more layers to the receiving device. For frequency upconversion, the RF unit 13 may include an oscillator. The RF unit 13 may include Nt transmission antennas (Nt is a positive integer equal to or greater than 1).

The signal process of the receiving device 20 is configured to be reverse to the signal process of the transmitting device 10. The RF unit 23 of the receiving device 20 receives a radio signal from the transmitting device 10 under the control of the processor 21. The RF unit 23 may include Nr reception antennas, and recovers a signal received through each of the reception antennas to a baseband signal by frequency downconversion. For the frequency downconversion, the RF unit 23 may include an oscillator. The processor 21 may recover the original data that the transmitting device 10 intends to transmit by decoding and demodulating radio signals received through the reception antennas.

Each of the RF units 13 and 23 may include one or more antennas. The antennas transmit signals processed by the RF units 13 and 23 to the outside, or receive radio signals from the outside and provide the received radio signals to the RF units 13 and 23 under the control of the processors 11 and 21 according to an embodiment of the present disclosure. An antenna may also be called an antenna port. Each antenna may correspond to one physical antenna or may be configured to be a combination of two or more physical antenna elements. A signal transmitted from each antenna may not be further decomposed by the receiving device 20. An RS transmitted in correspondence with a corresponding antenna defines an antenna viewed from the side of the receiving device 20, and enables the receiving device 20 to perform channel estimation for the antenna, irrespective of whether a channel is a single radio channel from one physical antenna or a composite channel from a plurality of physical antenna elements including the antenna. That is, the antenna is defined such that a channel carrying a symbol on the antenna may be derived from the channel carrying another symbol on the same antenna. In the case of an RF unit supporting MIMO in which data is transmitted and received through a plurality of antennas, the RF unit may be connected to two or more antennas.

In the present disclosure, the RF units 13 and 23 may support reception BF and transmission BF. For example, the RF units 13 and 23 may be configured to perform the exemplary functions described before with reference to FIGS. 5 to 8 in the present disclosure. In addition, the RF units 13 and 23 may be referred to as transceivers.

In embodiments of the disclosure, a UE operates as the transmitting device 10 on UL, and as the receiving device 20 on DL. In the embodiments of the disclosure, the gNB operates as the receiving device 20 on UL, and as the transmitting device 10 on DL. Hereinafter, a processor, an RF unit, and a memory in a UE are referred to as a UE processor, a UE RF unit, and a UE memory, respectively, and a processor, an RF unit, and a memory in a gNB are referred to as a gNB processor, a gNB RF unit, and a gNB memory, respectively.

The gNB processor of the present disclosure may transmit information about ATSSs and RACH configuration information about RACH resources to a UE. Upon reception of a RACH in a RACH resource, the gNB may acquire information about SSBs corresponding to synchronization that the UE intends to acquire on the basis of the RACH resource in which the RACH has been transmitted. That is, the gNB processor is able to know information about SSBs corresponding to beams selected by measuring, by the UE, ATSSs having the highest RSRP value among ATSSs on the basis of the RACH resource in which the RACH has been transmitted. Accordingly, the gNB processor cannot receive a RACH through RACH resources which are not mapped to ATSSs.

The UE processor of the present disclosure maps ATSSs to RACH resources on the basis of ATSS information and information about RACH resources received from a gNB and transmits a RACH in a RACH resource mapped to an SSB having the highest RSRP value selected from received SSBs on the basis of the ATSS information. Accordingly, the UE does not transmit a RACH in RACH resources which are not mapped to ATSSs.

In RACH resources which are not mapped to ATSSs, uplink transmission other than RACH resource transmission may occur or downlink reception may be performed.

Here, the UE processor repeatedly maps ATSSs to RACH resources by a positive integer multiple of the number of ATSSs in a RACH configuration period and does not transmit a RACH through RACH resources remaining after mapping. In addition, the number of times of repeatedly mapping ATSSs may be the same as the largest integer among integers smaller than the value obtained by dividing the number of RACH resources by the number of ATSSs. In addition, when the number of SSBs which can be mapped to RACH resources is less than 1, one SSB is mapped to as many consecutive RACH resources as a reciprocal of the number.

The gNB processor or the UE processor of the present disclosure may be configured to implement the present disclosure in a cell operating in a high frequency band at or above 6 GHz in which analog BF or hybrid BF is used.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Although the method for transmitting and receiving a random access channel and the apparatus therefor have been described focusing on examples in which they are applied to 5G NewRAT, the method and the apparatus may be applied to various wireless communication systems in addition to 5G NewRAT.

What is claimed is:

1. A method of transmitting a random access channel (RACH) by a user equipment (UE) in a wireless communication system, the method comprising:
  receiving information related to actually transmitted synchronization signal blocks (SSBs) and RACH configuration information related to resources for transmitting a RACH preamble; and
  transmitting the RACH preamble in a RACH resource based on the information related to actually transmitted SSBs and the RACH configuration information, wherein the RACH resource is obtained based on a mapping, by the UE, of actually transmitted SSBs to RACH resources within a RACH configuration window, wherein the actually transmitted SSBs are repeatedly mapped to the RACH resources by a positive integer number of mapping cycles within the RACH configuration window, wherein any RACH resource remaining within the RACH configuration window after the repeated mapping is not mapped to the actually transmitted SSBs and is not used as RACH resource.

2. The method according to claim 1, further comprising: transmitting an uplink signal other than the RACH preamble or receiving a downlink signal in a RACH resource which is not mapped to the actually transmitted SSBs.

3. The method according to claim 1, wherein a number of actually transmitted SSBs is mapped per RACH resource mapped to actually transmitted SSBs.

4. The method according to claim 3, wherein the number of actually transmitted SSBs mapped per RACH resource is less than one, and wherein one actually transmitted SSB is mapped to as many consecutive RACH resources as a reciprocal of the number of actually transmitted SSBs mapped per RACH resource.

5. A user equipment (UE) configured to transmit a random access channel (RACH) in a wireless communication system, the UE comprising:

a transceiver; and at least one processor coupled to the transceiver, wherein the at least one processor is configured to:

receive information related to actually transmitted synchronization signal blocks (SSBs) and RACH configuration information related to resources for transmitting a RACH preamble; and transmit the RACH preamble in a RACH resource based on the information related to actually transmitted SSBs and the RACH configuration information, wherein the RACH resource is obtained based on a mapping, by the UE, of actually transmitted SSBs to RACH resources within a RACH configuration window, wherein the actually transmitted SSBs are repeatedly mapped to the RACH resources by a positive integer number of mapping cycles within the RACH configuration window, wherein any RACH resource remaining within the RACH configuration window after the repeated mapping is not mapped to the actually transmitted SSBs and is not used as RACH resource.

6. A method of receiving a random access channel (RACH) by a base station (BS) in a wireless communication system, the method comprising:

transmitting information related to actually transmitted synchronization signal blocks (SSBs) and RACH configuration information related to resources for receiving a RACH preamble; and receiving the RACH preamble in a RACH resource related to the information related to actually transmitted SSBs and the RACH configuration information, wherein the RACH resource is obtained based on a mapping of actually transmitted SSBs to RACH resources within a RACH configuration window, wherein the actually transmitted SSBs are repeatedly mapped to the RACH resources by a positive integer number of mapping cycles within the RACH configuration window, wherein any RACH resource remaining within the RACH configuration window after the repeated mapping is not mapped to the actually transmitted SSBs and is not used as RACH resource.

7. A base station (BS) configured to receive a random access channel (RACH) in a wireless communication system, the BS comprising:

a transceiver; and at least one processor coupled to the transceiver, wherein the at least one processor is configured to:

transmit information related to actually transmitted synchronization signal blocks (SSBs) and RACH configuration information related to resources for receiving a RACH preamble; and receive the RACH preamble in a RACH resource related to the information related to actually transmitted SSBs and the RACH configuration information, wherein the RACH resource is obtained based on a mapping of actually transmitted SSBs to RACH resources within a RACH configuration window, wherein the actually transmitted SSBs are repeatedly mapped to the RACH resources by a positive integer number of mapping cycles within the RACH configuration window, wherein any RACH resource remaining within the RACH configuration window after the repeated mapping is not mapped to the actually transmitted SSBs and is not used as RACH resource.

* * * * *